(12) United States Patent
van Ingen et al.

(10) Patent No.: US 7,769,709 B2
(45) Date of Patent: Aug. 3, 2010

(54) METHOD, SYSTEM, AND APPARATUS FOR CREATING AN ARCHIVE ROUTINE FOR PROTECTING DATA IN A DATA PROTECTION SYSTEM

(75) Inventors: Catharine van Ingen, Bellevue, WA (US); Brian T Berkowitz, Seattle, WA (US); Sunil Pai, Portland, OR (US); Suresh P Duddi, San Jose, CA (US); Sushil Baid, Hyderabad (IN); Vijay Sen, Bangalore (IN); Vinay Badami, Hyderabad (IN); Karandeep Singh Anand, New Delhi (IN); Abid Ali, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 10/937,651

(22) Filed: Sep. 9, 2004

(65) Prior Publication Data

US 2006/0053178 A1 Mar. 9, 2006

(51) Int. Cl.
*G06F 17/30* (2006.01)
(52) U.S. Cl. .................. 707/204; 707/10; 707/200; 707/202
(58) Field of Classification Search .................. 707/10, 707/200, 202, 204, 667, 674, 686
See application file for complete search history.

(56) References Cited

U.S. PATENT DOCUMENTS

| | | | | |
|---|---|---|---|---|
| 6,434,568 | B1 * | 8/2002 | Bowman-Amuah | 707/103 R |
| 6,571,282 | B1 * | 5/2003 | Bowman-Amuah | 709/219 |
| 6,594,677 | B2 * | 7/2003 | Davis et al. | 707/204 |
| 6,640,244 | B1 * | 10/2003 | Bowman-Amuah | 709/207 |
| 6,766,314 | B2 | 7/2004 | Burnett | |
| 7,096,392 | B2 | 8/2006 | Sim-Tang | |
| 7,299,376 | B2 | 11/2007 | Kodi | |
| 2003/0018657 | A1 * | 1/2003 | Monday | 707/204 |
| 2003/0154220 | A1 * | 8/2003 | Cannon | 707/204 |
| 2003/0167287 | A1 | 9/2003 | Forster | |
| 2003/0217083 | A1 * | 11/2003 | Taylor | 707/204 |
| 2003/0225800 | A1 * | 12/2003 | Kavuri | 707/204 |
| 2004/0093555 | A1 | 5/2004 | Therrien | |
| 2004/0098637 | A1 | 5/2004 | Duncan | |
| 2004/0133606 | A1 * | 7/2004 | Miloushev et al. | 707/200 |

(Continued)

FOREIGN PATENT DOCUMENTS

WO WO-9912098 3/1999

(Continued)

OTHER PUBLICATIONS

European Search Report dated Jun. 29, 2009 cited in European Application No. 05108044.8 (4 pages).

*Primary Examiner*—Don Wong
*Assistant Examiner*—Kim T Nguyen
(74) *Attorney, Agent, or Firm*—Perkins Coie LLP

(57) ABSTRACT

A method for creating an archive protection plan for archiving a backup of data is provided. An indication of an archive data protection kind and an archive data protection duration are received. In response to receiving the archive data protection kind and the archive data protection duration, an archive scheme is determined and an archive protection plan representative of the archive scheme is generated.

34 Claims, 67 Drawing Sheets

U.S. PATENT DOCUMENTS

| | | | |
|---|---|---|---|
| 2004/0133607 A1* | 7/2004 | Miloushev et al. | 707/200 |
| 2004/0153458 A1* | 8/2004 | Noble et al. | 707/10 |
| 2004/0230377 A1* | 11/2004 | Ghosh et al. | 702/3 |
| 2006/0053178 A1* | 3/2006 | van Ingen et al. | 707/204 |
| 2006/0053181 A1* | 3/2006 | Anand et al. | 707/204 |

FOREIGN PATENT DOCUMENTS

| | | |
|---|---|---|
| WO | WO-03005158 | 1/2003 |
| WO | WO-03046721 | 6/2003 |
| WO | WO-2004025470 | 3/2004 |

\* cited by examiner

| SCHEDULE | GENERATION | MODE | ONSITE COPIES | ONSITE RETENTION | OFFSITE COPIES | OFFSITE RETENTION |
|---|---|---|---|---|---|---|
| 11:00pm TODAY | - | FULL (ONE TIME BASE LINE) | 1 | 4 WEEKS | 1 | 7 YEARS |
| 11:00pm MON – FRI | SON | INCREMENTAL | 1 | 2 WEEKS | 0 | 0 |
| 11:00pm EVERY SAT (EXCEPT LAST SAT OF EACH MONTH) | FATHER | FULL | 1 | 4 WEEKS | 1 | 4 WEEKS |
| 11:00pm LAST SAT OF EACH MONTH (EXCEPT LAST SAT OF YEAR) | GRANDFATHER | FULL | 1 | 4 WEEKS | 1 | 12 MONTHS |
| 11:00pm LAST SAT OF YEAR | GREAT GRANDFATHER | FULL | 1 | 4 WEEKS | 1 | 7 YEARS |

*Fig. 40.*

METHOD, SYSTEM, AND APPARATUS FOR CREATING AN ARCHIVE ROUTINE FOR PROTECTING DATA IN A DATA PROTECTION SYSTEM

CROSS-REFERENCES TO RELATED APPLICATIONS

This application cross-references U.S. patent application Ser. No. 10/937,708, titled METHOD, SYSTEM, AND APPARATUS FOR CONFIGURING A DATA PROTECTION SYSTEM, and filed on Sep. 9, 2004, which is incorporated by reference herein;

This application cross-references U.S. patent application Ser. No. 10/937,204, titled METHOD, SYSTEM, AND APPARATUS FOR CREATING SAVED SEARCHES AND AUTO DISCOVERY GROUPS FOR A DATA PROTECTION SYSTEM, and filed on Sep. 9, 2004, which is incorporated by reference herein;

This application cross-references U.S. patent application Ser. No. 10/937,061, titled METHOD, SYSTEM, AND APPARATUS, FOR TRANSLATING LOGICAL INFORMATION REPRESENTATIVE OF PHYSICAL DATA IN A DATA PROTECTION SYSTEM, and filed on Sep. 9, 2004, which is incorporated by reference herein;

This application cross-references U.S. patent application Ser. No. 10/937,060, titled METHOD, SYSTEM, AND APPARATUS FOR PROVIDING RESILIENT DATA TRANSFER IN A DATA PROTECTION SYSTEM, and filed on Sep. 9, 2004, which is incorporated by reference herein;

This application cross-references U.S. patent application Ser. No. 10/937,218, titled METHOD, SYSTEM, AND APPARATUS FOR CREATING AN ARCHITECTURAL MODEL FOR GENERATING ROBUST AND EASY TO MANAGE DATA PROTECTION APPLICATIONS IN A DATA PROTECTION SYSTEM, and filed on Sep. 9, 2004, which is incorporated by reference herein; and This application cross-references U.S. patent application Ser. No. 10/937,650, titled METHOD, SYSTEM, AND APPARATUS FOR PROVIDING ALERT SYNTHESIS IN A DATA PROTECTION SYSTEM, and filed on Sep. 9, 2004, which is incorporated by reference herein.

FIELD OF THE INVENTION

In general, the present invention relates to data protection and data protection systems, and in particular, to a system, method and apparatus for controlling the protection and recovery of data.

BACKGROUND OF THE INVENTION

Generally described, large scale computer systems often contain several computing devices and large amounts of data. In such a system, computing devices are often added and removed. Likewise, existing computing devices are often changed through the addition of shares, Exchange Storage Groups, databases, volumes, and other changes to data stored on the computing devices. For organizations utilizing such a computer system, there is generally a need to protect the data stored on the system, often by creating a backup of the data.

However, individuals responsible for protecting the system are often not informed of additions and/or changes to the system and therefore are unaware of new resources that need protection. For example, if a new computing device, such as a server, is added to the system and the individual responsible for protecting the system is not informed of the addition, data on the new computing device, and the new computing device, may remain unprotected.

This problem increases for systems that allow individuals to operate within the system at a logical level rather than at a physical level. While individuals operate at the logical level, protection is typically determined at the physical level. In such an environment, problems may occur when operations at the logical level require changes to the backup procedure. For example, if the logical path \\history\public\tools points to a share on server history1 and it is decided to move \\history\public\tools to point to a different share on server history2, if the individual responsible for protection is not informed of the change, the old share may continue to be protected while the new share remains unprotected.

The problem increases still further when a single logical path may represent a set of physical alternatives, which contain synchronized copies of the underlying data. For example, \\history\docs may point to identical shares on both history1 and history2; only one of the identical underlying folders should be protected by the system.

Failure to protect material on a large system typically results because the individual responsible for protection must manually identify resources and the data that is to be protected and manually configure the protection. As the system changes, unless they become aware of the change, data and resources may go unprotected. Additionally, for archiving backups of data to physical media, the individual must manually determine what media is to be used for protection and when/how to rotate the media. For large systems, manually identifying changes, configuring protection, and maintaining archives is complex and changes are difficult. Such manual identification, configuration and modification of protection often results in omission of data and resources that need protection and problems with the protection itself.

When problems do arise, typically the individual must be able to determine the problem at a detailed level and have knowledge as to how to resolve the problem, without being provided information from the protection system itself.

Thus, there is a need for a system, method, and apparatus for automating the protection of a computer system, identifying when changes to the system occur, providing guidance to a user when problems arise with protection, and allowing individuals to create protection by working in a logical namespace.

SUMMARY OF THE INVENTION

A method for creating an archive protection plan for archiving a backup of data is provided. An indication of an archive data protection kind and an archive data protection duration are received. In response to receiving the archive data protection kind and the archive data protection duration, an archive scheme is determined and an archive protection plan representative of the archive scheme is generated.

In accordance with an aspect of the present invention, a mechanism for managing a plurality of media for storing data at an archive location in response to receiving a request to store the data is provided. The mechanism includes a Job Collocation intent, wherein for each request associated with a job for storing data, the job collocation intent allocates a same item of media from the plurality of media. Additionally, the mechanism includes a Sons Collocation intent, wherein for all Sons subsequent to the first Son for a predetermined period of time, the very same media that is used for the first Son is allocated from the plurality of media.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 17-23A, and 24 illustrate a flow diagram for creating and utilizing an auto discovery group, in accordance with an embodiment of the present invention;

FIG. 40 is a table illustrating an example of the different generations that may be used for generating an archive scheme, in accordance with an embodiment of the present invention;

DETAILED DESCRIPTION OF THE PREFERRED EMBODIMENT

Figure 1A:
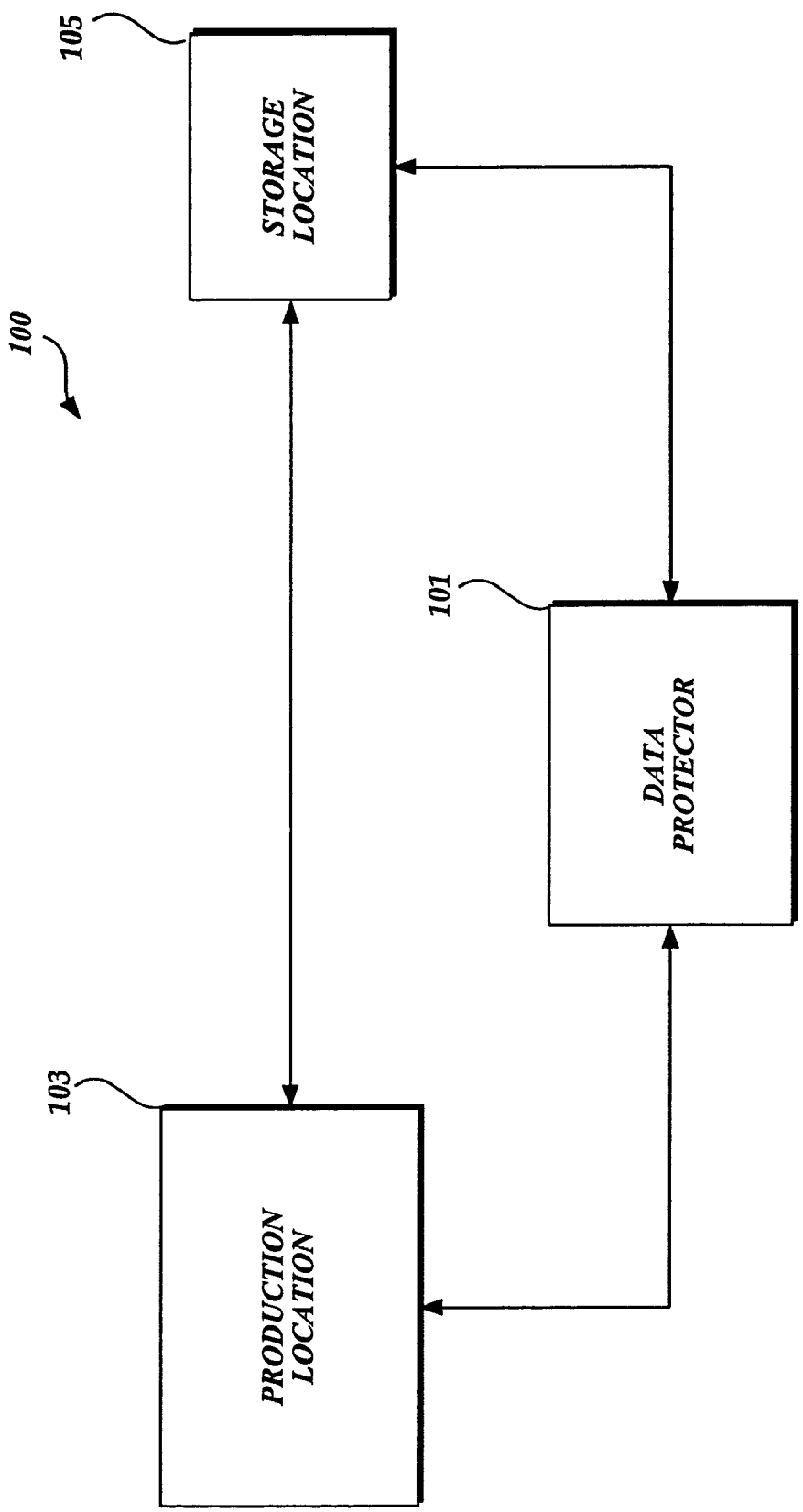
FIGS. 1A-2 are block diagrams of a data protection system for managing the protection and recovery of data, in accordance with an embodiment of the present invention.

FIG. 1A is a block diagram of a data protection system for managing the protection and recovery of data, in accordance with an embodiment of the present invention. Embodiments of the data protection system 100 described herein provide a user, such as a system administrator, with the ability to easily manage the protection and recovery of data. Typically, data management and protection is desired for data that is actively being produced and modified at a production location 103. That data is protected and stored as a replica or copy of the data at a storage location 105. The storage location may be at a remote location from the production location and/or at the same location as the production location. Additionally, the storage location may include multiple locations for different forms of storage. For example, replicas of data may be maintained at one location and archive of that data may be maintained at a second location. Accordingly, a storage location generally describes any combination and/or type of location for which data may be stored and protected.

As will be described herein, the data protection system 100 includes a data protector 101 that communicates with a production location 103 and a storage location 105 to monitor the protection and flow of data between the production location 103 and the storage location 105. The data protector 101, as illustrated in FIG. 1A, may exist on a single computing device, such as a server, or be distributed over multiple computing devices. The data protector 101 deploys and communicates with agents located on different computing devices within the data protection system 100, such as the production location 103 and/or the storage location 105 to enable distributed control and management of data protection between multiple devices. Examples of the types of data protection provided by the data protection system 100 include, but are not limited to, replication with temporal versions, traditional archive to removable media, such as tape or disk, and a combination of both replication and archive. It will be appreciated that any other form and/or combination of protection may be utilized with embodiments of the present invention and that replication, temporal versions, and archive are simply examples.

Figure 1B:
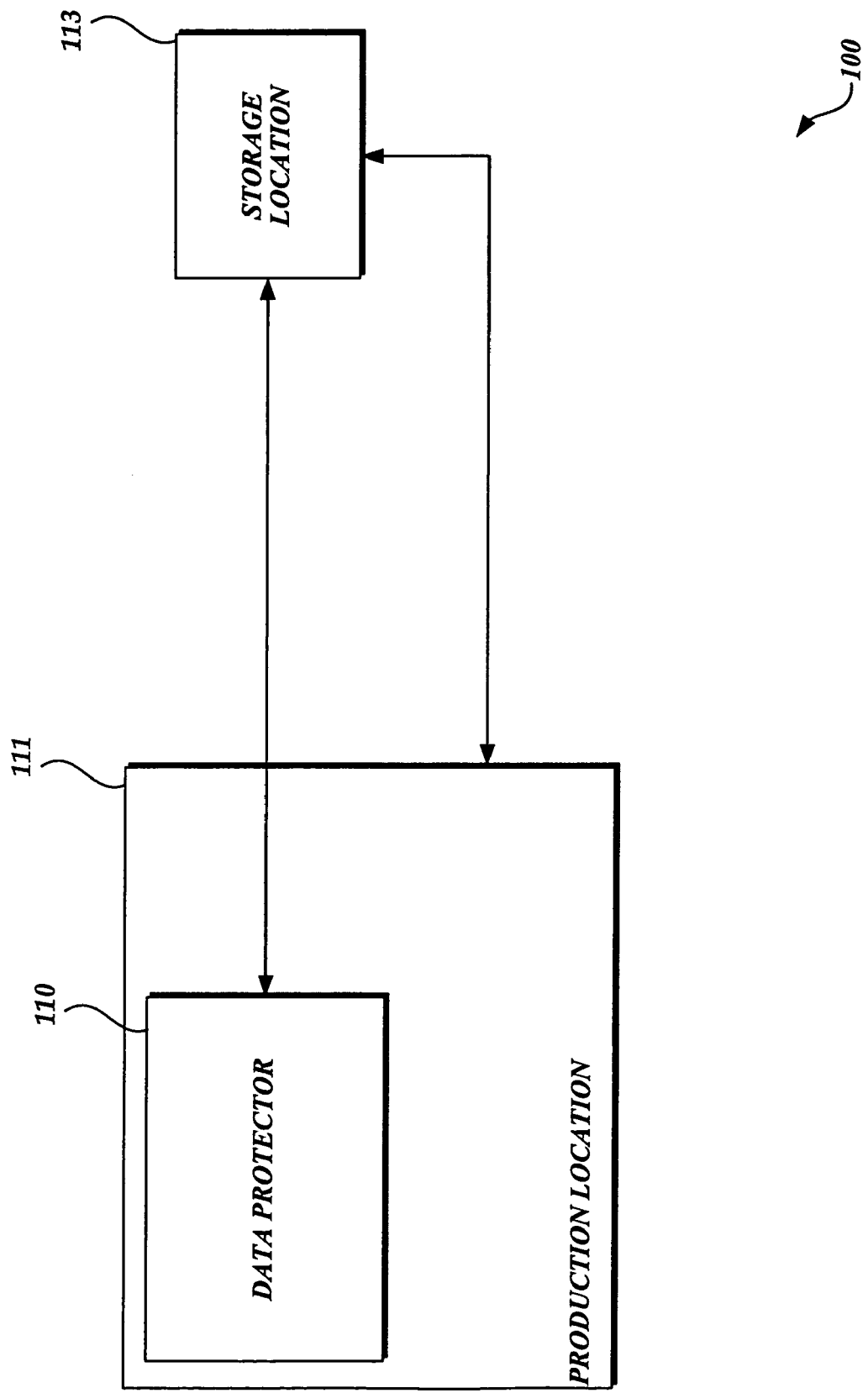

FIG. 1B illustrates an alternative embodiment of the data protection system 100. In particular, the data protector 110 may reside partially or entirely at the production location 111. In such an embodiment, the data protector 110 provides communication between itself and the production location 111, and between itself and the storage location 113.

Figure 1C:
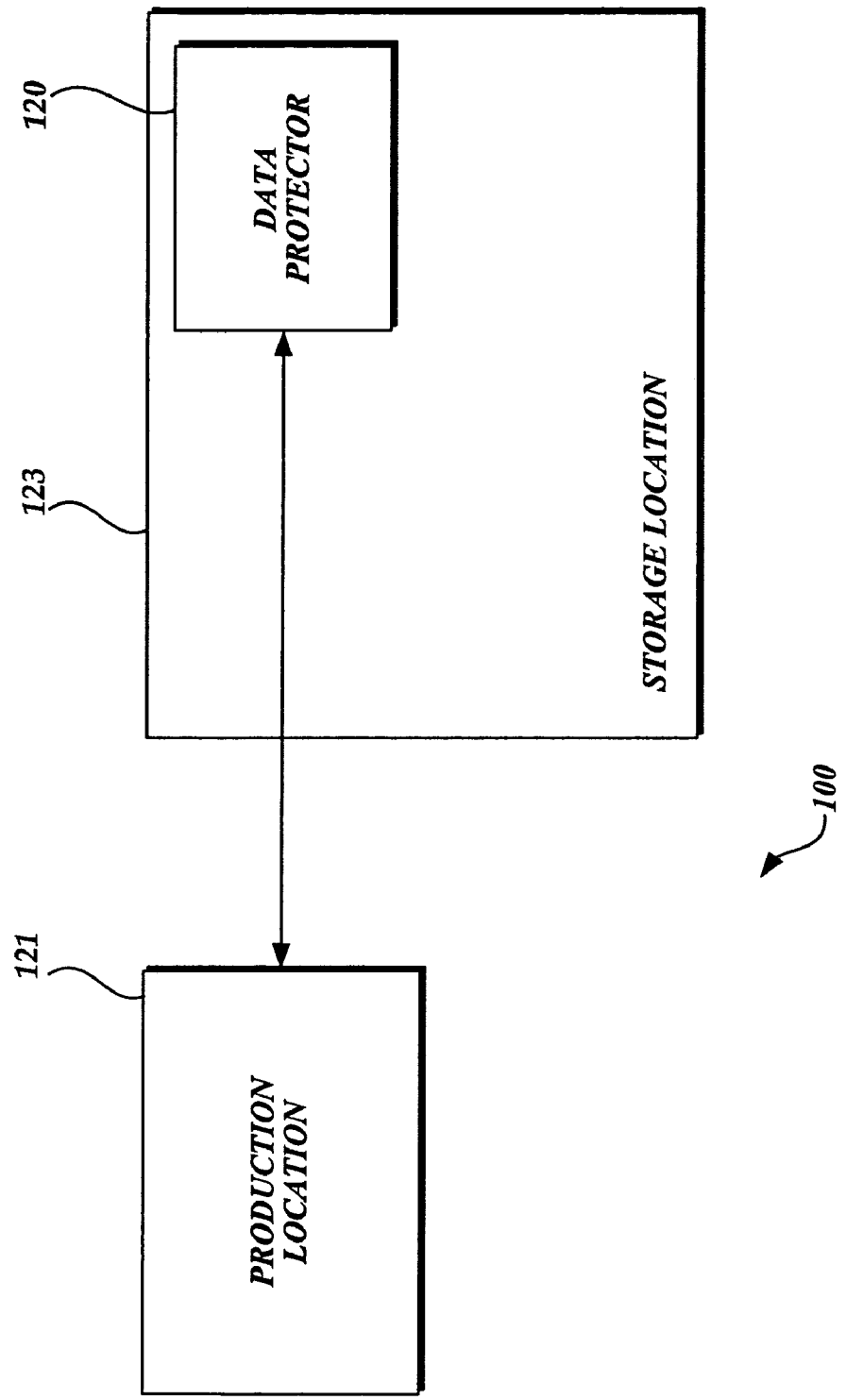

FIG. 1C illustrates yet another embodiment of the data protection system 100 that is used for protecting and recovering data, in accordance with an embodiment of the present invention. As illustrated in FIG. 1C, the data protector 120 may reside partially or entirely at the storage location 123. In such an embodiment, the data protector 120 provides communication between itself and the storage location 123 and between itself and the production location 121.

Figure 2:
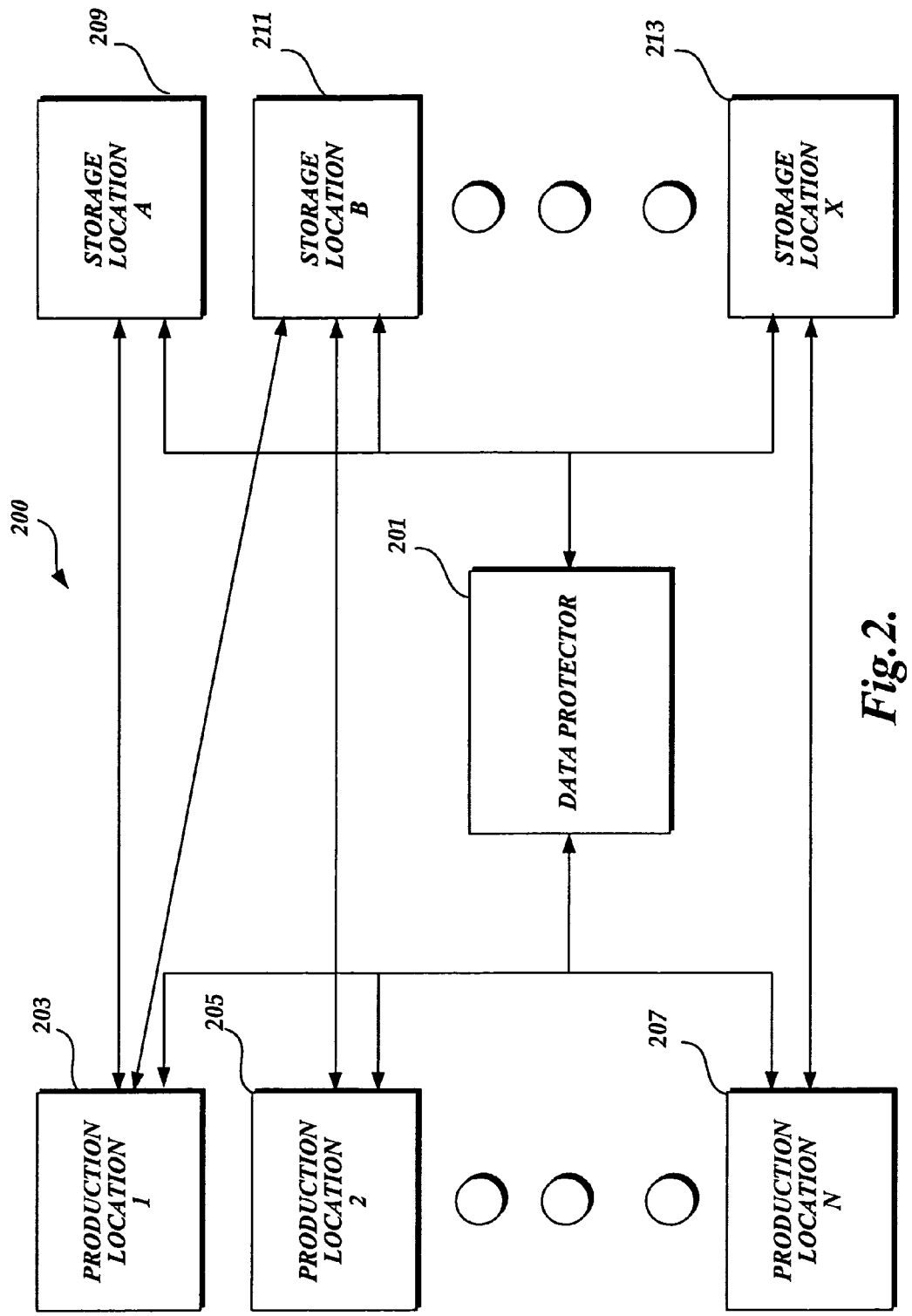

FIG. 2 is another block diagram of a data protection system 200 for protecting and recovering data, in accordance with an embodiment of the present invention. The data protection system 200 illustrates that multiple production locations, such as production locations 203, production location2 205, through production locationN 207, may interact with the data protector 201 to store replicas and/or temporal versions of data originating from production locations. The data protector2 201 communicates with the production locations 203, 205, 207 and provides protection of the data residing on those production locations at a respective storage location, such as storage locationA 209, storage locationB 211, and storage locationX 213. The embodiments described herein may be utilized with any number and combination of data production locations and storage locations.

As will be appreciated, and as illustrated in FIGS. 1A-2, any type of configuration of the data protection system may be utilized according to embodiments of the present invention for protecting and recovering data.

Overall, embodiments of the data protection system described herein provide the ability for a user of the data protection system to specify at a high level what data at a production location is important and how the user wants to protect that data. In particular, the system described herein provides a user with the ability to logically identify what data at a particular production location they want to protect and how they want to protect it. The data protection system converts that logical identification into a series of "jobs" that are scheduled and executed to protect the data. Jobs, as described below, include the detailed information necessary for protecting the data identified by a user. For example, a job may perform replication, validation, temporal version management, archive and media management, etc.

In order to provide users with the ability to select data at a logical level, the data protection system provides users with a logical representation of data stored at a production location in the form of a "Namespace" and "Namespace Elements." A Namespace, as described herein, is a logical representation of an application. For example, applications that may be represented within the data protection system as Namespaces include, but are not limited to, a Distributed File System ("DFS"), a local file system, web application Namespaces, such as SharePoint, and Exchange Namespaces. As will be appreciated, the list of exemplary applications is for illustration purposes only and is not intended to be limiting in any way. Any type of application may be used with the data protection system and identified as a Namespace.

A Namespace Element, as described herein, is a logical representation of a physical object, such as data, and is the primary entity that makes up a Namespace. For example, Namespace Elements may be, but are not limited to, DFS links, servers, shares, volumes, folders, or Exchange Storage Groups. Generally described, an Exchange Storage Group is a collection of databases that share a common log. As will be appreciated by one skilled in the relevant art, Namespace Elements may be used to represent any type of a physical object or collection of physical objects.

To protect data, a user searches or navigates in the logical Namespace and selects one or more of the Namespace Elements. Selected Namespace Elements are associated with an existing "protected group" or used to create a new protected group. When a Namespace Element is associated with a protected group, the physical objects (data) associated with that Namespace Element also become part of the protected group. A protected group, as described herein, is a logical grouping of Namespace Elements and associated protected objects to which the same protection rules are applied.

Each Namespace Element is used to locate one or more physical objects (data), referred to herein as "protectable objects," that may be added to a protected group. Once located, the protectable objects may be selected for protection. When a protectable object is selected for protection, the selected protectable object becomes a "protected object" that is part of a protected group. A protectable object, as described herein, is physical information/data that may be protected. For example, a protectable object may be, but is not limited to, a folder, file, electronic mailbox, database, website, etc. A protected object, as used herein, is a protectable object that has been identified and selected for protection.

In addition to creating protected groups, users can specify at a high level how, when (how frequently), and for how long they want the protected group to be protected. Additionally, a user may specify for how long they want copies and archives of the protected group to be retained. Such high level specifications may span all protection activities, such as replication, archive, media management, and any combination thereof. Based on the specifications provided by a user, a detailed plan is created for protecting the objects of a protected group.

To recover data, a user is provided the ability to search or navigate in the logical Namespace to locate the data that the user wants to recover. The logical path to the data to be recovered is then used to locate one or more recoverable objects, as described below. Each recoverable object represents a version of a protected object or a portion thereof.

Figure 3:
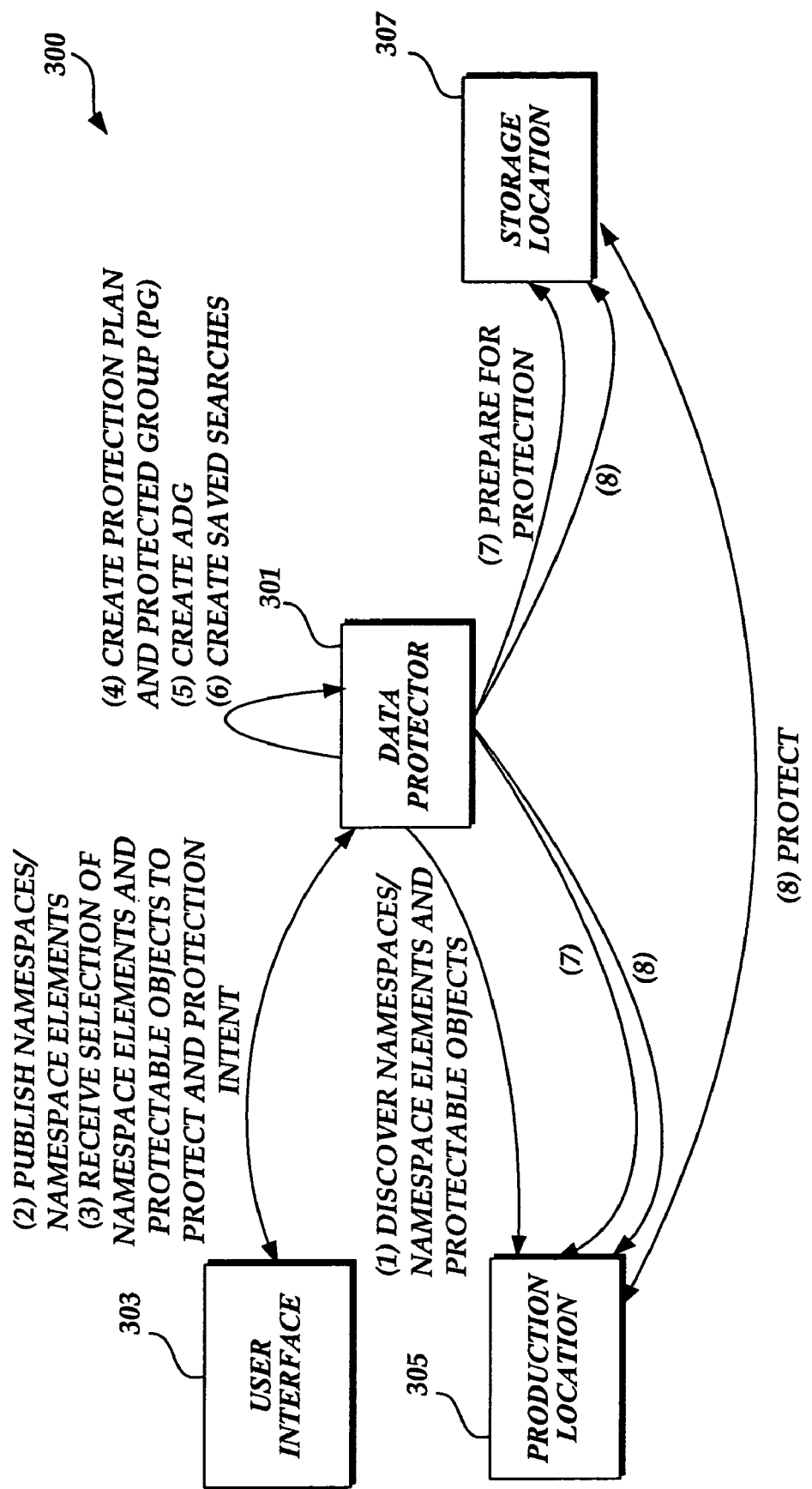
FIG. 3 is a flow diagram of a data protection system describing the initial selection and protection of protectable objects that are located at a production location, in accordance with an embodiment of the present invention.

FIG. 3 is a flow diagram of a data protection system 300 describing the initial selection and protection of protectable objects that are located at a production location, in accordance with an embodiment of the present invention. As illustrated in FIG. 3, the data protection system 300 deploys agents to the production location 305 to enable the discovery of protectable objects located at the production location 305 and identifies the Namespaces and Namespace Elements corresponding to those protectable objects. Those Namespaces and Namespace Elements are published for user interaction and displayed on a user interface 303.

Figure 4:
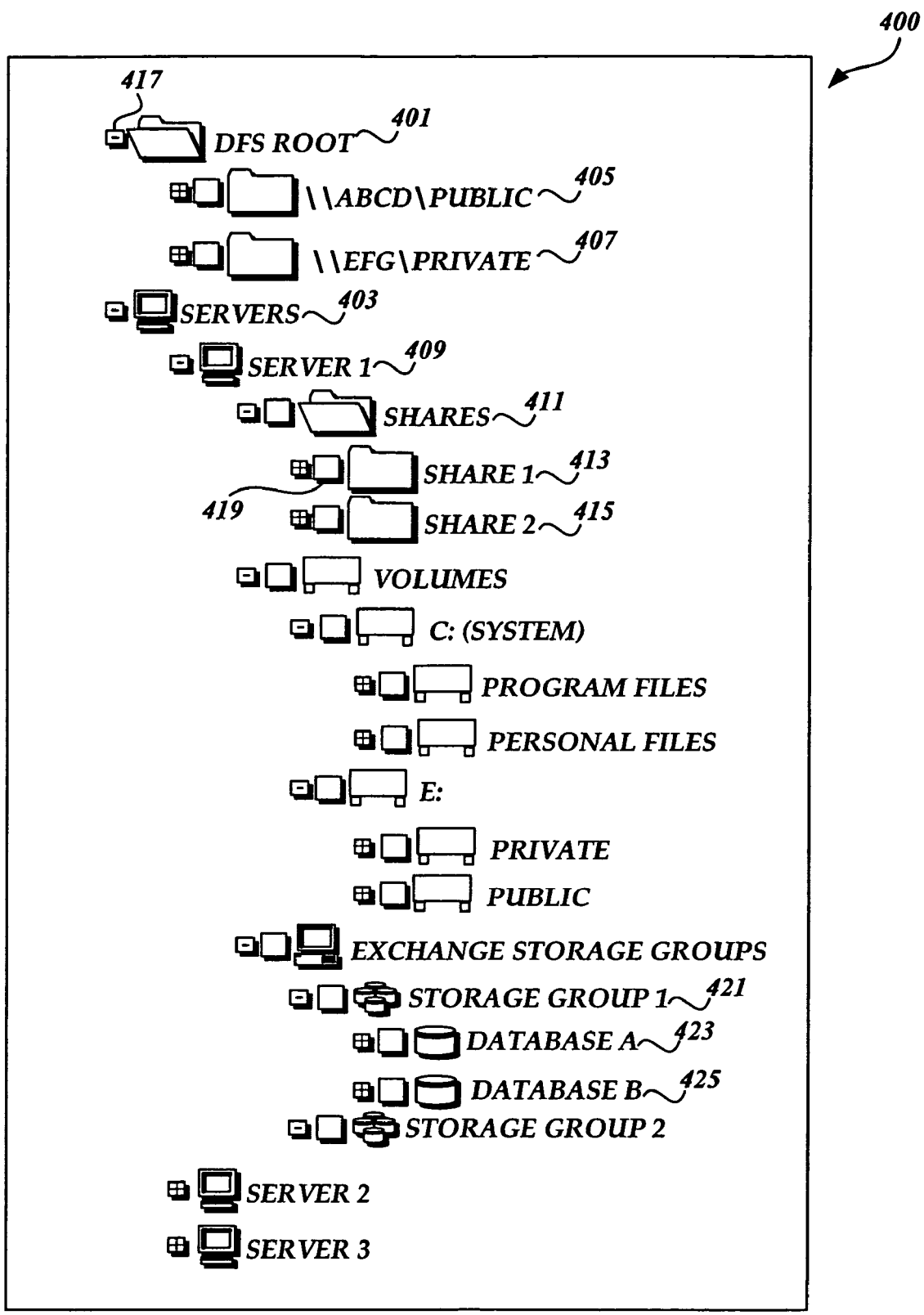
FIG. 4 illustrates a block diagram of a plurality of Namespaces and Namespace Elements that are published and displayed on a user interface for user interaction and selection, in accordance with an embodiment of the present invention.

For example, FIG. 4 illustrates a block diagram of a plurality of Namespaces and Namespace Elements that are published and displayed on a user interface 303 for user interaction and selection, in accordance with an embodiment of the present invention. As will be appreciated by one skilled in the relevant art, the illustration of FIG. 4 is exemplary only, and any other configuration may be displayed with embodiments of the present invention. For example, the display may include volumes but not shares.

The display 400 illustrates a DFS ROOTS Namespace 401 and a SERVERS Namespace 403. The DFS ROOTS Namespace 401 includes two Namespace Elements 405, 407, both of which are DFS ROOTs. The Namespace Elements identified under the DFS ROOTS Namespace 401 are \\ABCD\PUBLIC 405 and \\EFG\PRIVATE 407. Additionally, the SERVERS Namespace 403 includes several Namespace Elements 409, 411, 413, 415, 421, 423, 425. Those Namespace Elements may also include several additional Namespace Elements. For example, SERVER1 409 includes several Namespace Element types, such as SHARES Namespace Element type 411. Likewise the SHARES Namespace Element type 411 includes SHARE1 Namespace Element 413 and SHARE2 Namespace Element 415. Additionally, the SHARES Namespace Element 411, SHARE1 Namespace Element 413, and SHARE2 Namespace Element 415 are all logical representations of protectable objects.

A user may interact with the display 400 of Namespaces and Namespace Elements by selecting expand or collapse boxes, such as expand box 417. Additionally, a user may select one or more of the Namespace Elements for protection by selecting a selection box, such as selection box 419. In an alternative embodiment, in addition to being able to select Namespace Elements for protection, a user may be able to select a Namespace for protection.

Referring back to FIG. 3, upon representation of the display 400 of Namespaces and Namespace Elements on the user interface 303, a user selects which of the Namespace Elements the user wants protected by the data protection system 300. Additionally, a user may provide "protection intents" for the selected Namespace Elements. Protection intents, as described herein, are a high level description of how selected data is to be protected. For example, a user may indicate that the selected Namespace Elements are to be protected by backing up a copy of the objects once every night and keeping weekly copies for a duration of one year. The selected Nanespace Elements, and the associated protection intents, are transferred from the user interface 303 to the data protector 301.

The data protector 301, using the selected Namespace Elements and protection intents, creates a protected group for the protectable objects identified by the selected Namespace Elements. Upon selection, the protectable objects become protected objects. The protected group includes the selected Namespace Elements, an identification of the associated protected objects, and a detailed plan as to how the protected objects are to be protected. In addition, the data protector 301 creates at least one auto discovery group, as described below. In an embodiment, the data protector 301 may also create a saved searches routine, as described below.

Creation of a protected group is accomplished by mapping the selected logical objects (Namespace Elements) to the appropriate protectable objects located on the production location. The identified protectable objects are then added as members of the protected group and become protected objects. Protectable objects may be added to an existing protected group or may form a new protected group. Additionally, the protection intents are used to create a group plan for protecting the protected group. The group plan includes, but is not limited to, a resource plan, preparation plan, and protection plan, each of which is described in detail below. The group plan, and the plans within the group, consists of one or more jobs and scheduling parameters. In the case of a resource plan, an amount of resources to be allocated is identified. The allocated resources may include, but are not limited to, disk space for a replica, removable media for archive, such as a disk or tape, a combination of both a replica and removable media, etc. The scheduling parameters identify when the jobs are to be executed.

After generation of the protected group, the plan for protecting the data, the auto discovery groups and the saved searches, the data protector 301 prepares the production location 305 and the storage location 307 for protection. In particular, the data protector deploys agents that enable communication and transfer of data from the production location 305 to the storage location 307. Once the production location and storage location have been prepared for protection, protection begins and a copy of the data for the protected objects is transferred from the production location 305 to the storage location 307. The transferred copy of data, as described below, may be maintained as a replica, archive copy, or any other type of data protection.

In preparing the storage location 307 for protection, as discussed in more detail below, the data protector 301 allocates the necessary resources (via a resource plan) for storing a copy of the physical objects as requested by the user. To begin protection, a job is initiated to create an initial copy of the selected protectable objects stored at the production location 305, transmit the copy, and store the copy at the storage location 307. If the copy is a replica, it is then validated to ensure its accuracy through the execution of a validation job. If the copy is being archived to removable media, the initial copy is a full backup of the selected protectable objects. After the initial copy is generated, the data protector 301 creates jobs to periodically update the copy, or create additional copies (as is the case with archive) with changes that have been made to the information located at the production location 305.

To identify the protectable objects stored at a production location 305 associated with selected Namespace Elements, the data protector 301 maps the logical objects (Namespace Elements) to the physical objects (protectable objects). Referring again to FIG. 4, two Namespaces, DFS ROOTS 401, and SERVERS Namespace 403 are displayed, each having a plurality of Namespace Elements. A user may choose one or more of the Namespace Elements. In one embodiment, when a Namespace Element is selected, all contained Namespace Elements are also selected by default. Using FIG. 4 as an example, if a user selects Storage Group1 421 on SERVER1 409, then DATABASE A 423 and DATABASE B 425 are automatically selected as well. A user may unselect one or more of the Namespace Elements.

Figure 5:
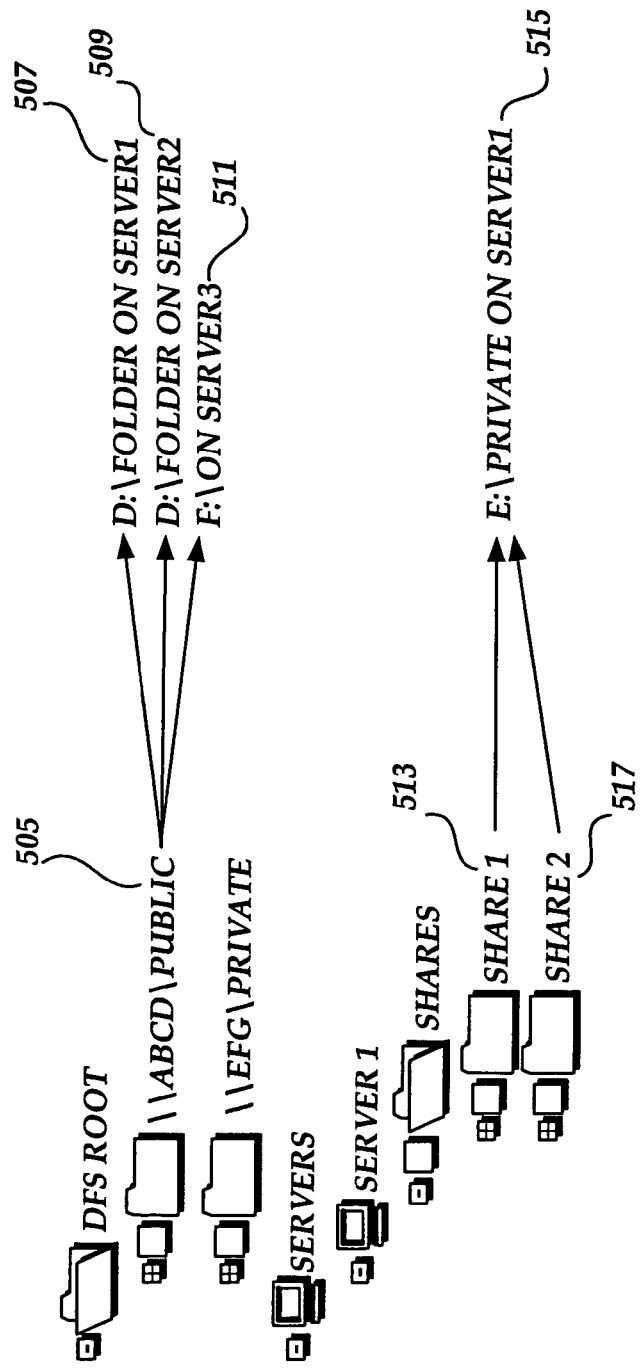
FIG. 5 illustrates the mapping between a Namespace Element and protectable objects, in accordance with an embodiment of the present invention.

Each Namespace Element maps to one or more protectable objects located at a production location 305. For example, Namespace Element \\ABCD\PUBLIC 405 maps to multiple protectable objects. Referring to FIG. 5, Namespace Element \\ABCD\PUBLIC 505 maps to three protectable objects located at the production location 305. In particular, the Namespace Element \\ABCD\PUBLIC 505 maps to D:\folder on server1 507, D:\folder on server2 509, and F:\on server3 511. Each of the protectable objects 507, 509, 511 is located within the production location 305.

In order for the data protector to search and navigate Namespaces, as well as map from a logical object, such as Namespace Element 505, to a physical object, a schema associating the Namespaces and Namespace Elements is created. The schema is an abstract representation of the composition of an application Namespace, where possible Namespaces include, but are not limited to, the Distributed File System and Exchange.

Figure 6:
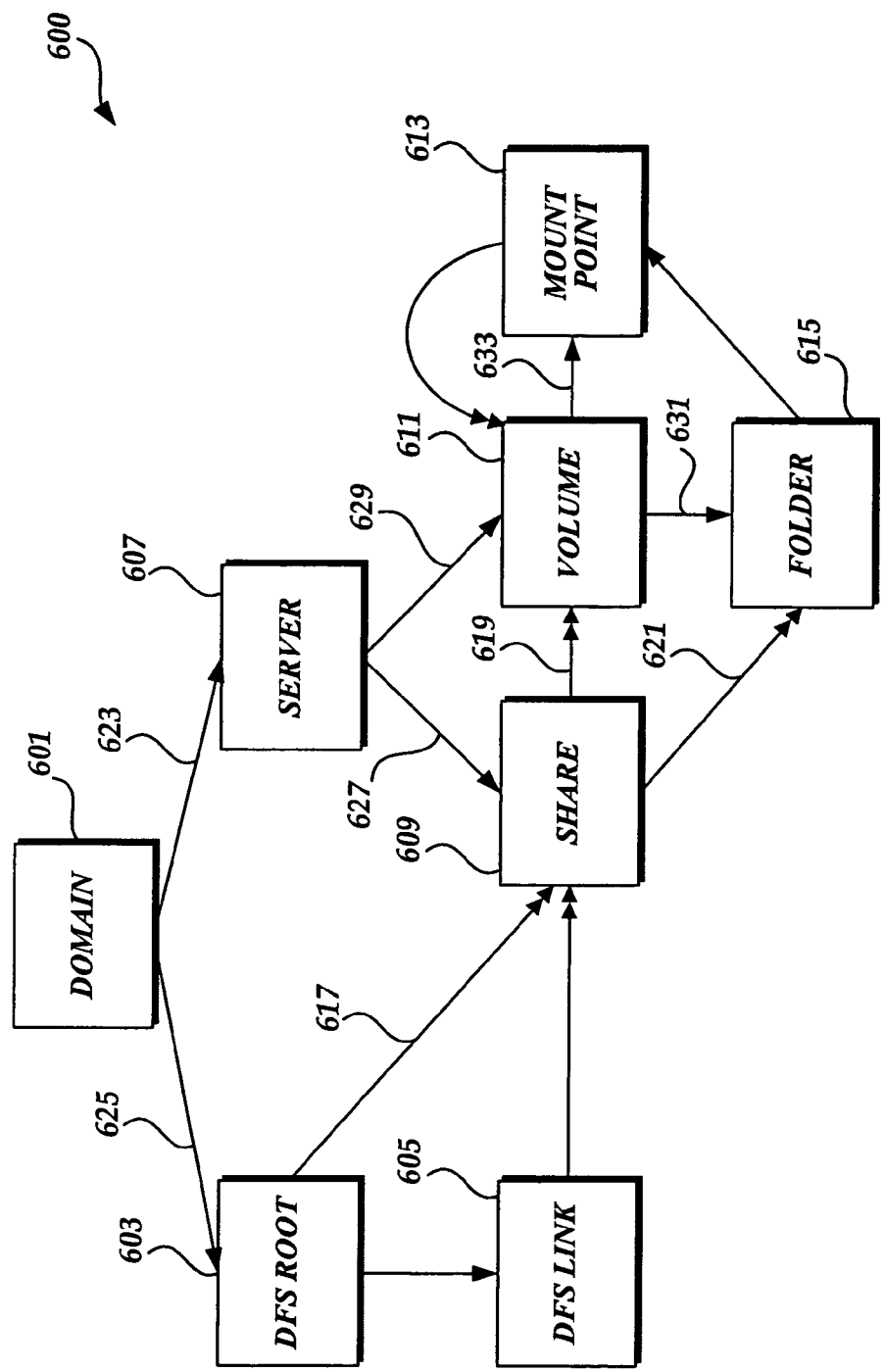
FIG. 6 illustrates a block diagram of a schema for associating types Namespaces and types of Namespace Elements, in accordance with an embodiment of the present invention.

FIG. 6 illustrates a block diagram of one such schema for associating types of Namespaces and types of Namespace Elements representing the Volumes Schema, in accordance with an embodiment of the present invention. The schema is represented as a directed graph, where nodes in the graph represent types of Namespace Elements within the application Namespace and links represent containment and junction relationships between Namespace Elements. The containment relationships and junction relationships between types of Namespace Elements represent all of the possible ways that instances of those types can be related. Referring to FIG. 6, containment relationships are illustrated as single arrow lines and junction relationships are illustrated as double arrow lines. For example, a Namespace Element of the type "DFS root" 603 may represent a junction 617 to a Namespace Element of the type "share" 609, and the share 609 may represent a junction 619 to a volume 611, or a junction to a folder 615.

A containment relationship is a straightforward parent/child relationship between Namespace Elements, in which the parent is logically comprised of the children. For example, the domain 601 contains 623 a server 607 and contains 625 a DFS ROOT 603. The server 607 contains 627 shares 609 and contains 629 volumes 611. A volume 611 contains 631 folders 615 and contains 633 mount points 613. A folder 615 may contain other folders and contain files (not shown).

A junction relationship is a source/target relationship, in which a source Namespace Element is a logical synonym for a target Namespace Element, meaning that the source and target paths represent the same underlying object in two different Namespaces. A junction relationship may be a one-to-many relationship. That is, a single source Namespace Element may have multiple target Namespace Elements, in which case the targets represent alternative locations from which to retrieve the underlying data represented by the source. For example, a DFS root 603 may map 617 to multiple shares 609 as targets. A junction relationship may also be many-to-one—the target of a junction may have multiple logical names in other Namespaces. For example, a folder 615 can have many shares 609 mapping 621 to that folder 615.

Additionally, multiple logical Namespace Elements may map to the same protectable object. For example, the SHARE1 Namespace Element 513 maps to E:\PRIVATE on server1 515. Likewise, the SHARE2 Namespace Element 517 may also map to E:\PRIVATE on server1 515.

Figure 7:
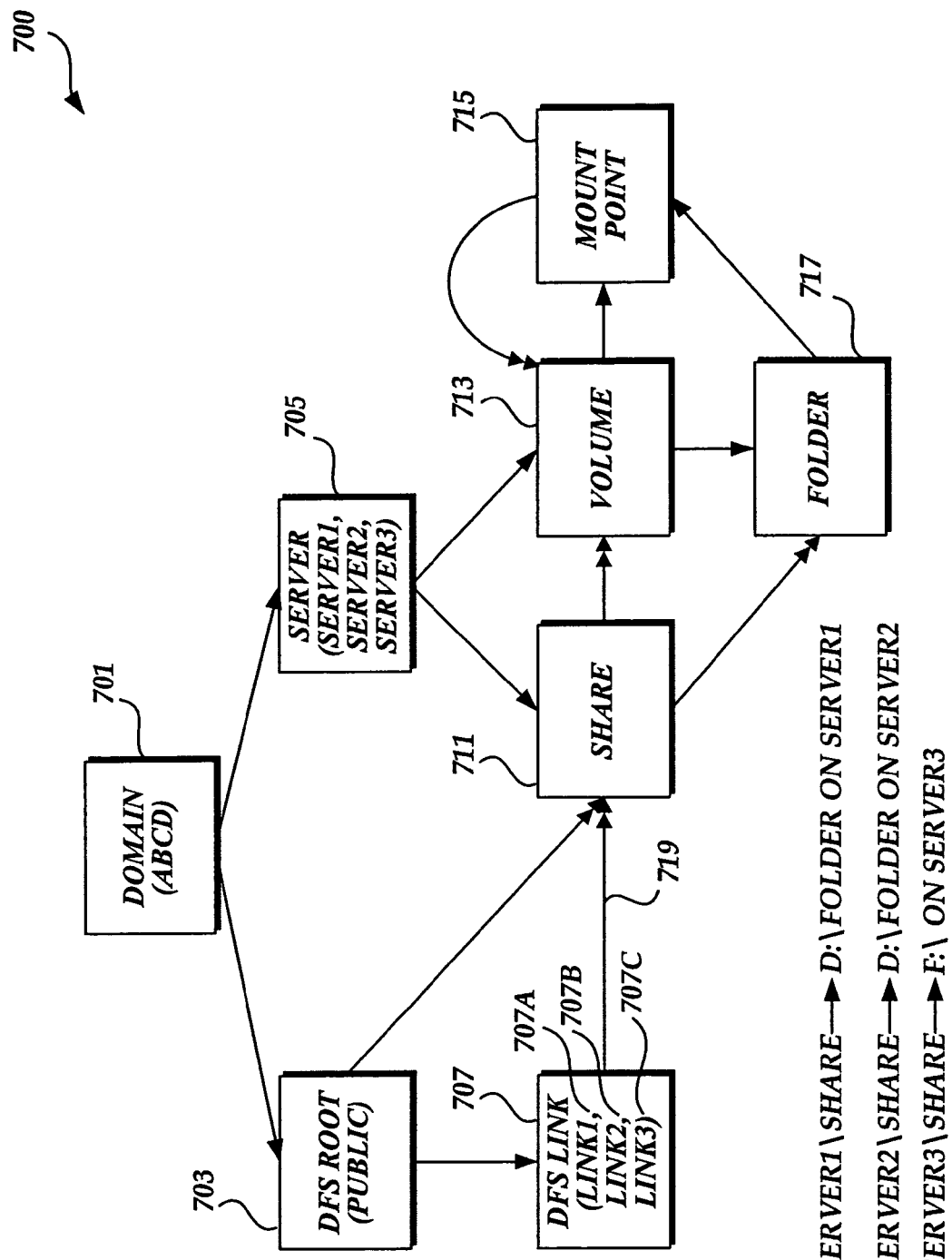
FIG. 7 illustrates a block diagram of a schema for mapping a logical Namespace Element to a physical protectable object, in accordance with an embodiment of the present invention.

FIG. 7 illustrates a block diagram of a schema for mapping a logical Namespace Element to a physical protectable object, in accordance with an embodiment of the present invention.

In particular, the schema 700 illustrates that the domain ABCD 701 has a containment relationship with DFS ROOT-public 703 and three servers 705. Likewise, the DFS ROOT-public 703 has a containment relationship with three DFS links 707 including link1 707A, link2 707B, and link3 707C. Link1 707A, link2 707B, and link3 707C each include a junction relationship to a share 711. In particular, link1 707A includes a junction to \\server1\share, link2 707B includes a junction to \\server2\share, and link3 707C includes a junction to \\server3\share. \\server1\share, \\server2\share, \\server3\share are each logical objects in a different Namespace than the DFS Namespace. This is illustrated by traversal of the junction 719 between the DFS link 707 and the share 711. In particular, \\server1\share, \\server2\share, and \\server3\share are in the UNC server Namespace. Referring to the share 711, to complete the mapping of \\ABCD\PUBLIC, a determination is made as to what each of the shares map to. As discussed above, a share can map to a volume 713, and/or a folder 717. Thus, continuing with the example, it is determined that the logical object \\server1\share maps to the physical object of D:\folder on server1; \\server2\share maps to D:\folder on server2; and \\server3\share maps to F:\on server3. D:\folder on server1, D:\folder on server2, and F:\on server3 are the three physical protectable objects represented by the logical object of \\ABCD\PUBLIC 505.

As illustrated by the example of FIG. 7, utilizing the schema 600 (FIG. 6) it can be determined from a logical Namespace Element, the mapping relationship to physical objects stored on a production location that are represented by that Namespace Element. From each point in the schema 600 it is known what relationships may be searched for from that point to link to the next portion of the mapping.

The data protector's Namespace traversal capabilities may be applied to any type of application for browsing, searching, and mapping from logical Namespaces and Namespace Elements to physical objects stored at a production location. For example, via a user interface, a user may specify search parameters, including wild cards, and the data protection system can query an existing list of Namespaces and Namespace Elements and provide the appropriate results. The user interface will pass the search request to the data protector, and the data protector will send the results back to the User Interface. The data protector supports generic operations to "search," "navigate," and "map" between Namespaces, where each application Namespace's specific structure can be captured in a schema. To extend the data protector to support new applications, then, one simply needs to provide a module to perform basic operations on that namespace to traverse containment relationships and junctions, as well as the schema, which describes how to compose those operations into larger "search," "navigate," and "map" operations.

Embodiments of the present invention may also be used for non-data protection applications as well. For example, storage reports may be produced that illustrate how storage is being used across a production location, or across a set of servers within a production location. In such an embodiment, a user can configure a report to show all files larger than 100 MB underneath a DFS root.

Figure 8:
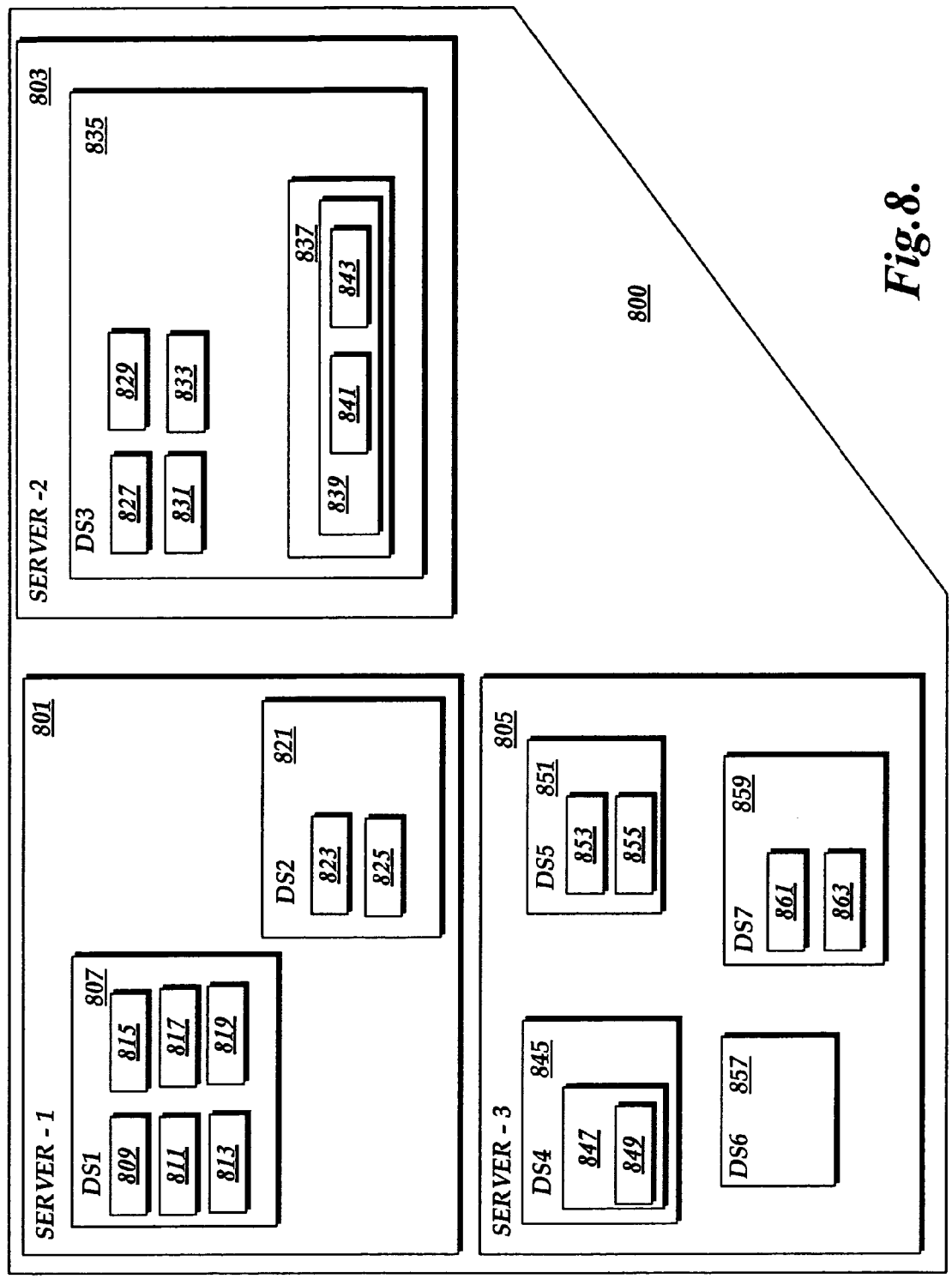
FIG. 8 illustrates a block diagram of a production location that contains protectable objects that may be protected by the data protection system, in accordance with an embodiment of the present invention.

A production location includes several different types of objects that may be protected. For example, FIG. 8 illustrates a block diagram of a production location 800 that contains protectable objects that may be protected by the data protection system, in accordance with an embodiment of the present invention. Included in the production location 800 are three servers 801, 803, and 805. Each server may be its own computing device, or a group of computing devices that appear as a single server. Each server may be at a central location or distributed geographically.

Included in the server, such as server-1 801 are one or more "data sources." A data source, as used herein, is a high level of abstraction of application data operated on by the data protector. A data source exposes its physical data as one or more protectable objects and the data source itself may be a protectable object. A data source is contained within a single server and a server may contain one or more data sources. For example, server-1 801 includes two data sources, data source 1 (DS1) 807 and data source 2 (DS2) 821.

Likewise, data source 1 807 contains six protectable objects 809, 811, 813, 815, 817, and 819. Similarly, data source 2 821 contains two protectable objects 823 and 825. In addition to data sources containing protectable objects, the data sources themselves may be protectable objects. Still further, protectable objects may contain other protectable objects. For example, data source 3 835 contains eight protectable objects 827, 829, 831, 833, 837, 839, 841, 843. Protectable object 837 contains protectable object 839, which contains protectable objects 841 and 843.

Server-3 805 contains four data sources, data source 4 (DS4) 845, data source 5 (DS5) 851, data source 6 (DS6) 857, and data source 7 (DS7) 859. Each of the four data sources 845, 851, 857, and 859 may be protectable objects. Contained within data source 4 845 are two protectable objects 847 and 849. Data source 5 851 contains two protectable objects 853 and 855, data source 6 857 contains no protectable objects, and data source 7 859 contains two protectable objects 861 and 863.

Each protectable object is of a particular protectable object type that allows the data protection system to expose the protectable objects in each data source at different levels of granularity. For example, the data protection system may expose an Exchange Storage Group data source in its entirety as a protectable object, with a protected object type of storage group. It may also divide up the same storage group data source into multiple protectable objects, each protectable object having a protectable object type of database. There may even be two or more different protectable object types for the same protectable object. For example, the data protection system may expose a volume at the block level as a protectable object of one protectable object type, and at the file level as a protectable object of another protectable object type.

Examples of data sources include, but are not limited to, operating systems, system volumes, Exchange Storage Groups, SQL databases, etc. Examples of protectable object types for the server include, but are not limited to, system protected files and operating system data stores, such as the registry and active directory. The file system volume protectable object types include, but are not limited to, directories and files. File system volume entities may be located by file share or DFS linked target Namespace Elements. The protectable object types for the Exchange Storage Group include, but are not limited to, databases and mailboxes.

As discussed above, each selectable Namespace Element maps to one or more protectable objects, such as protectable objects 801-863 (FIG. 8). Each protectable object is of a protectable object type and each protectable object is within a single data source. Additionally, each data source is within a single server of a production location.

Figure 9A:
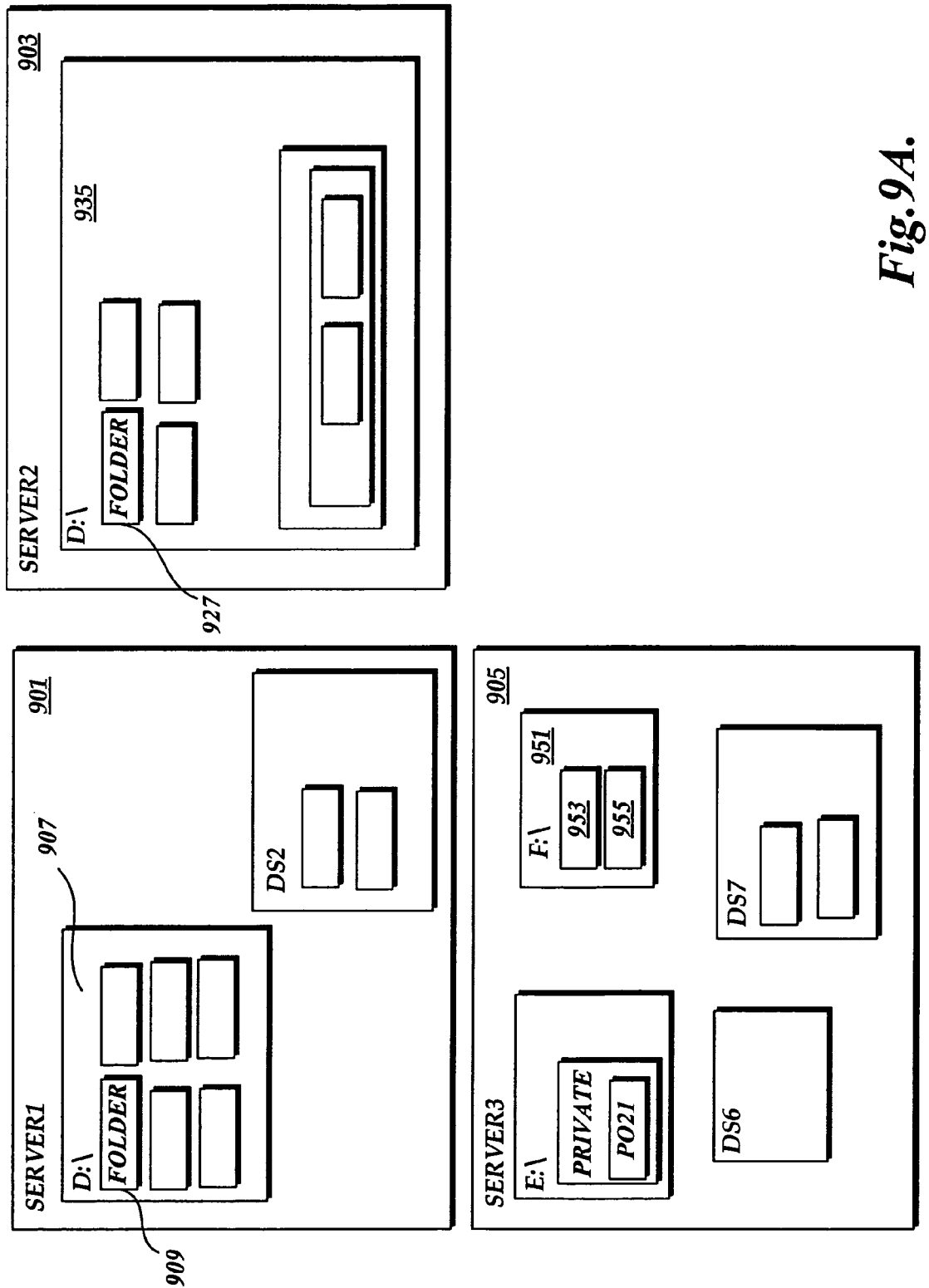
FIGS. 9A-9B are block diagrams of protectable objects at a production location and the grouping of protectable objects into a protected group, in accordance with an embodiment of the present invention.
Figure 9B:
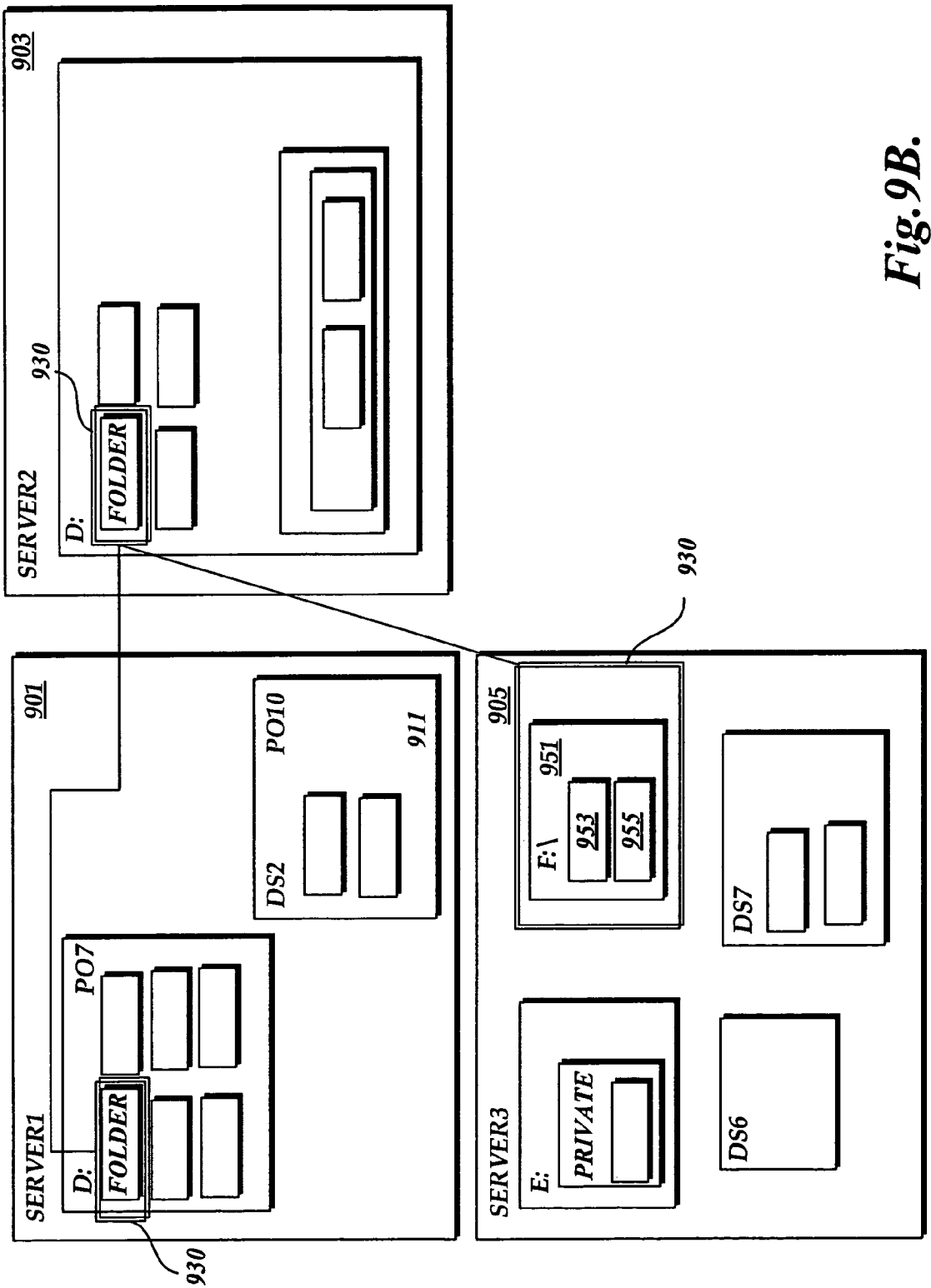

Referring once again to the example of a user selecting the Namespace Element \\ABCD\PUBLIC 405 (FIG. 4) and continuing with the mapping of that Namespace Element to the protectable objects, as described with respect to FIGS. 5 and 7, the mapping of those protectable objects and the association into a protected group will be described with respect to FIGS. 9A-9B, in accordance with an embodiment of the present invention.

From the user's perspective, a protected group's members are defined by Namespace Elements that the user has selected and added to the protected group, as well as protectable objects added as a result of auto discovery groups (described below). Additionally, the data protection system will allow a user to see which protected objects each Namespace Element in a protected group maps to and the state of each of those protected objects.

Referring back to the previous example, the Namespace Element \\ABCD\PUBLIC 405 maps to three different protectable objects: D:\folder on server1 507, D:\folder on server2 509, and F:\on server3 511. Following through with the mapping described with respect to FIG. 7, and referring to FIG. 9A, D:\folder on server1 507 refers to folder 909 contained within data source D:\907 on server1 901. D:\folder on server2 509 refers to folder 927 contained on data source D:\935 on server2 903. Finally, F:\on server3 511 refers to data source F:\951 on server3 905. Referring to FIG. 9B, selection of Namespace Element \\ABCD\PUBLIC 505 maps to the protected objects described with respect to FIG. 9A and those objects are associated with a protected group 930. As discussed above, protectable objects that are contained in a selected protected object may be automatically included in the protected group. For example, selection of \\ABCD\PUBLIC 505 which maps to, in part, F:\951 on server3 905 would include the additional protectable objects 953 and 955, as they are contained within protected object F:\951 on server3 905. As illustrated in FIG. 9B, a protected group 930 may contain protected objects located on different servers, such as server1 901, server2 903, and server3 905.

Figure 10:
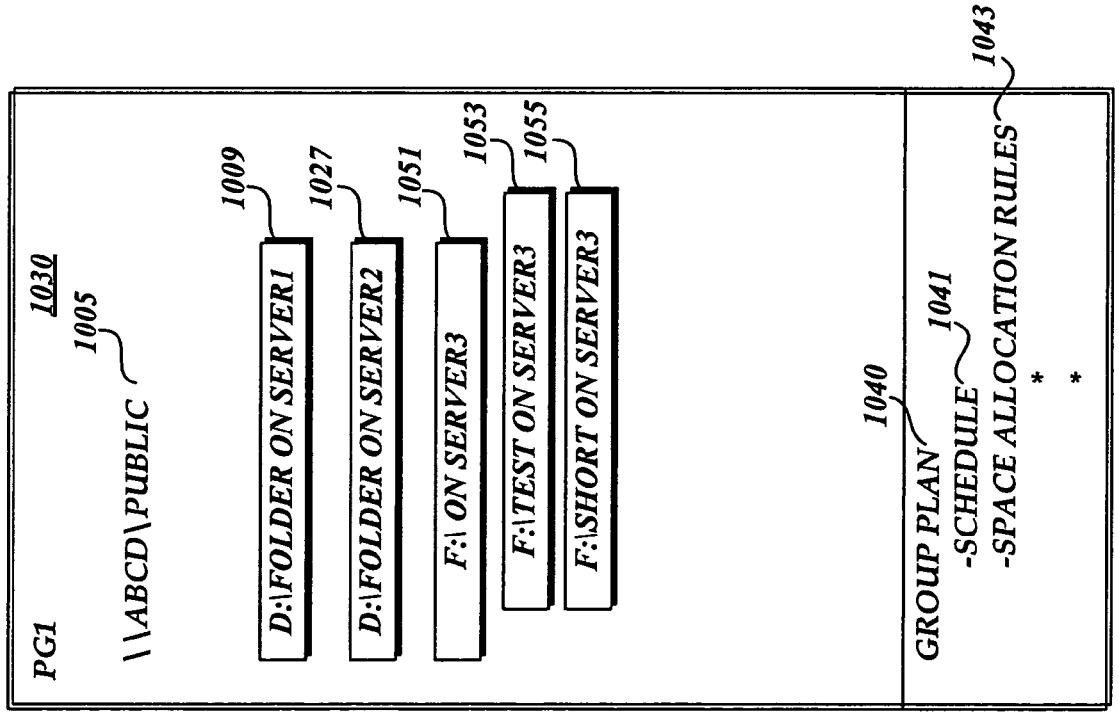
FIG. 10 illustrates a block diagram of a protected group containing the selected Namespace Elements, the mapped protected objects, and the protected group's properties, in accordance with an embodiment of the present invention.

FIG. 10 illustrates a block diagram of a protected group containing the selected Namespace Elements, the mapped protected objects, and the protected group's properties, in accordance with an embodiment of the present invention. In particular, protected group 1030 contains the Namespace Element \\ABCD\PUBLIC 1005, each of the mapped, protected objects described with respect to the previous example, and the protected objects contained within the selected protected objects. In particular, protected group 1030 includes the protected objects of D:\folder on server1 1009, D:\folder on server2 1027. Additionally, protected group 1030 includes the protected object F:\on server3 1051, and the two protected objects 1053, 1055 contained within protected object F:\on server3 1051.

Each protected group, such as protected group 1030, includes a group plan 1040 that may include a schedule 1041, space allocation rules 1043, etc. The group plan includes the jobs and other information for protecting the group. Protected groups collect protected objects for operational simplicity. All protected objects in the protected group share the same group plan generated from the same collection of protection intents.

In summary, a protected group includes one or more protected Namespace Elements. Each protected Namespace Element locates one or more protectable objects. Protectable objects are, in turn, located on data sources. A data source may be a member of at most one protected group. During protection, the protected group mappings are periodically reevaluated to identify newly discovered protectable objects that should potentially be included in the protected group itself and to detect changes in the logical path to a protected object. This periodic evaluation, described below, is accomplished using auto discovery groups.

With reference now to FIGS. 11, 12, 13, 16, 23B, 25, 26, 27, 28, 29, 30, 31, 32, 33, 34, 35, 36, 38, 39, 41, 48A, 48B, 48C, 49A, 49B, 49C, 52, 53, 54, 55, 56, 57, 58, and 59, different routines implemented by embodiments of the present invention will be described. One skilled in the relevant art will appreciate that the routines may be implemented on a single computing device, such as a server, or distributed to a number of computing devices. FIGS. 11, 12, 13, 16, 23B, 25, 26, 27, 28, 29, 30, 31, 32, 33, 34, 35, 36, 38, 39, 41, 48A, 48B, 48C, 49A, 49B, 49C, 52, 53, 54, 55, 56, 57, 58, and 59 illustrate blocks for performing specific functions. In alternative embodiments, more or fewer blocks may be used. In an embodiment of the present invention, a block may represent a software program, a software object, a software function, a software subroutine, a software method, a software instance, a code fragment, a hardware operation, or a user operation, singly or in combination.

Figure 11:
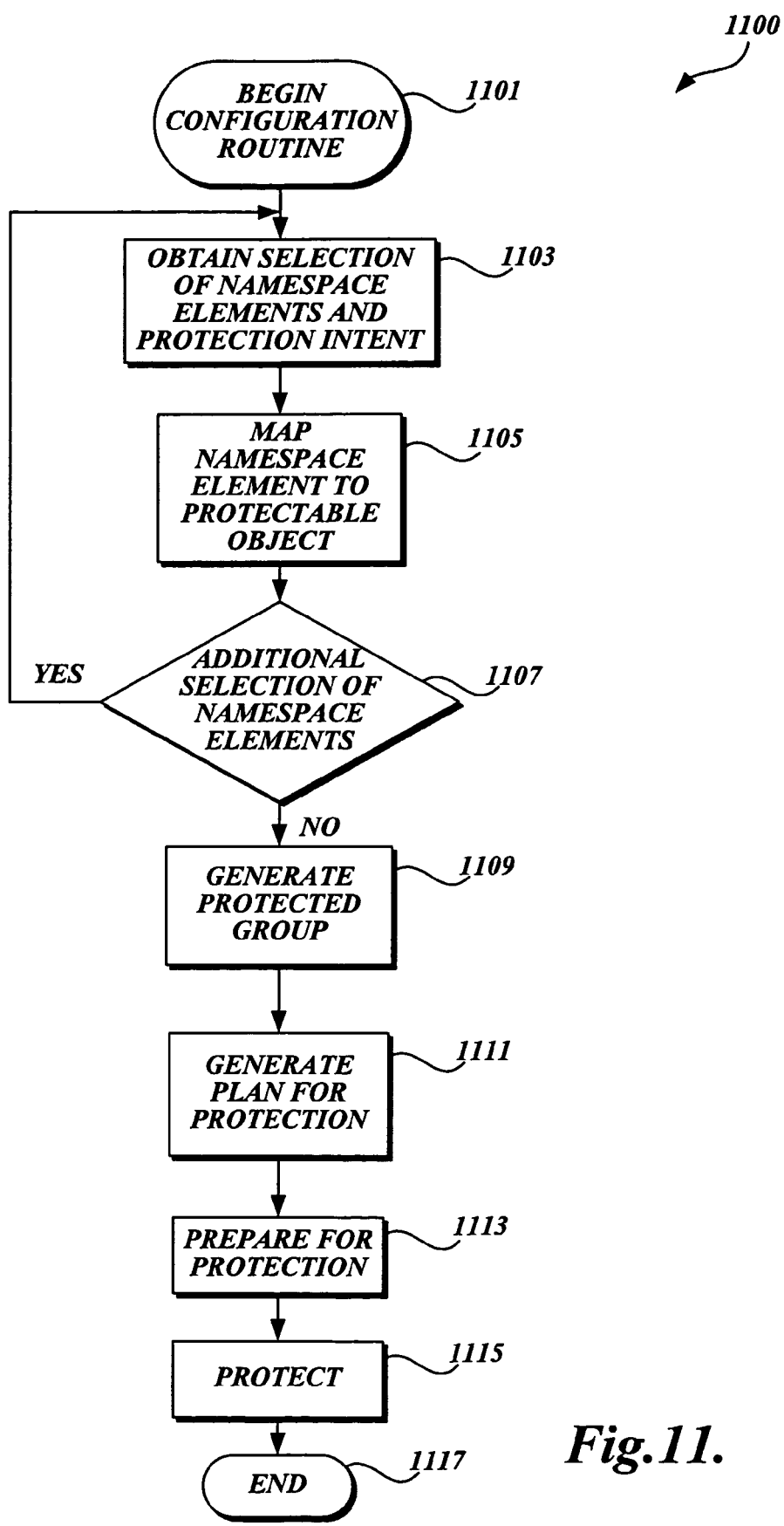
FIG. 11 is a flow diagram of a configuration routine for configuring a plan for protecting a protected group, in accordance with an embodiment of the present invention.

FIG. 11 is a flow diagram of a configuration routine for configuring a plan for protecting a protected group, in accordance with an embodiment of the present invention. Configuration routine 1100 begins at block 1101 and at block 1103 the routine obtains a selection of Namespace Elements and protection intents from a user interfacing with a user interface. As will be described below, a user may select multiple Namespace Elements for protection. The provided protection intents are applied to all of the selected elements. In block 1105 the selected Namespace Elements are mapped to the appropriate protectable objects.

At decision block 1107, it is determined whether additional Namespace Elements have been selected to be included with the previously selected Namespace Elements. If it is determined at decision block 1107 that additional Namespace Elements have been selected, the routine returns to obtaining the selected Namespace Elements at block 1103. However, if it is determined at decision block 1107 that there are no additional Namespace Elements, at block 1109 the data protector generates a protected group for the selected Namespace Elements which will be used for protecting the associated protectable objects that were mapped at block 1105. The protectable objects added to the protected group become protected objects.

At block 1111, a group plan for protection is generated based on the protection intents provided by a user at block 1103. A group plan for protection may include a frequency of protection and the type of protection desired. Examples of protection types include, but are not limited to "background protection," "backup protection," and archive protection. Background protection refers to a protection type where protection is nearly continuous (e.g., copies are updated every hour, 24 hours a day, seven days a week). Backup protection refers to a protection type where protection is scheduled to occur a particular instances in time (e.g., once a night, every night). The group plan is applied to all protected objects of the protected group. Generation of a group plan is described in detail below and referred to as "intent translation" (FIGS. 31-34).

At block 1113, the production location containing the protected objects and the storage location where the copy of the objects will be stored is prepared for protection. For example, the data protector makes an initial copy of the data that is stored at the storage location and validated for accuracy. After protection has proceeded, as illustrated by block 1115, and the protected objects associated with the selected Namespace Elements have been copied and stored the routine ends at block 1117.

Figure 12:
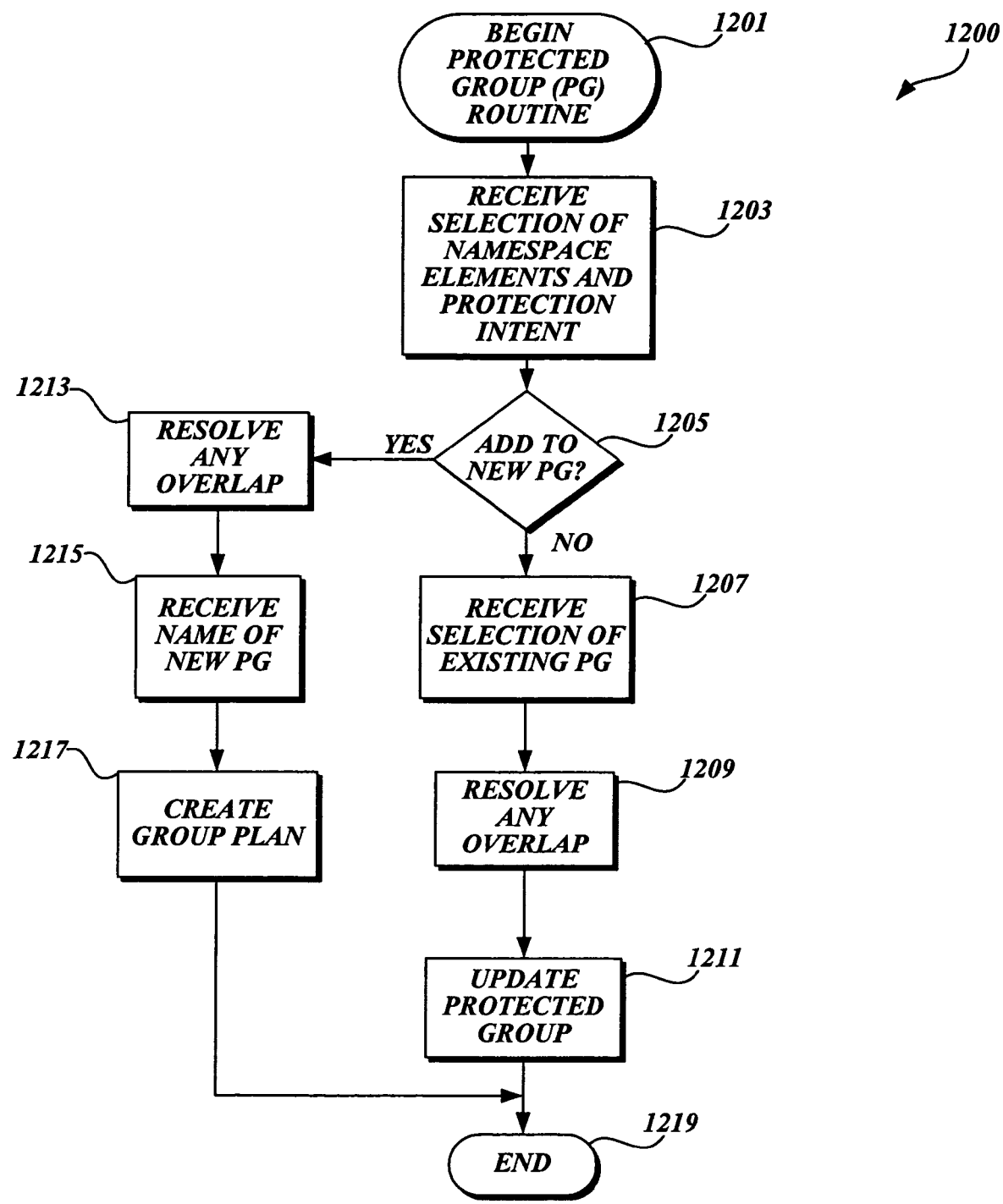
FIG. 12 illustrates a protected group creation routine that describes in more detail the creation of a protected group, according to an embodiment of the present invention.

FIG. 12 illustrates a protected group creation routine that describes in more detail the creation of a protected group referred to at block 1109 (FIG. 11), according to an embodiment of the present invention. The protected group creation routine 1200 begins at block 1201, and at block 1203 a selection of Namespace Elements for which protection is to be performed is received. Additionally, the protection intents for the selected Namespace Elements are also received. At decision block 1205 it is determined whether the received Namespace Elements are to be added to a new protected group or whether they are to be included within an existing protected group. If it is determined that the Namespace Elements are not to be added to a new protected group, at block 1207 a selection of the existing protected group to which the Namespace Elements are to be included is obtained.

Figure 13:
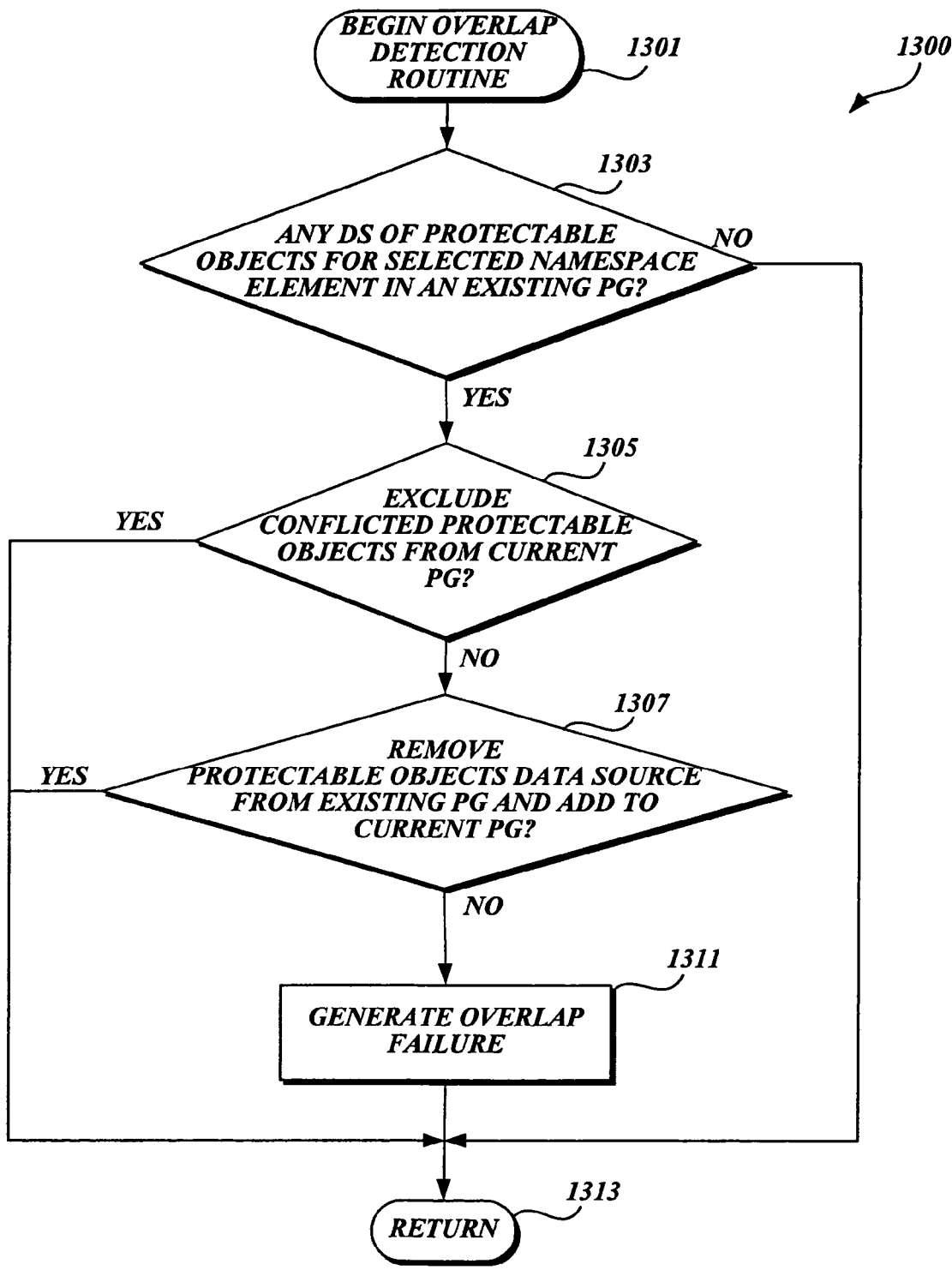
FIG. 13 illustrates an overlap detection routine for detecting overlap of data sources contained in two or more protected groups, in accordance with an embodiment of the present invention.

At block 1209 overlap of data sources associated with the Namespace Elements is resolved, as described in more detail below (FIG. 13). Finally, at block 1211 the existing protected group is updated to include the additional Namespace Elements and the associated protectable objects. Additionally, a user may have the option of changing the group plan for the protected group.

Referring back to decision block 1205, if it is determined that the received Namespace Elements are to be added to a new protected group, at block 1213 any overlap of the data sources associated with those Namespace Elements is resolved. At block 1215 a name for the new protected group is received. In one example, the name of the new protected group may be provided by a user through the user interface. Alternatively, the name for the protected group may be generated automatically by the data protection system itself. At block 1217 a group plan is created for the protected group dependent upon the protection intents provided previously to the data protection system. At block 1219 the routine of creating a protected group completes.

FIG. 13 illustrates an overlap detection routine, corresponding to blocks 1209 and 1213 (FIG. 12), for detecting overlap of data sources contained in two or more protected groups, in accordance with an embodiment of the present invention. The overlap detection routine 1300 begins at block 1301 and at decision block 1303 it is determined if the containing data source of any protectable objects associated with the selected Namespace Element is currently contained in another protected group (existing protected group). If it is determined that there are no data sources containing the protectable objects associated with the selected Namespace Element contained in an existing protected group, the routine ends at block 1313 and returns control to the appropriate routine, such as the protected group creation routine 1200 (FIG. 12).

However, if it is determined that a containing data source of a protectable object associated with the selected Namespace Element is contained in an existing protected group (i.e., overlap), at decision blocks 1305-1307 a determination is made as to how the detected overlap is to be resolved. In an actual embodiment of the present invention, resolution of overlap is dependent upon a user's determination. For example, if an overlap is detected, a user may be provided with the option of excluding the protectable object of the overlapping data source ("conflicted protectable object") from the current protected group (1305), or removing the data source containing conflicted protectable object causing the overlap from the existing protected group and adding it to the current protected group (1307). In an alternative embodiment, a global policy may be provided by a user for resolving overlaps that is used for progressing through the overlap detection routine 1300. In yet another embodiment, attempts to add a protectable object to a protected group that will cause overlap will result in a failure.

At decision block 1305 a determination is made as to whether the conflicted protectable object is to be excluded from the protected group to which it is presently being added (current protected group). If it is determined at decision block 1305 that the conflicted protectable object is to be excluded from the current protected group, that protectable object is removed from the current protected group but remains in the existing protected group which caused the conflict, and the overlap detection routine returns control to the initiating routine, as illustrated by block 1313.

If it is determined at decision block 1305 that the conflicted protectable object is not to be excluded from the current protected group, the routine determines at decision block 1307 whether to remove the protectable object's data source and all protected objects contained within that data source from the existing protected group and add the removed data source, the removed protected objects, and the conflicted protectable object to the current protected group. If the data source and contained protected objects are removed from the existing protected group and added to the current protected group, the routine completes at block 1313 returning control to the appropriate routine from which it came.

If it is determined at decision block 1307 that the conflicted protectable object's data source and all contained protected objects are not to be removed from the existing protected group and added to the current protected group, the overlap protection routine 1300 generates an overlap failure, as illustrated by block 1311 and completes at block 1313.

Figure 14:
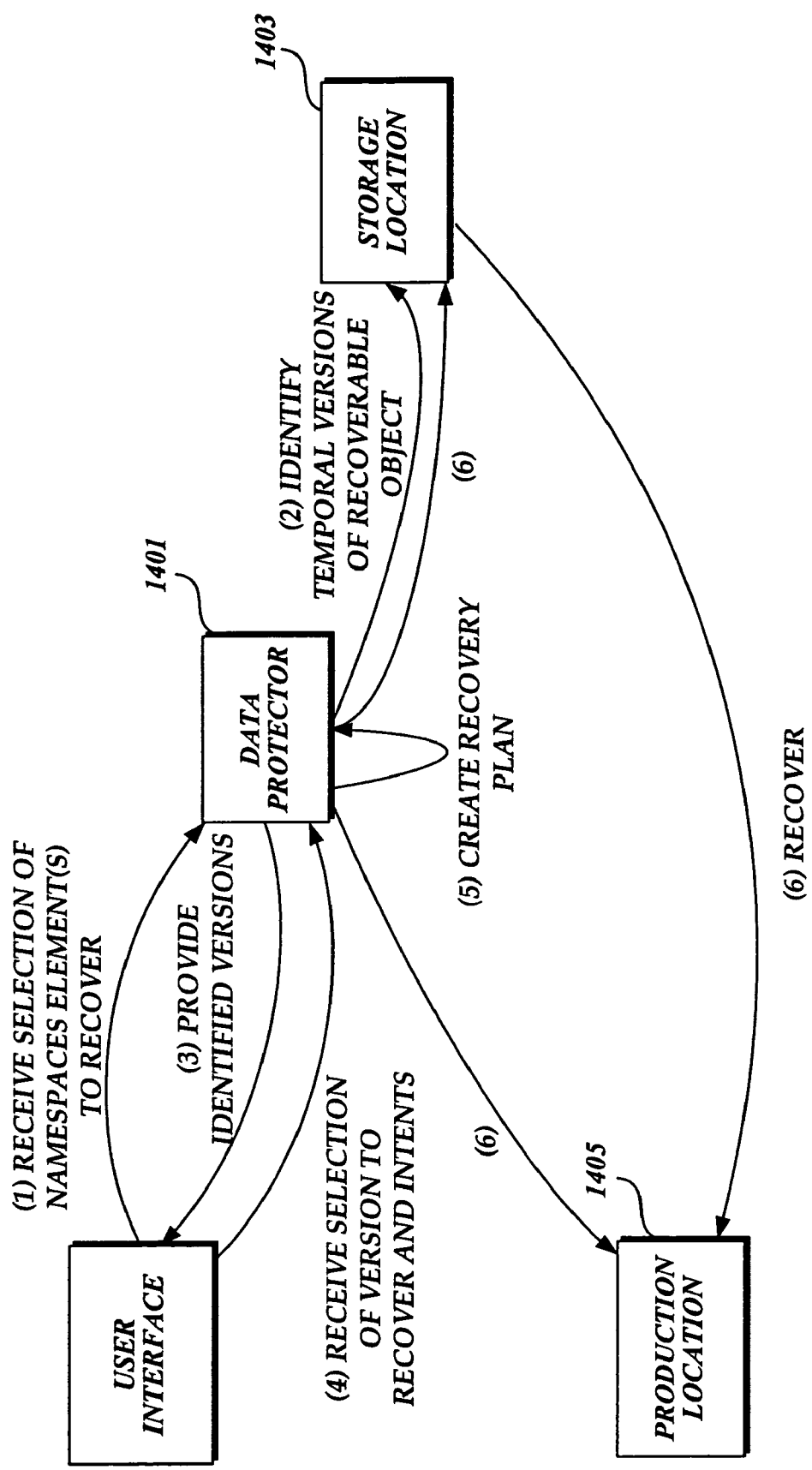
FIG. 14 is a flow diagram of a data protection system illustrating the flow of a recovery process for recovering a protected object, in accordance with an embodiment of the present invention.

Similar to a user being able to protect physical objects (protectable objects) stored on a production location by selecting Namespace Elements representative of those protectable objects, a user may also recover physical objects (recoverable objects) by selection of Namespace Elements representative of the physical objects to be recovered. FIG. 14 is a flow diagram of a data protection system illustrating the flow of a recovery process for recovering a protected object, in accordance with an embodiment of the present invention. To recover objects, a user selects one or more Namespace Elements representative of protected objects that are to be recovered. The data protector 1401, in response to receiving a selection of a Namespace Element, then queries the storage location 1403 to identify the temporal versions of recoverable objects associated with the selected Namespace Elements provided by the user. In an alternative embodiment, it may not be necessary to query the storage location 1403 to identify the temporal versions. For example, for recovery from archive the data protector 1401 may identify the temporal versions by searching a catalog or database that contains information identifying the temporal versions that are available. The identified temporal versions are synthesized and provided to a user as a representation of points in time to which data may be restored.

A user selects a point in time to recover to and provides recovery intents for that point in time. Examples of recovery intents are discussed in more detail below. Upon receipt from a user as to what is to be recovered and the corresponding recovery intents, a recovery plan is created and executed by the data protector 1401 and the appropriate recoverable objects located on storage location 1403 are recovered and transmitted to the production location 1405.

Figure 15:
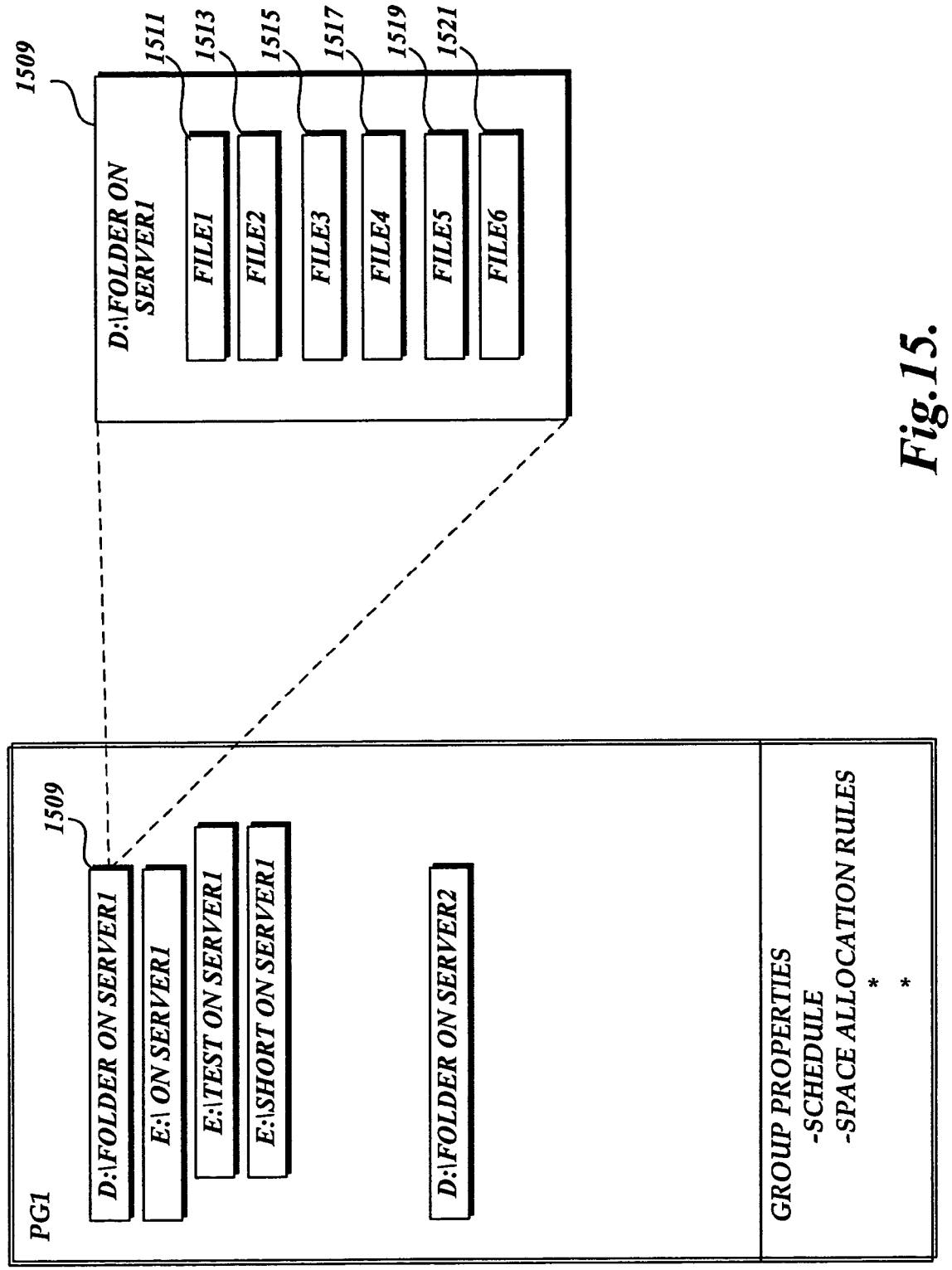
FIG. 15 is a block diagram illustrating a more detailed view of recoverable objects that may be contained on a storage location, according to an embodiment of the present invention.

FIG. 15 is a block diagram illustrating a more detailed view of recoverable objects that may be contained on a storage location 1403, according to an embodiment of the present invention. In general, recovery takes a damaged or missing protected object (or portions thereof) back to a previous temporal version. Temporal versioning may be discrete or nearly continuous. Discrete temporal versions arise from persisting point-in-time full copies of protected objects. Recovery of a discrete temporal version may require only restoration of the protected object or may require additional recovery processing after restoration. Nearly continuous temporal versions arise from persisting point-in-time copies of a log associated with the protected object. The recovery occurs by a roll forward application of the log. In an embodiment of the present invention, the roll forward may be stopped at any point in time contained within the log.

Recoverable objects, as described herein, represent the possibilities for recovery of a protected object. Each recoverable object can be generated from one or more recovery sources. A recovery source may be located on a temporal version associated with a replica, within a replica, on an archive tape, or an archived copy on a disk.

Referring now to FIG. 15, a protected object 1509 may contain one or more recoverable objects 1511, 1513, 1515, 1517, 1519, 1521. In general, recoverable objects may be finer grained than protected objects. For example, a protected object may be a folder, such as D:\folder on server1 1509. That protected object 1509 may contain multiple recoverable objects. For example, the protected object D:\folder on server1 1509 may contain six recoverable objects, including file1 1511, file2 1513, file3 1515, file4 1517, file5 1519, and file6 1521. Additionally, the protected object 1509 is also a recoverable object.

The original choice of a protected object and protection method often determines the available recoverable objects and/or the work required for recovery. For example, if the protected object is an Exchange Storage Group containing databases that contain mailboxes, all databases within that storage group may be implicitly protected. Either the full storage group or one or more of the databases may be recovered and are thus recoverable objects. If the protection is performed by archive only (described below) and no replication, mailbox recovery is likely very time consuming (expensive). If the protection is performed by replication as well as archive, mailbox recovery from the replica may be substantially faster (cheaper).

If the protected object is a database of a storage group, the storage group may not be entirely protected but mailboxes contained within the selected database are protected. However, if the protected object is a mailbox, there may not be implicit protection of the associated database or the storage group. If protection is performed by archive only and no replication, the archive is unlikely to be able to restore anything other than the selected mailbox. Alternatively, if the mailbox is known to be part of a database that is replicated as part of a different protected group, mailbox recovery could occur from the replica of the other protected group and not the archive media.

Figure 16:
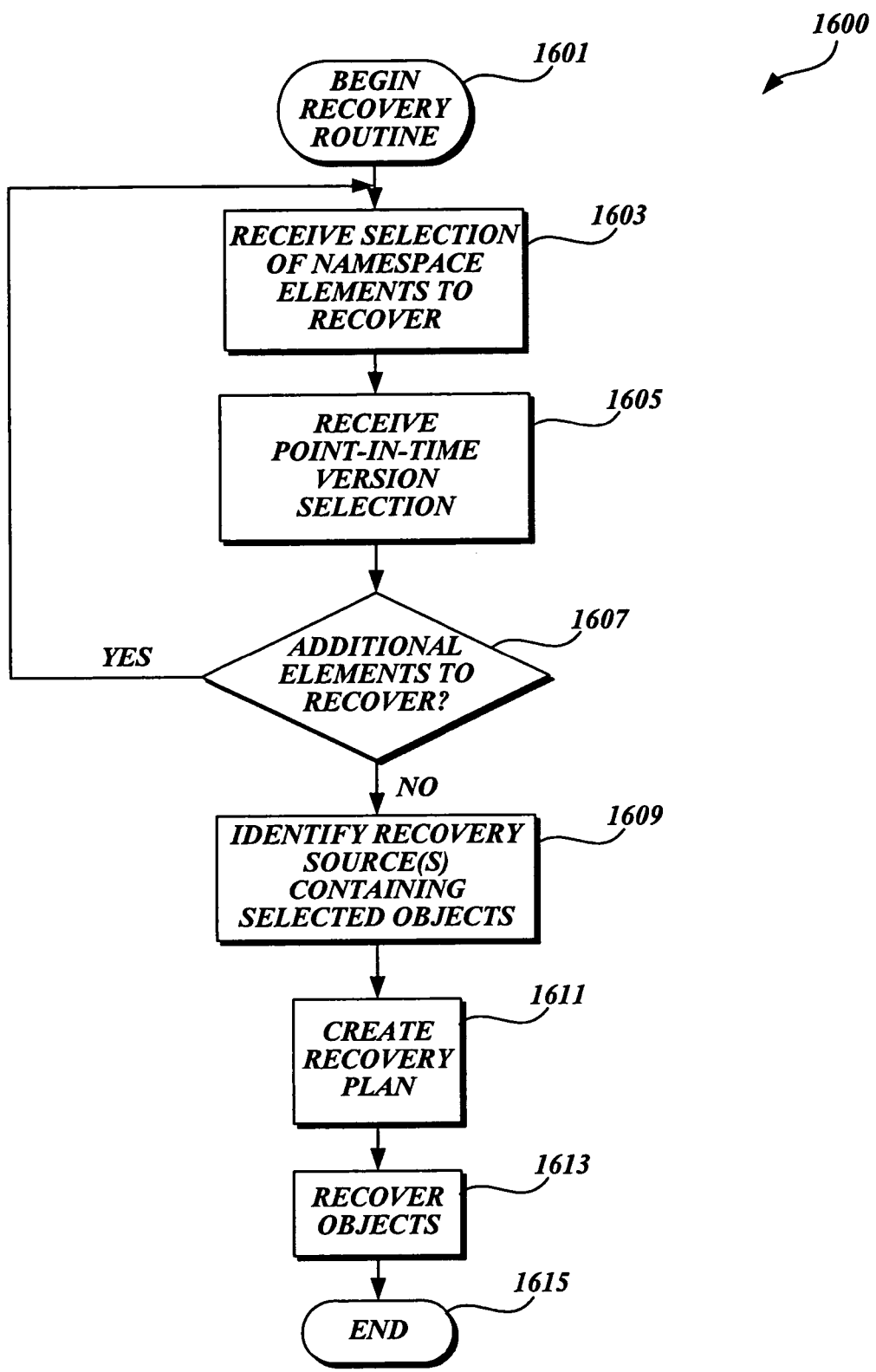
FIG. 16 illustrates a recovery routine for recovering protected objects from a storage location, in accordance with an embodiment of the present invention.
Figure 17:
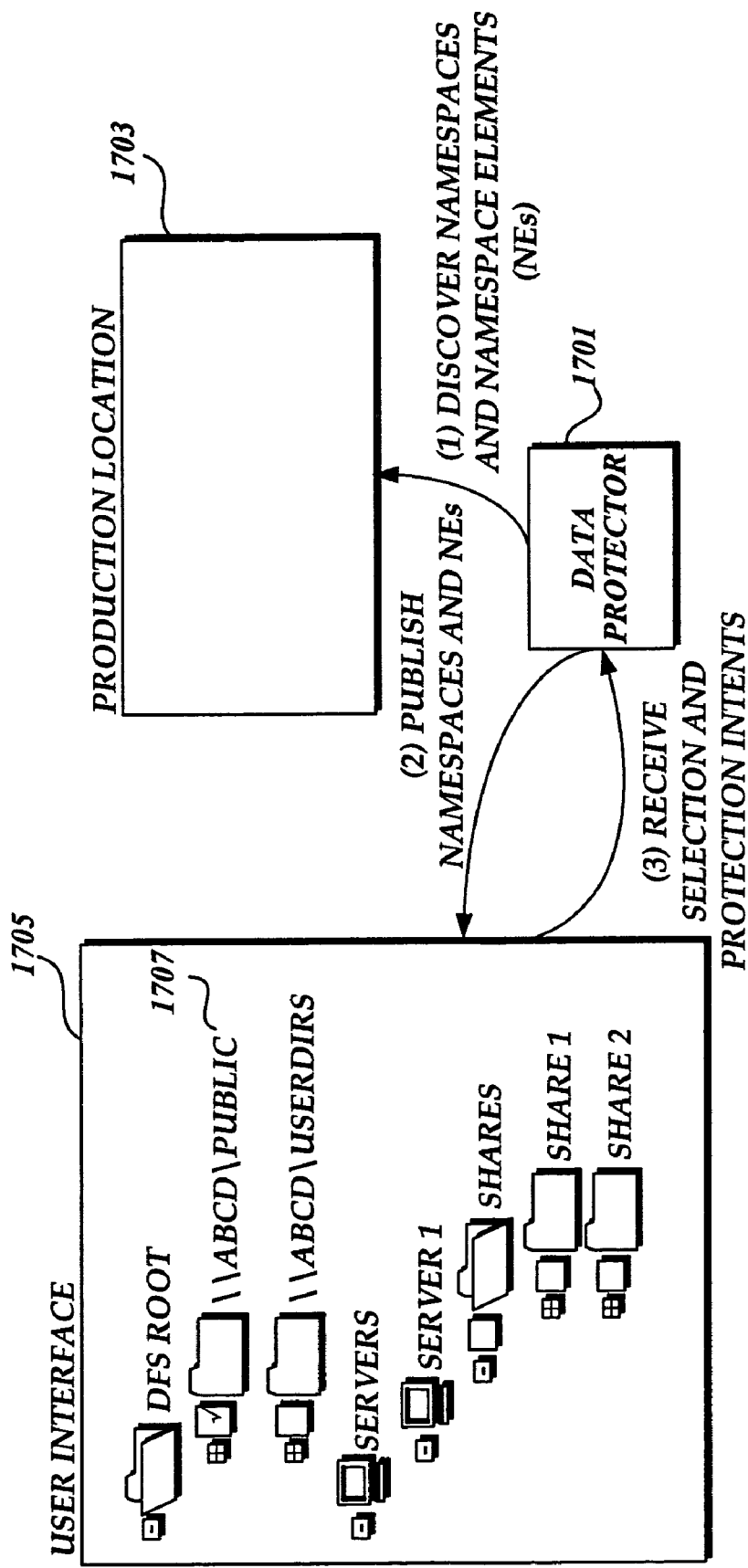

FIG. 16 illustrates a recovery routine for recovering protected objects from a storage location, in accordance with an embodiment of the present invention. The recovery routine 1600 begins at block 1601 and at block 1603 a selection of Namespace Elements to recover is received from a user interfacing with the Namespace Elements displayed on a user interface. A user may also provide recovery intents for the data that is to be recovered. At block 1605 a selection of a particular point-in-time version for which data is to be recovered is received. In an embodiment of the present invention, a user provides a point-in-time for which recovery is to occur. In another embodiment, temporal versions may be identified for the selected namespace elements and provided to a user for selection.

At block 1607 it is determined whether additional elements have been selected for recovery. If it is determined that additional elements have been selected for recovery, the routine returns to block 1603 and receives a selection of those additional Namespace Elements to recover. However, if it is determined that there are no additional elements to recover, at block 1609 the recoverable objects are mapped to the appropriate recovery sources located on a storage location utilizing the mapping schema discussed above and the received recovery intents.

Upon identification of the necessary recovery sources, a recovery plan is created at block 1611. The recovery plan includes the process for synthesizing the required point-in-time versions of recoverable objects from the appropriate recovery sources. At block 1613 the plan is executed and the identified recoverable objects are recovered. At block 1615 the recovery routine ends.

As mentioned above, in addition to creating protected groups, the data protection system also generates auto discovery groups and saved searches. Auto discovery groups and saved searches provide an automated means to inform a user of changes to a production location. For example, changes may include addition or deletion of computing devices, such as servers, Exchange Storage Groups, databases, volumes, and shares, as well as changes in the mappings between Namespace Elements and protectable objects. Providing a user with notification of production location changes enables a user to take appropriate action to protect new data that needs to be protected and adjust their protection strategies when data has been relocated or removed.

Auto discovery groups are a mechanism for describing what should be protected as a query rather than as a discrete set of physical resources. For example, suppose an organization names all file servers as \\FILESRV*, such as \\FILESRV1, \\FILESRV2, etc. A user for that organization can create an auto discovery group that periodically searches for all shares on any server named \\FILESRV*. The auto discovery group will find all such shares and allow the user to either select or reject protection of any protectable object located or associated with those shares. Additionally, in an embodiment of the present invention, the auto discovery group may be reevaluated periodically and the user notified of any new shares and given the opportunity to either approve or reject protection of those new shares. Still further, reevaluation identifies any existing shares that have been removed and provides a user with a notification of the removal.

Auto discovery groups may also be used by the data protector to track the mapping between Namespace Elements and protectable objects. Referring again to the above example, suppose a user protected the path \\ABCD\PUBLIC. The data protection system automatically generates an auto discovery group containing the name \\ABCD\PUBLIC and a mapping to its protected objects such as D:\folder on server1, D:\folder on server2, and F:\folder on server31. If, in the future, \\ABCD\PUBLIC is changed to refer to different folders, either on the same server or different server, then the user would be informed by the data protector of the change and given the opportunity to adjust the protection.

FIGS. 17-24 illustrate a flow diagram for creating and utilizing an auto discovery group, in accordance with an embodiment of the present invention. For purposes of explanation for FIGS. 17-24, we will assume that a data protection system has just been installed at a workplace containing several servers (illustrated as the production location 1703) for which protection is desired.

Upon initialization of the data protection system 1700, the data protector 1701 queries the production location 1703 to identify Namespaces and Namespace Elements representative of protectable objects that are contained within the production location. The data protector 1701 publishes the Namespaces and Namespace Elements to a user via a user interface 1705 in the form of a hierarchical view of Namespaces and contained Namespace Elements for interaction and selection by the user.

A user, interacting with the user interface 1705, may select one or more Namespace Elements for protection, such as \\ABCD\PUBLIC Namespace Element 1707. In addition to selecting Namespace Elements for protection, a user provides protection intents identifying how the user wants to have the associated protectable objects protected. Selected Namespace Elements and an indication of protection intents are returned to the data protector 1701.

Figure 18:
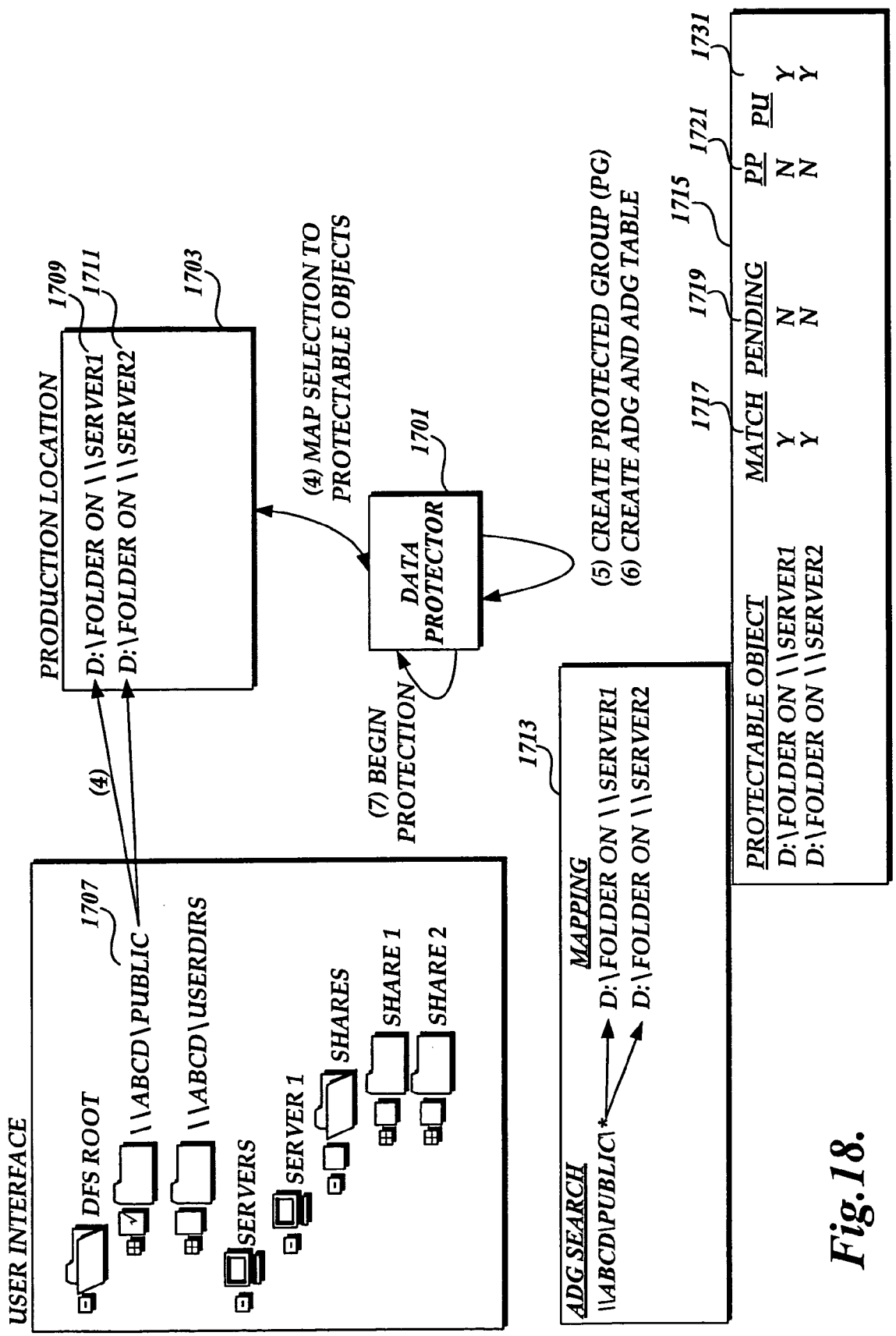
Figure 19:
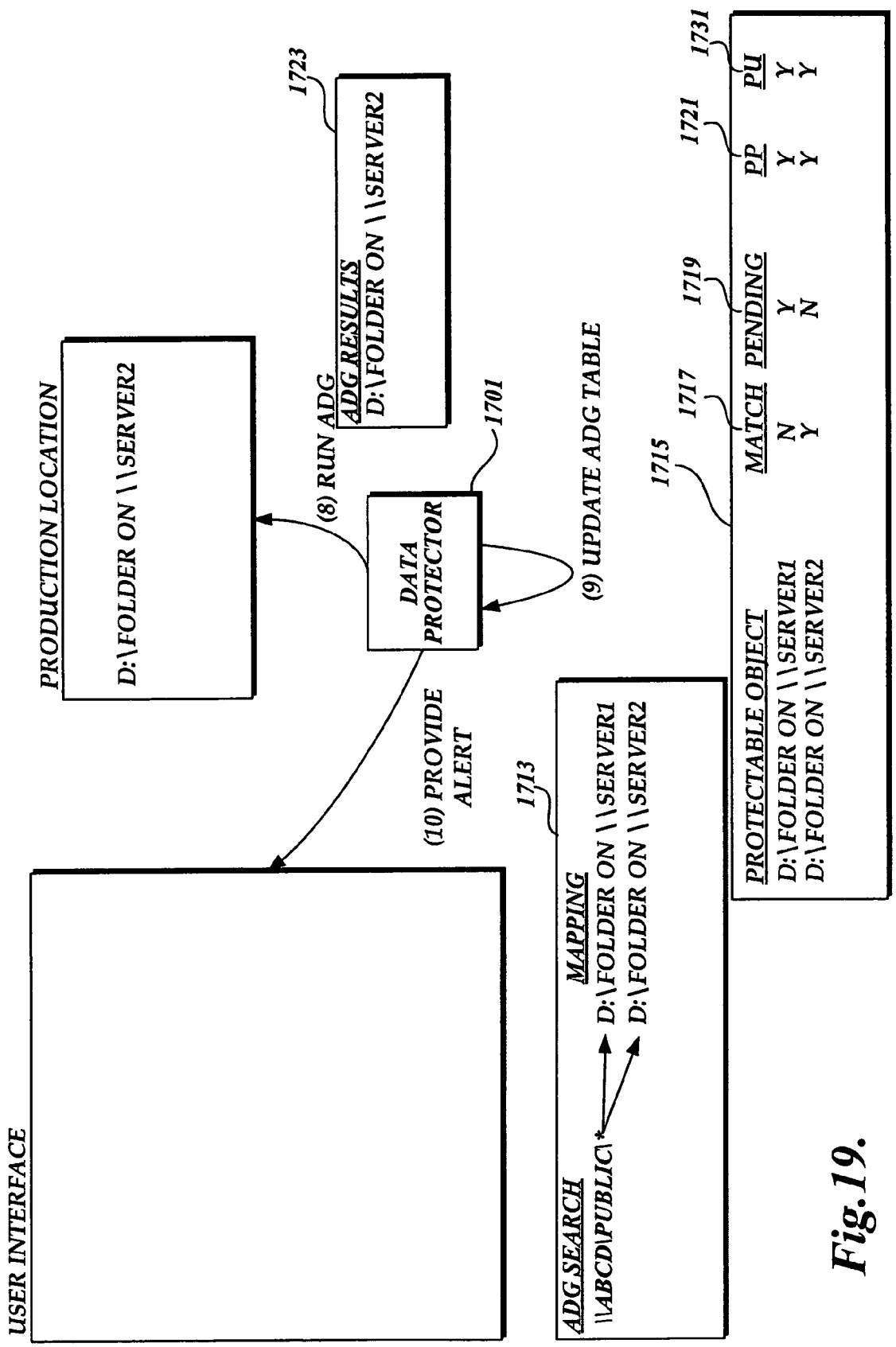

Referring now to FIG. 18, the data protector 1701 maps the selection of Namespace Elements to the protectable objects located on the production location 1703. For example, upon selection of Namespace Element \\ABCD\PUBLIC 1707, the data protector maps that Namespace Element to the protectable objects, utilizing the Namespace schema, as described above. That mapping identifies that the Namespace Element \\ABCD\PUBLIC 1707 maps to protectable object D:\folder on server1 1709 and protectable object D:\folder on server2 1711. In an alternative embodiment, during initial discovery of Namespace Elements the elements may be mapped to corresponding protectable objects at that time.

The data protector 1701 creates a protected group that contains the selected Namespace Elements, an identification of the protectable objects, which become protected objects, an auto discovery group 1713, and an auto discovery group table 1715. As discussed, based on the intents provided by the user, the protected group also includes a group plan that describes how the protected group is to actually be protected. The auto discovery group 1713 includes a Namespace search parameter, such as \\ABCD\PUBLIC\* and the current mapping of that Namespace Element to the protected objects D:\folder on server1 and D:\folder on server2. Creating an auto discovery group 1713 that contains a Namespace search parameter for a selected Namespace Element provides the data protector with the ability to subsequently search for additions, deletions, and remappings to the production location that match the Namespace search parameter. Any such changes are reported to a user, via an alert, as they may be of interest for protection. Alerts may be provided to the user in a variety of forms. For example, the alert may be provided via the user interface, e-mail, page, voice message, etc.

In addition to creating an auto discovery group 1713, the data protector 1701 creates an auto discovery group table 1715 that includes an identification of the current mapping to protected objects, and information concerning those protected objects. In particular, the information includes whether the mapping to the protected object matches the auto discovery group parameters contained in the auto discovery group 1713 as indicated by match column 1717, whether the protected object is currently pending user action, as indicated by pending column 1719, whether the mapped protected object is currently protected under the group plan as indicated by protected in plan ("PP") column 1721, and whether the mapped protected object is currently protected by the user, as indicated by the protected by user ("PU") column 1731. As discussed below, an object may be protected by a user but not yet protected by the data protection system. For example, a user may indicate that they want to protect a particular object, thereby making that object protected by the user, however, the object may not become protected by the plan until after intent translation has completed for that protected object.

After creation of the protected group, the auto discovery group, the group plan, and the auto discovery group table, the data protection system, in accordance with an embodiment of the present invention, prepares the production location and storage location for protection. After the locations have been prepared for protection (e.g., resources plan), initial steps are performed for creating an initial copy of the selected protectable objects (preparation plan), and then protection begins (protection plan).

At some predetermined times after the selected protected objects are protected, the data protection system runs the auto discovery group and remaps the production location 1703. For example, the auto discovery group may be scheduled to run once per night. Running the auto discovery group at night or at some time when activity at the production location is low, reduces the amount of load that is placed on the production location.

Returning to the example described with respect to FIGS. 17-24, for explanation purposes, the auto discovery group is run and the auto discovery group results 1723 (FIG. 19) identify that the only protectable object matching the auto discovery group search parameters of \\ABCD\PUBLIC\* is the protectable object of D:\folder on server2. The data protector 1701 compares the auto discovery group results 1723 with the auto discovery group table 1715. In this example, it identifies that the protected object of D:\folder on server1 no longer matches the auto discovery group search parameters. D:\folder on server1 may no longer match the search parameters for a variety of reasons. For example, D:\folder on server1 may no longer exist, or D:\folder on server1 is no longer mapped under \\ABCD\PUBLIC.

After comparison, the table 1715 is updated to indicate that the protected object of D:\folder on server1 was not returned in the results and therefore no longer matches the auto discovery group search parameters, as illustrated by the "N" in the match column 1717. Additionally, the auto discovery group table 1715 is updated for the protected object of D:\folder on server1 to indicate that user interaction is currently pending for that protected object, as illustrated by the "Y" in column 1719. User interaction is currently pending because the protected object no longer matches the auto discovery group parameters. D:\folder on server1 remains marked as protected under the plan and protected by the user, as illustrated by the Y in the PP column 1721 and the PU column 1731.

The auto discovery group table 1715 is also updated to indicate that D:\folder on server2 matches the auto discovery group search parameters and remains protected in the plan and by the user, as illustrated by the "Y" in columns 1721 and 1731, respectively. Finally, there is an indication that no user action is pending for the protected object D:\folder on server2 because it does match and it is protected, as illustrated by the "N" in the pending column 1719.

Figure 20:
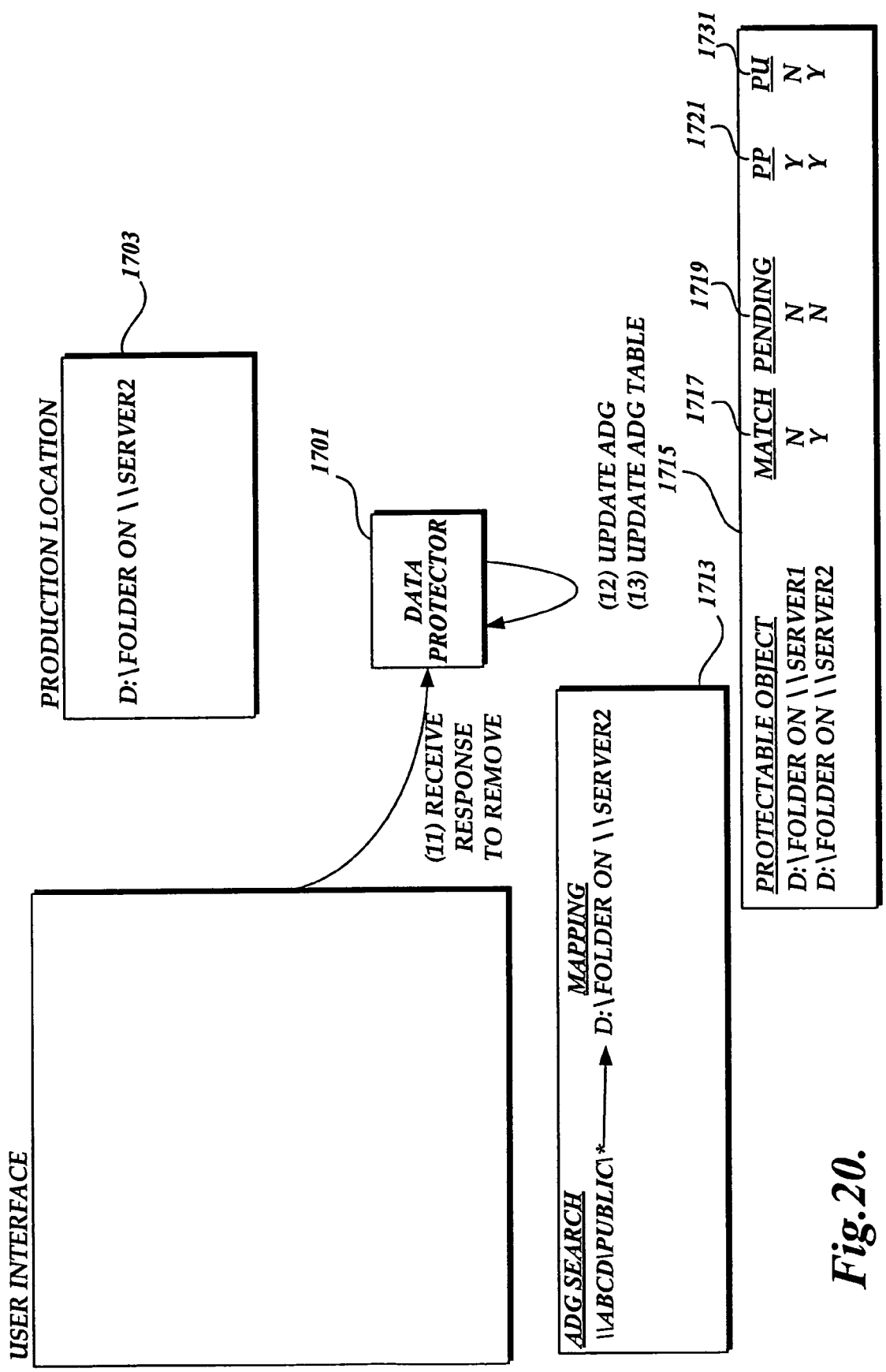

Referring now to FIG. 20, the following morning after the auto discovery group has run, the auto discovery group table has been updated and an alert generated, a user accesses the data protection system and is provided with a notification from the data protection system that the protected object of D:\folder on server1 no longer matches the auto discovery group search parameters.

In response, the data protection system receives an indication from the user to remove the protected object from the protected group. The data protector 1701 updates the auto discovery group thereby removing the mapping of D:\folder on server1 from the protected group and updates the auto discovery group table 1715. In particular, D:\folder on server1 is marked as no longer protected by the user, as illustrated by the "N" in PU column 1731 and marked as no longer pending, as illustrated by the "N" in column 1719. At this point, D:\folder on server1 remains protected by the plan as intent translation has not yet been rerun to remove D:\folder on server1 from the protected group.

The object is maintained in the auto discovery table 1715 and marked as not protected by user so that if it is identified by a subsequent execution of the auto discovery routine it will not be presented to the user as pending approval, as it has already been excluded from protection. Now that the object is no longer protected by the user it becomes a protectable object.

Figure 21:
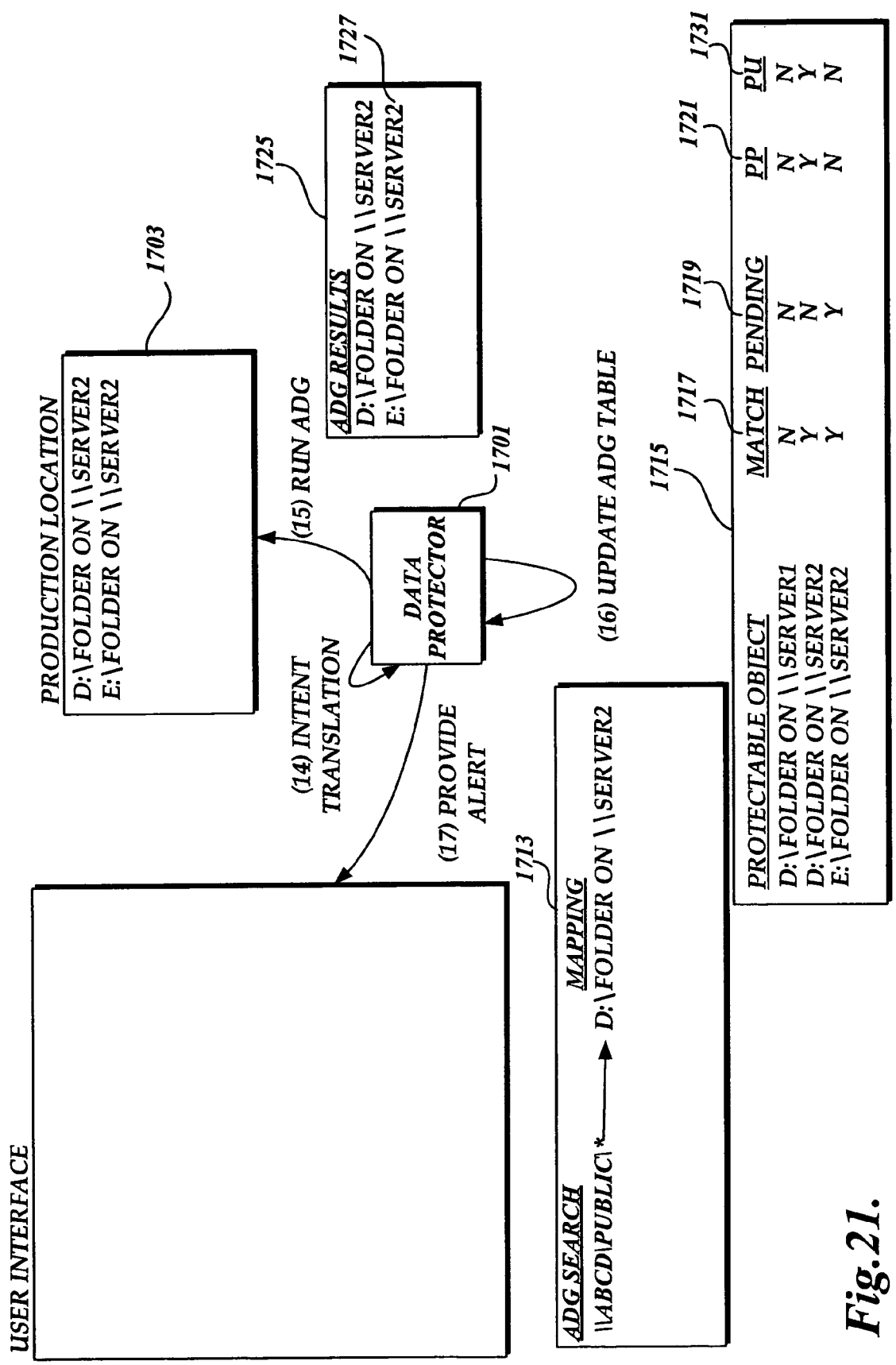

FIG. 21 continues with the previous example, and at some point in time after the user has indicated that they no longer want to protect D:\folder on server1 intent translation is executed. Upon execution of intent translation, the group plan is updated and D:\folder on server1 is removed from the protected group. Even though D:\folder on server1 is no longer protected by the protected group, the existing temporal versions of the protected group remain stored at the storage location and may be utilized to recover D:\folder on server1 up to the point at which it is no longer protected by the plan. Upon completion of intent translation, the auto discovery group table 1715 is updated. In particular, D:\folder on server1 is marked as not protected by plan, as illustrated by the "N" in the PP column 1721.

At some point in time after intent translation has completed, the auto discovery group again executes, queries the production location 1703 and remaps the auto discovery group search parameters to the objects located on the production location 1703. Upon completion of the mapping of the auto discovery group search parameters, the auto discovery group results 1725 are provided and include an indication that the search parameters map to the protected object of D:\folder on server2 and a new protected object of E:\folder on server2 1727. Again, the data protector 1701 compares the results with the auto discovery group table 1715. That comparison indicates that the protected object of D:\folder on server2 again matches the auto discovery group search parameters, is not pending user action, and remains protected by both the user and the group plan. In addition, the new protectable object of E:\folder on server2 matches the auto discovery group search parameters, is not currently protected by the group plan, as illustrated by the "N" in the PP column 1721, is currently not protected by the user, as illustrated by the "N" in the PU column 1731, and is currently pending user action, as illustrated by the "Y" in the pending column 1719. Upon completion of the comparison, the auto discovery group table 1715 is updated to identify the new mapping and the status of all objects.

The protectable object of E:\folder on server2 is currently not protected by the plan or by the user because it was newly identified by the auto discovery group. The data protection system 1701 generates an alert that is provided to the user to indicate that a new protectable object has been added to the production location that is similar to the protected objects in the protected group. The alert is generated because the user may be interested in additionally protecting, as part of the protected group, this newly identified protectable object.

Figure 22:
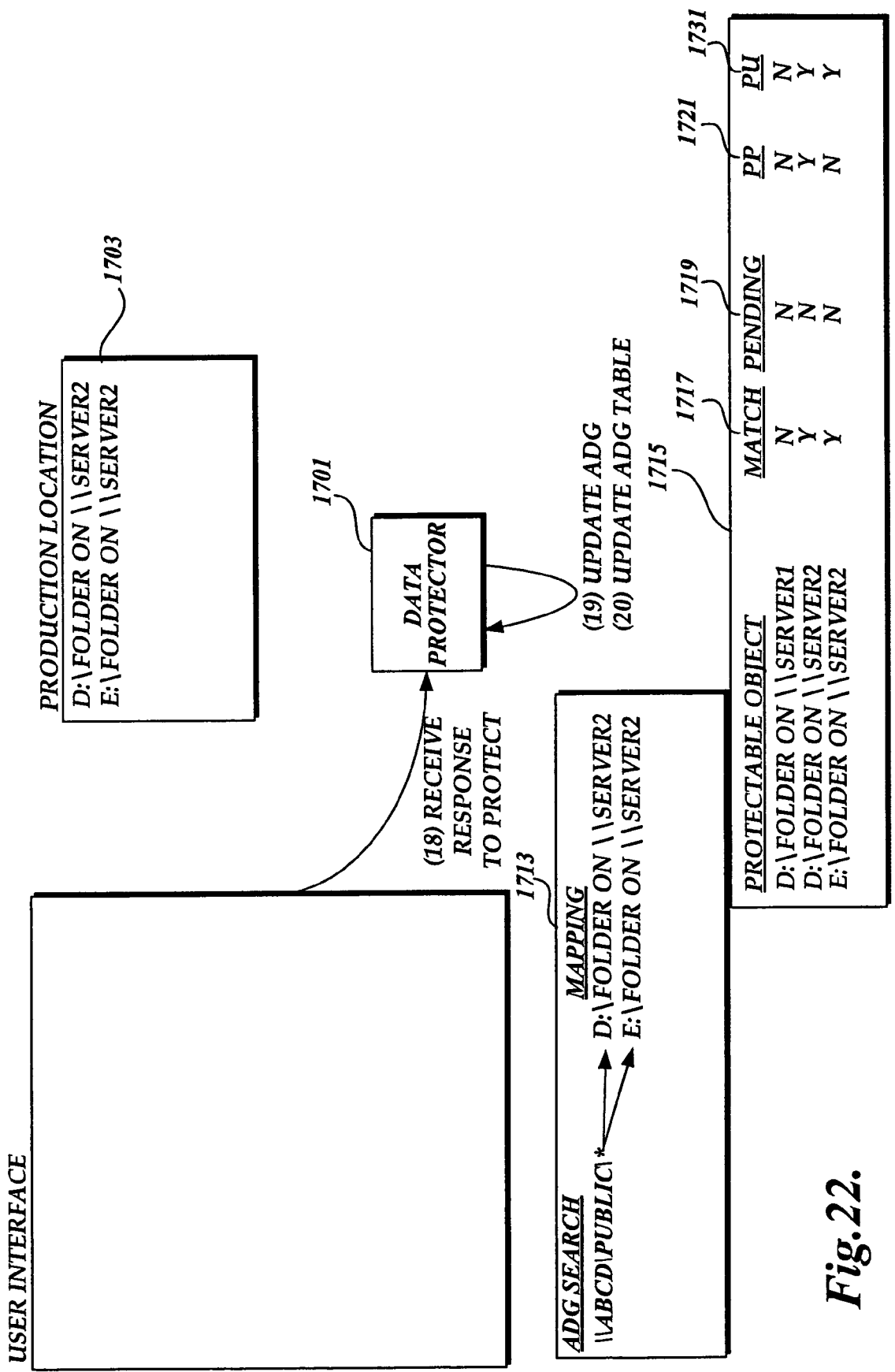

In FIG. 22, the user has received the alert and provides a response to begin protection of the newly identified protectable object that was automatically identified by the auto discovery group. The protectable object of E:\folder on server2 is also added to the protected group and thus becomes a protected object. Likewise, the data protector 1701 adds to the auto discovery group table 1715, an indication that the object of E:\folder on server2 is no longer pending user action, is protected by the user, but at this point is not protected by the plan.

Figure 23A:
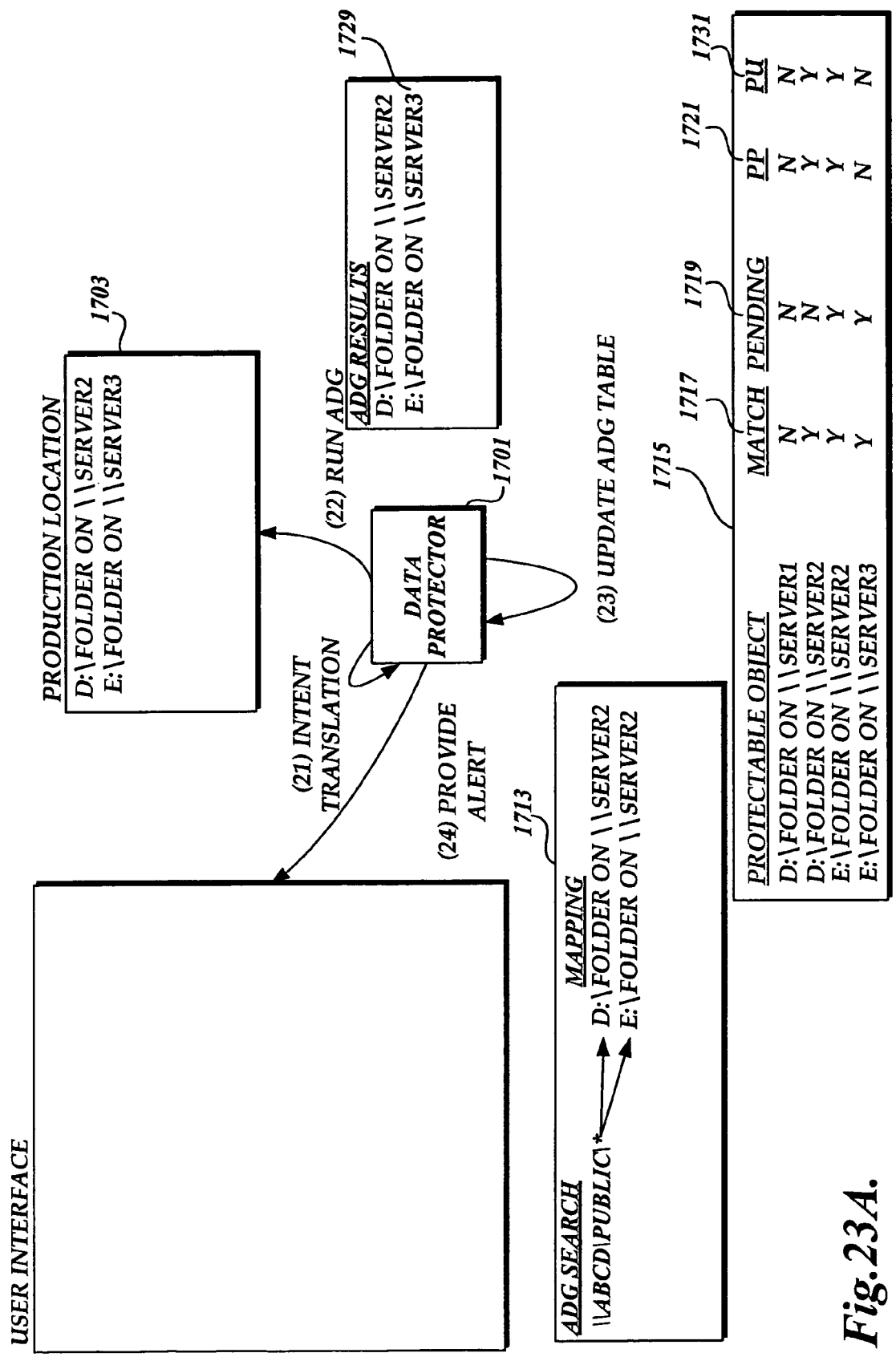

FIG. 23A continues with the above example, and at some time after an indication by the user to add the newly identified protectable object to the protected group, intent translation executes and E:\folder on server2 becomes protected by the plan. Upon completion of intent translation, the auto discovery group log 1715 is updated to indicate that E:\folder on server2 is now protected by the plan, as illustrated by the "Y" in PP column 1721.

At some time after intent translation has completed, the data protector 1701 again runs the auto discovery group routine and remaps the auto discovery group search parameter of \\ABCD\PUBLIC\* onto the objects located at the production location 1703. Upon completion of the auto discovery group routine, the data protector has identified the mappings of D:\folder on server2 and E:\folder on server3 1729. Those results are used to compare and update the auto discovery group table 1715 to indicate that the protected object of D:\folder on server2 again matches the auto discovery group search parameters, is not pending user action, remains protected by the data protection system, and remains protected by the user. Additionally, it is indicated that the previously protected object of E:\folder on server2 was not identified by the auto discovery routine but remains protected by the user and the protection plan, and is therefore pending user action. Finally, the addition of the new protectable object of E:\folder on server3 is identified as matching the auto discovery group search parameters, however, it is not currently protected by the user or the protection plan, as it is newly identified, and is therefore pending user action. Upon update of the auto discovery table the data protector 1701 generates an alert including the identification that the previously protected object of E:\folder on server2 no longer matches the auto discovery group search parameters, and that E:\folder on server3 has been added to the production location and matches the auto discovery group search parameters. This alert may indicate to a user that the protected object E:\folder on server2 may have been moved to E:\folder on server3. Without automatic discovery of such a change, the user may have continued to protect the old object and not have provided protection for the new object.

Figure 23B:
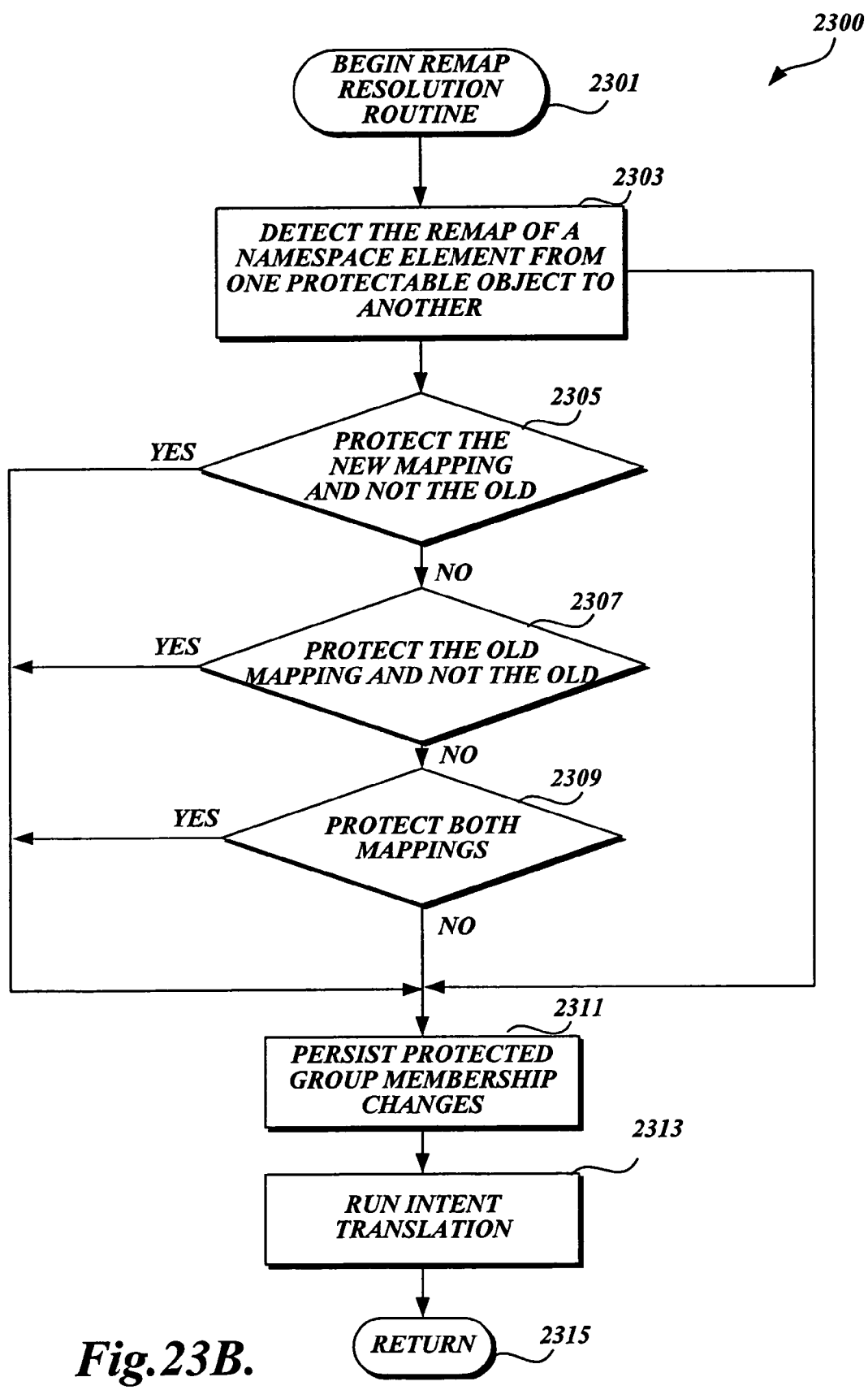
FIG. 23B illustrates a remap resolution routine for resolving the remap of a protected namespace element, in accordance with an embodiment of the present invention.

FIG. 23B illustrates a remap resolution routine for resolving the remap of a protected namespace element, such as that detected in FIG. 23A, in accordance with an embodiment of the present invention. The remap resolution routine 2300 runs when it is determined that a Namespace Element may have been moved. For example, \\ABCD\PUBLIC\LINK3, which was previously mapped to E:\folder on Server2 may have been remapped to E:\folder on Server3.

The remap resolution routine 2300 begins at block 2301. At block 2303 an auto-discovery group is evaluated, and it is determined that a protected namespace element has been remapped from one protectable object to another. At decision blocks 2305-2309 a determination is made as to how the remap is to be resolved.

In particular, at decision block 2305 a determination is made as to whether the new mapping should be exclusively protected. If it is determined that the new mapping should be exclusively protected, at block 2311 the old mapping is marked as not protected by user, and the new mapping is marked as protected by user. However, if it is determined that the new mapping should not be exclusively protected, at decision block 2307 a determination is made as to whether the old mapping should exclusively be protected. If the old mapping is to be exclusively protected, at block 2311 the old mapping is marked as protected by user, and the new mapping is marked as not protected. However, if it is determined at decision block 2307 that the old mapping should not be exclusively protected, at decision block 2309 it is determined whether the both mapping should be protected.

If it is determined at decision block 2309 that both mappings should be protected, at block 2311 both mappings are marked as protected by user. However, if it is determined that both mappings are not to be protected, at block 2311 both mappings are marked as not protected by user.

At block 2313 the intent translation routine, as discussed herein, is executed. Upon completion of intent translation, the protected objects are updated such that the protected in plan flag contains the same value as the protected by user flag for both the old protected object and the new. At block 2315, the routine ends.

Figure 24:
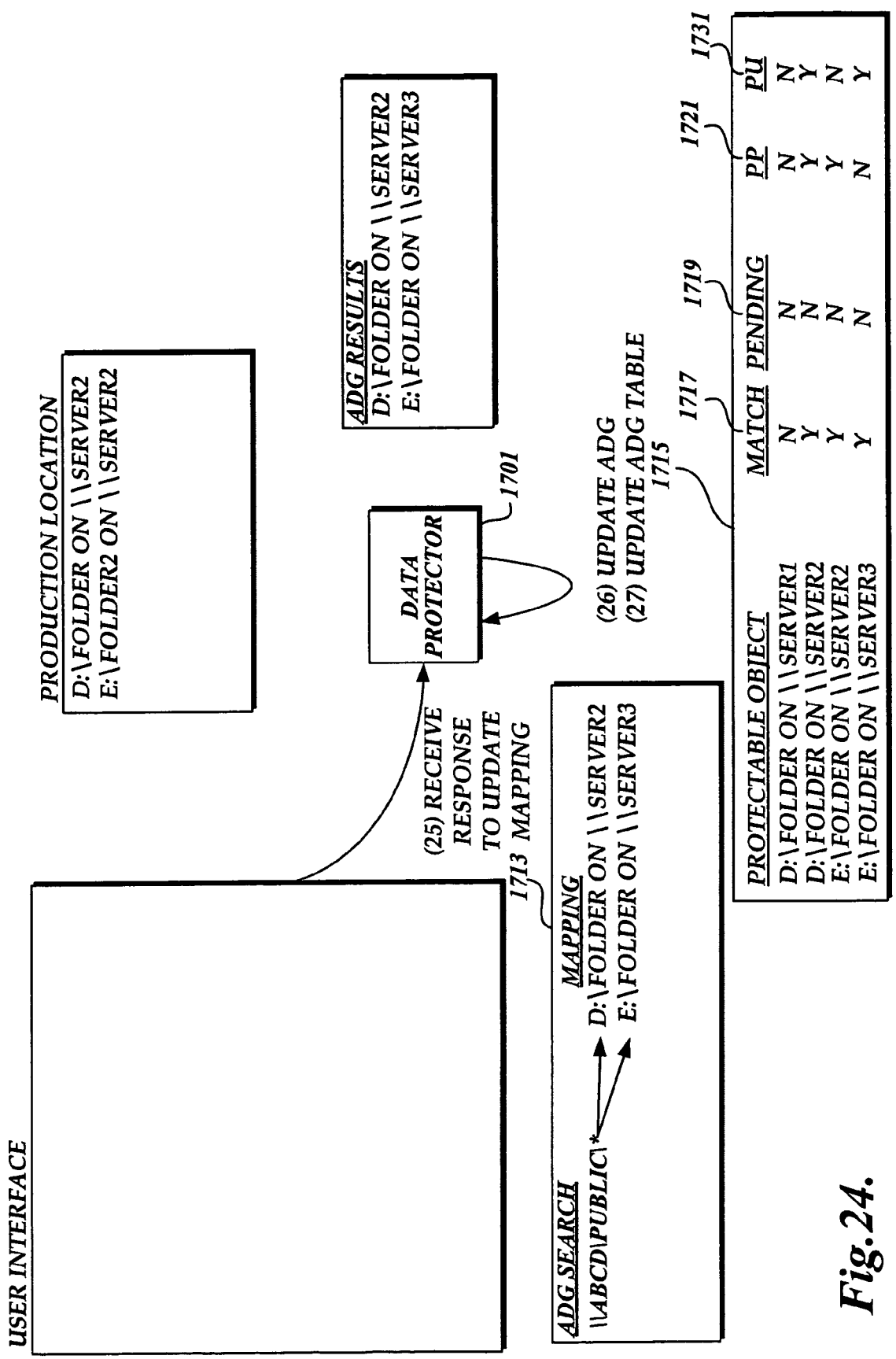

FIG. 24 illustrates that, as with the previous portions of this example, the user is provided with the alert identifying the changes detected by the previously run auto discovery group routine. The user selects to update the mapping of the auto discovery group search parameters to include the newly identified protectable object of E:\folder on server3 and to remove the mapping of the older protected object of E:\folder on server2 (block 2305, FIG. 23B). The data protection system 1701, in response to receiving the indication from the user to update the mapping, updates the protected group to include the new protected object. Additionally, the data protector 1701 updates the auto discovery group table 1715 to identify that E:\folder on server2 is no longer protected by the user, but at this point remains protected by the plan and to indicate that the new mapping of the protected object of E:\folder on server3 is protected by the user but not yet protected by the plan.

At some time after the user has indicated the changes, intent translation is executed thereby removing E:\folder on server2 from being protected by the group plan and adding E:\folder on server3 to be protected by the group plan. As will be appreciated, intent translation may be executed at any point in time subsequent to a user indicating a change in the protected group (either addition of an object or removal of an object). For example, intent translation may be executed immediately after a user has indicated a change to the protected group, or several days later. Additionally, the auto discovery group routine and intent translation may be independent of one another. The auto discovery group routine may be performed multiple times between a user indicating a change to the protected group and intent translation executing. In such an instance, upon a refresh of the auto discovery group, no alert will be generated for the object being changed as the user has already provided instructions even though an actual change to the group plan has not yet occurred.

Figure 25:
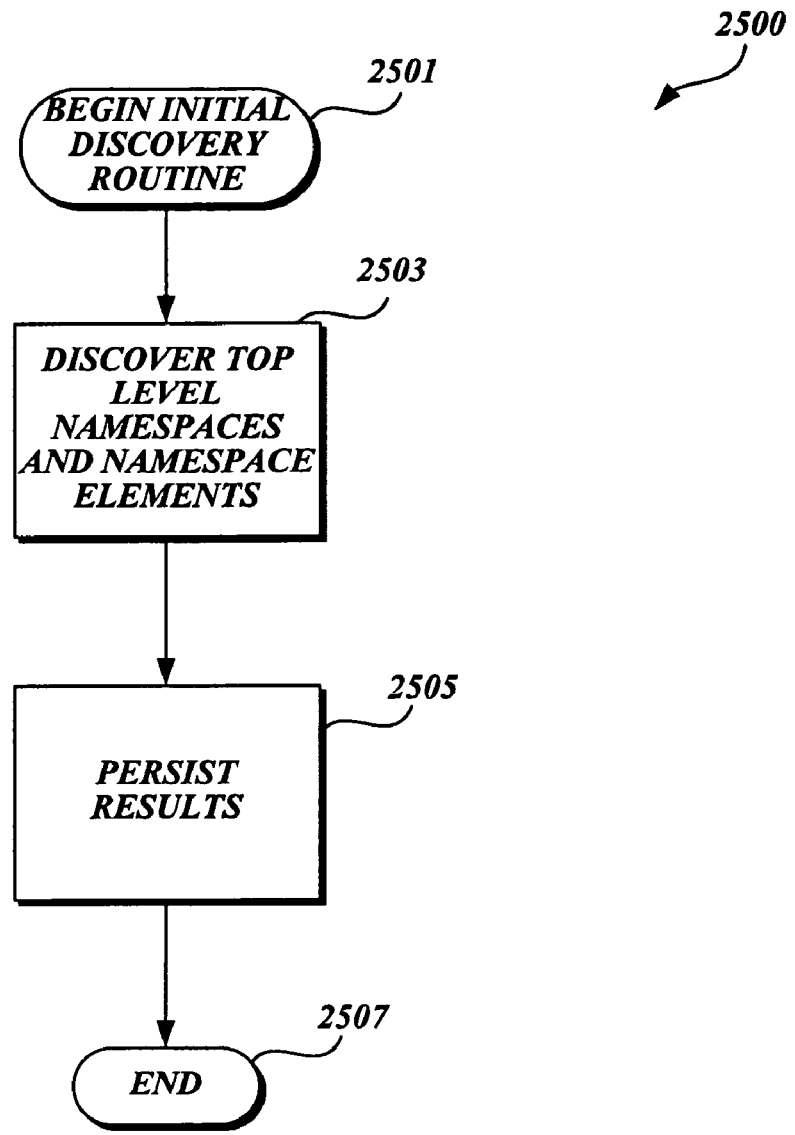
FIG. 25 illustrates a flow diagram of an initial discovery routine for initially discovering the mappings between top-level Namespace Elements and protectable objects, in accordance with an embodiment of the present invention.

FIG. 25 illustrates a flow diagram of an initial discovery routine for initially discovering the mappings between top-level Namespace Elements and protectable objects, in accordance with an embodiment of the present invention. The initial discovery routine 2500 begins at block 2501 and at block 2503 the Namespaces and Namespace Elements of all easily discoverable objects of a production location are identified. Easily discoverable objects are top level objects of a production location. For example, Namespaces and Namespace Elements may be easily discovered for top level objects such as DFS roots, servers, Exchange servers, and STS servers. At block 2505 the discovered top-level Namespaces and Namespace Elements of the production location are persisted in memory (e.g., a database) of the data protector. At block 2507 the initial discovery routine 2500 completes.

Figure 26:
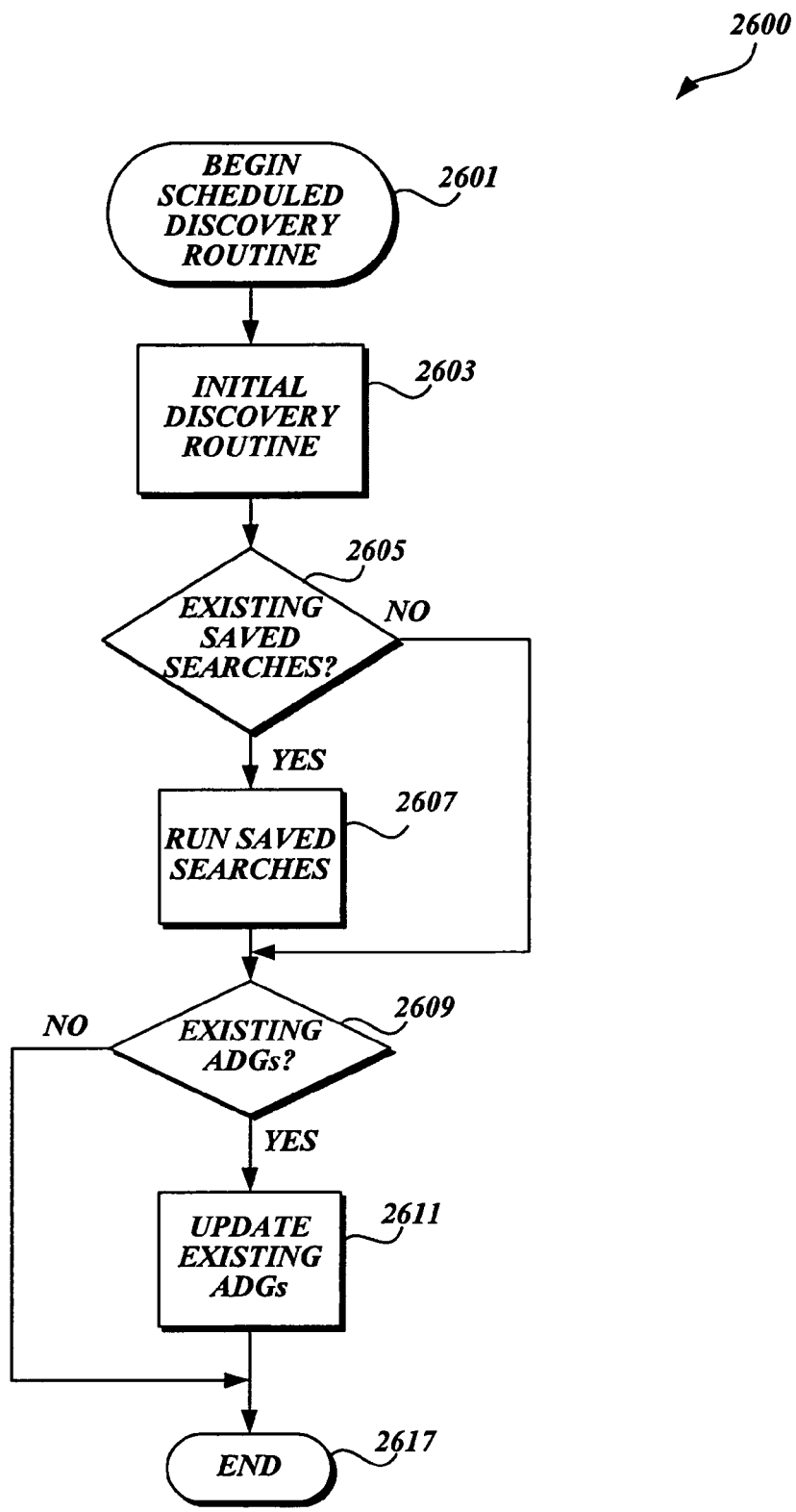
FIG. 26 illustrates a flow diagram of a scheduled discovery routine for discovery of mappings between Namespaces and Namespace Elements and protectable objects located at a production location, in accordance with an embodiment of the present invention.

FIG. 26 illustrates a flow diagram of a scheduled discovery routine for discovery of mappings between Namespaces and Namespace Elements and protectable objects located at a production location, in accordance with an embodiment of the present invention. In particular, the scheduled discovery routine 2600 begins at block 2601 and at block 2603 the initial discovery routine 2500 (FIG. 25) executes and top-level Namespace Elements of the production location are identified. As discussed above, the stored copy of the top-level Namespace Elements may be utilized by the data protection system to allow a user to navigate through a production location and/or to search for particular portions of a production location without having to rediscover the production location at the time of the search, thereby increasing search and navigation time and removing load off of the production location.

At decision block 2605 it is determined if there are any existing saved searches (discussed below) that are to be performed. If it is determined at decision block 2605 that there are saved searches to be performed, at block 2607 those saved searches are executed. However, if it is determined at decision block 2605 that there are no existing saved searches, at decision block 2609 it is determined if there are any existing auto discovery groups that are to be updated. If it is determined at decision block 2609 that there are existing auto discovery groups to be updated, at block 2611 those auto discovery groups are updated, as described previously with respect to the example in FIGS. 17-24. The routine completes at block 2617.

Figure 27:
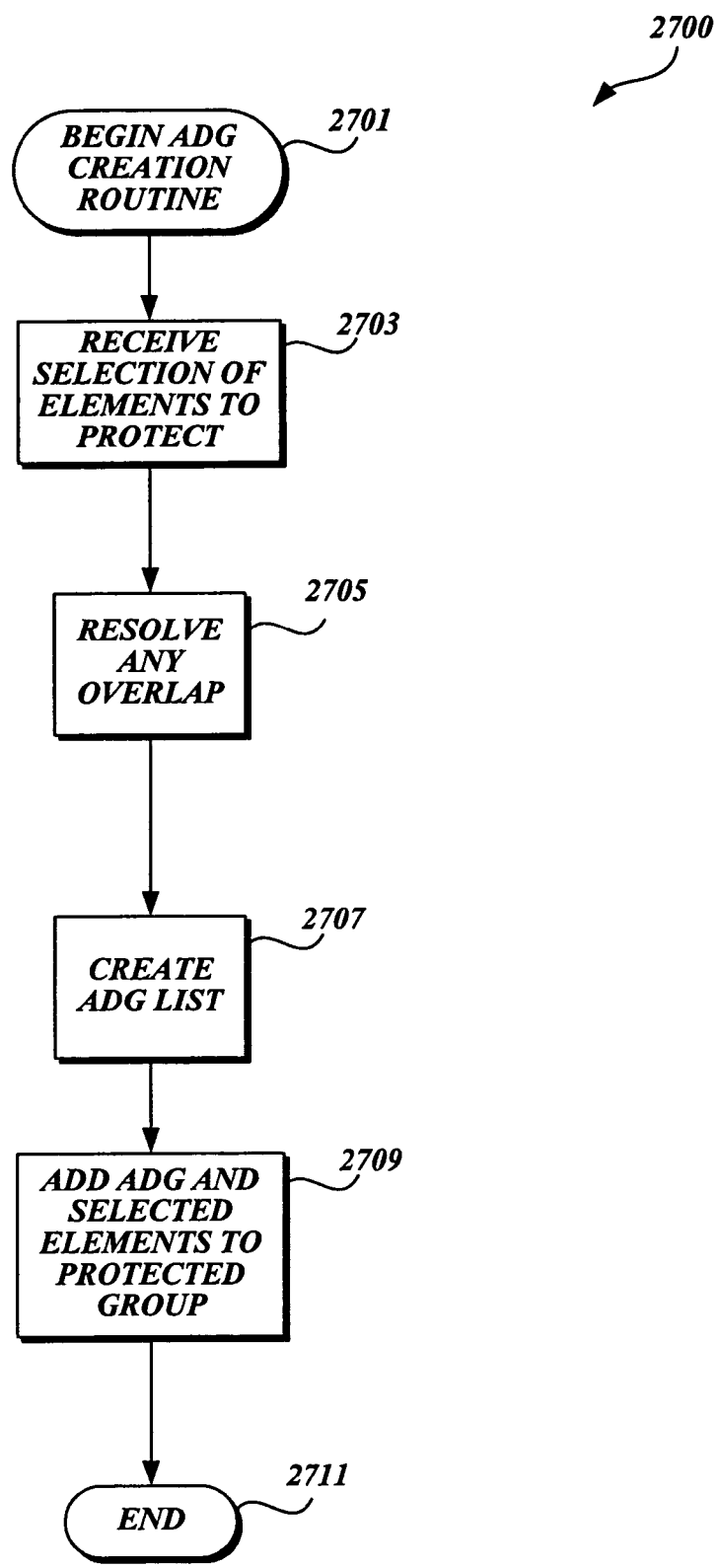
FIG. 27 is a flow diagram of an auto discovery group creation routine, in accordance with an embodiment of the present invention.

FIG. 27 is a flow diagram of an auto discovery group creation routine, in accordance with an embodiment of the present invention. The auto discovery group creation routine 2700 begins at block 2701 and at block 2703 a selection of Namespace Elements that a user wants to protect is received. In addition to receiving a selection of Namespace Elements, the protectable objects associated with those Namespace Elements are also received. At block 2705 any overlap of the data sources associated with those Namespace Elements is resolved. Overlap resolution is discussed above with respect to FIG. 13.

After any overlap has been resolved, at block 2707 an auto discovery group list identifying the selected Namespace Elements is created. Additionally, a query parameter is generated and included in the auto discovery group that is used to identify other Namespace Elements that are similar to the selected Namespace Elements. A query parameter may be expressed in terms of physical resources (e.g., all volumes on server1), some query on a Namespace (e.g., all shares under the DFS ROOT \products), or some combination (e.g., all shares on servers named \\FILESRV*). Additionally, a query parameter may be based on some property of preexisting Namespace Elements.

In each case, the data protection system keeps track of the membership of the auto discovery group and notifies users of changes to that group. At block 2709 the auto discovery group and the list of selected Namespace Elements is added to a protected group. As discussed above, the protected group may be an existing protected group or a newly created protected group for the selected Namespace Elements. At block 2711 the auto discovery group creation routine ends.

An auto discovery group, created as described above with respect to FIG. 27, is a way of describing objects that potentially should be protected as a query rather than as a discrete set of physical resources. Once a change is detected, a user may either approve or reject changes to the plan for protecting the objects associated with that auto discovery group and/or that are part of the protected group. For example, if the auto discovery group includes the search parameter for all shares on servers \\FILESRV* and a new server \\FILESRV10 arrives with ten new shares, the user has an option of approving or rejecting protection of each of the new shares.

As discussed above, the data protection system tracks responses to auto discovery group changes reported to a user. For example, if a user rejected protection of a newly identified protectable object, then no notification would be subsequently sent to a user if that protectable object is subsequently removed from the production location. In particular, an excluded flag for a protectable object is set once a user has indicated that they do not want to protect the object and want to automatically ignore all future notifications. In an embodiment, rejecting an object once does not automatically set the excluded flag. Additionally, the number of times an object is rejected may be tracked and after a predetermined number of rejections (e.g., five) the object may be marked excluded. Subsequent identifications of an excluded object will not be alerted to the user.

The data protection system automatically creates and configures auto discovery groups for each Namespace Element that a user wants protected. For example, if a user protects share1 on server \\FILESRV1, the data protection system configures an auto discovery group consisting of the mapping of \\FILESRV1\share1 to a physical resource (e.g., folder1 on volumeX: on \\FILESRV1). If \\FILESRV1\share1 disappears or the mapping from the share to the physical resource is changed, the user is notified of the change and given several options as to how to proceed (FIG. 23B). For example, suppose \\FILESRV1\share1 now maps to folder1 on volume Y. The user has the options of continuing to protect X:\folder1, to stop protecting X:\folder1 and start protecting Y:\folder1, or to protect both objects. In this way the user is informed of any changes to the Namespace Element that it is trying to protect and the physical objects that are actually being protected.

Figure 28:
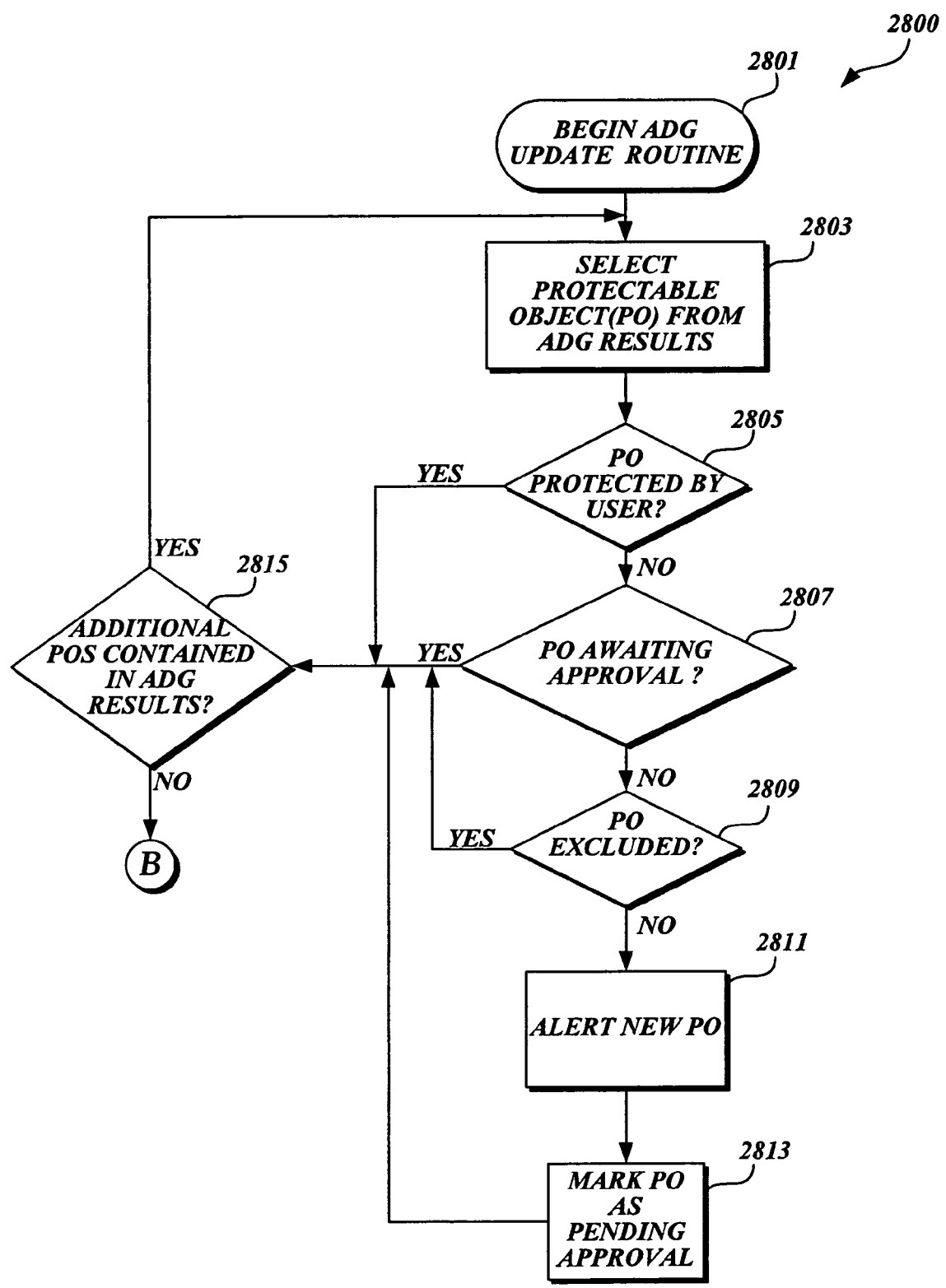
FIGS. 28 and 29 illustrate a flow diagram of an auto discovery group update routine, in accordance with an embodiment of the present invention.
Figure 29:
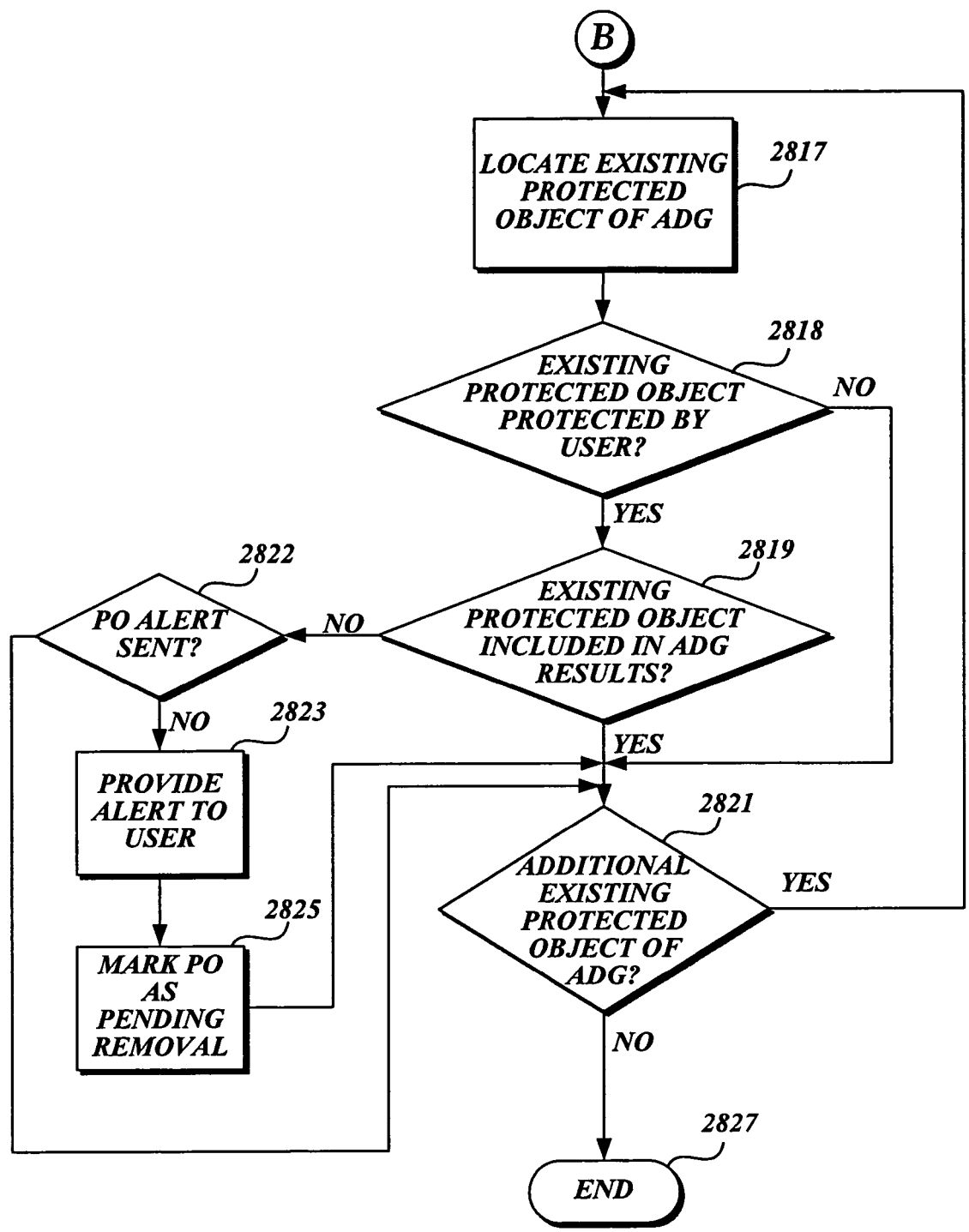

FIGS. 28 and 29 illustrate a flow diagram of an auto discovery group update routine, in accordance with an embodiment of the present invention. The auto discovery group update routine 2800 begins at block 2801 and at block 2803 a protectable object from the auto discovery group results is selected. The auto discovery group results are generated after execution of an auto discovery group mapping sequence identifying each of the protectable objects to which the Namespace Elements of that auto discovery group map, or previously mapped. At decision block 2805, it is determined whether the selected protectable object is currently protected by the user.

If it is determined at decision block 2805 that the selected protectable object is currently not being protected by the user, at decision block 2807 a determination is made as to whether the selected protectable object is currently awaiting approval from a user. A protectable object may be currently awaiting approval from a user to be added to a protected group if it had been previously identified and reported to a user, via an alert, and the user had not identified whether that object should be added to the protected group. As discussed with respect to FIGS. 17-24, an object may be identified as awaiting approval by setting the pending column to "Y" in the auto discovery group table. If it is determined at decision block 2807 that the protectable object is not awaiting approval, at decision block 2809 it is determined whether the selected protectable object has been excluded from protection. As discussed above, a protectable object may be excluded from protection by identification from a user that it does not want to have the protectable object protected nor be notified of changes to the protectable object. Such an identification is identified by marking that object within the auto discovery group table as excluded by the user.

If at decision block 2809 it is determined that the selected protectable object is not currently excluded from protection, at block 2811 an alert is generated that identifies the new protectable object and requests that the user approve addition of the protectable object to the protected group and/or a response to specifically exclude the protectable object from the protected group. At block 2813 the protectable object is marked as pending approval by the user, not protected by the user, and not protected by the plan.

If it is determined that the selected protectable object is: currently being protected by the user (block 2805); awaiting protection approval from a user (2807); or excluded from protection (2809); at decision block 2815 it is determined whether there are additional protectable objects identified as auto discovery group results. If it is determined at decision block 2815 that there are additional protectable objects, the routine returns to block 2803 and continues the process for each additional protectable object identified as an auto discovery group result. However, if it is determined at decision block 2815 that there are no additional protectable objects identified as auto discovery group results, at block 2817 (FIG. 29) an existing protected object of the auto discovery group is identified.

At decision block 2818, a determination is made as to whether the existing protected object is marked as protected by the user. If it is determined that the existing protected object is not marked as protected by the user, the routine proceeds to decision block 2821. However, if it is determined that the existing protected object is protected by the user, at decision block 2819 it is determined if the existing protected object is included in the results generated by the execution of the auto discovery group. If it is determined at decision block 2819 that the existing protected object is included in the newly generated auto discovery group results, at decision block 2821 a determination is made as to whether there are additional existing protected objects of the auto discovery group. If it is determined at decision block 2821 that there are additional existing protected objects of the auto discovery group, the routine returns to block 2817 and continues. If it is determined at decision block 2821 that there are no additional existing protected objects for the auto discovery group, the routine ends at block 2827.

Referring back to decision block 2819, if it is determined that the identified existing protected object is not included in the newly generated auto discovery group results, at decision block 2822 it is determined, by examining the pending flag, whether an alert has been previously sent to the user notifying the user of the change. If it is determined that an alert has not been previously sent, the change is reported to the user, via an alert, identifying that the mapping to an object protected by the user no longer exists, as illustrated by block 2823. At block 2825 that protected object is marked as pending removal from the protected group, not matching the auto discovery group search parameters, but currently protected by the user. Removal of a protected object from a protected group does not remove any actual copy of that protected object from the storage location. As will be appreciated by one skilled in the relevant art, pending removal and pending approval may be tracked as a single status of pending. As discussed above, tracking whether the object matches the auto discovery group search parameter identifies whether object is to be removed or added.

As objects are identified by the auto discovery routine, in addition to tracking whether the objects are pending user action, protected by the plan, protected by the user, and matching the auto discovery search parameters, when an object is first identified and added to the auto discovery group table, the date and time it is identified are also recorded. Additionally, when a protected object that exists in the auto discovery group table is no longer identified by an auto discovery group routine, the date and time it disappears are also recorded.

In addition to the data protection system automatically creating auto discovery groups in response to a user selecting Namespace Elements, the data protection system also automatically creates saved searches. In another embodiment, saved searches may be generated upon installation of the data protection system. In still another embodiment, saved searches may also be created by a user.

A saved search is used to inform a user when segments of a production location, such as a server, appear or disappear. For example, utilizing saved searches provides the ability for the data protection system to inform a user of new servers, new DFS roots, servers that no longer exist, DFS roots that no longer exist, new STS servers, STS servers that no longer exist, etc. Associated with each saved search is a list of Namespace Elements that have been located during a previous evaluation of the same saved search. Saved searches include a Namespace Element that represents a starting point for search, and a set of search criteria that describe the contained Namespace Elements to be returned. Unlike auto discovery groups, saved searches operate on Namespace Elements rather than protectable objects. For example, a saved search may be created to identify all servers belonging to the marketing department of a corporation. This would generally not be a valid auto discovery group. However, like auto discovery groups, saved searches maintain a saved search results table identifying Namespace Elements matching the search parameters.

For Namespace Elements matching a search, the status is maintained. For example, first identified and last seen time information is maintained for each Namespace Element. That information may also be used to detect changes. The first time a Namespace Element is identified by a saved search, a timestamp identifying the date of that identification is persisted, and when that Namespace Element is removed from the production location, a timestamp identifying the date and time that the Namespace Element was last seen is also persisted. In an actual embodiment, an alert is provided to a user whenever a change in the production location is detected. For example, addition of a Namespace Element and/or removal of a Namespace Element to the production location would generate an alert to the user identifying it of that change. In an embodiment, a saved search for all shares on a server is created in response to a user identifying that a share on that sever is to be protected. Similarly, a saved search for all volumes on a server is created when a volume on that server is protected. Upon a change to the server (e.g., the addition of a share or volume, as appropriate) a user will be notified of the change.

The results of auto-discovery groups and saved searches may also be used to improve the performance of the data protector's navigation and searching functions. Auto-discovery groups and saved searches may cache their results in persistent storage on a periodic basis, so in cases where navigation and search results do not change frequently, or where some staleness is acceptable, the data protector may utilize these cached results to provide faster responsiveness to user-initiated navigation and search.

Protection intents are provided by a user to describe how (e.g., replica, archive, both) they want to protect a protected group and how far back in time they want to be able to recover (duration). For example, the user may want to have a replica of a selected group of data generated for that data every night, a copy stored on removable media at the storage location, that copy updated once a week, and a maximum of four copies kept on removable media. Additionally, the user may specify that they want to be able to recover the information that is at least one month old.

Protecting data at a storage location, for example, as a replica, an archive, or both, requires that resources be allocated for the copies of the data, as well as any resources required for the process itself. In addition, a number of jobs are required to get those resources into the required state to be used and ongoing jobs are necessary to maintain the accuracy of the protection. The use of jobs for protecting data will be described in more detail below. Manually setting up the resources and jobs can be tedious and error prone. In addition, resources and jobs may need to be changed whenever a set of objects being protected changes, for example, in response to a change detected by an auto discovery group. Rather than requiring a user to manually specify the detailed resources and jobs, the user may simply specify what is to be protected by selection of Namespace Elements and providing protection intents. That information is then used to generate a group plan for maintaining the protection of the selected data. In one embodiment, the group plan includes three components: a resource plan, a preparation plan, and a protection plan.

The resource plan includes a list of jobs that are necessary to obtain the resources needed to enable protection. The preparation plan includes a list of one-time jobs that are needed to set up the protection of the identified data. For example, a one-time job would be the initial copying and transfer of data from the production location to the storage location. The protection plan includes a list of ongoing jobs that are required to maintain the accuracy and integrity of the protected data.

Translation from the protection intents identified by a user to a detailed plan for protecting objects is referred to and described herein as "intent translation." In an actual embodiment of the present invention, intent translation operates on a protected group and protection intents provided for that protected group. Protection intents are expressed as logical representations and may be stated as goals. The goals may identify the level of protection (granularity) desired, how the data is to be protected, how long the data is to be protected, how often the data is to be protected, etc. For example, a user may identify the protection intent of "don't lose more than 30 minutes of any executive file share; retain all content for a year." Verbs from the protection intent are used as actions for translating the intents into a detailed plan for protecting the objects. Referring to the previous example, the corresponding actions for that intent are "replicate volumes and folders every 30 minutes," "archive weekly" and "store offsite with one year media retention."

In an embodiment of the present invention, protection templates identifying protection intents may be selected by a user and used to generate a plan for protecting the selected protected group. A protection template contains one or more prototype job definitions including appropriate verbs and default properties. The protection template also includes a default prototype schedule. For example, "hourly replication, three temporal versions created during the day, archive nightly, no encryption for transfer, no encryption at storage locations" is a default prototype schedule. A user has the ability to override and explicitly change the protection template. For example, a user may change the previous protection template to create hourly replications, only one temporal version during the day, archive weekly, with no encryption for transfer, no encryption at storage locations. "No encryption for transfer," as identified in the mentioned default prototype schedule, identifies that data does not need to be encrypted when transmitted from the production location to the storage location. Alternatively, data may be encrypted for transmission between the production location and the storage location. "No encryption at storage locations" identifies that the data stored at the storage location, either as a replica or archived, does need to be encrypted. Alternatively, stored data may be encrypted. For example, copies of a production location that are archived to removable media, such as tape, may be encrypted. Additionally, copies stored as a replica may also, or alternatively, be encrypted. As one who is skilled in the relevant art will appreciate, any encryption technique may be utilized with embodiments of the present invention for encrypting the data for transmission and for storage.

Figure 30:
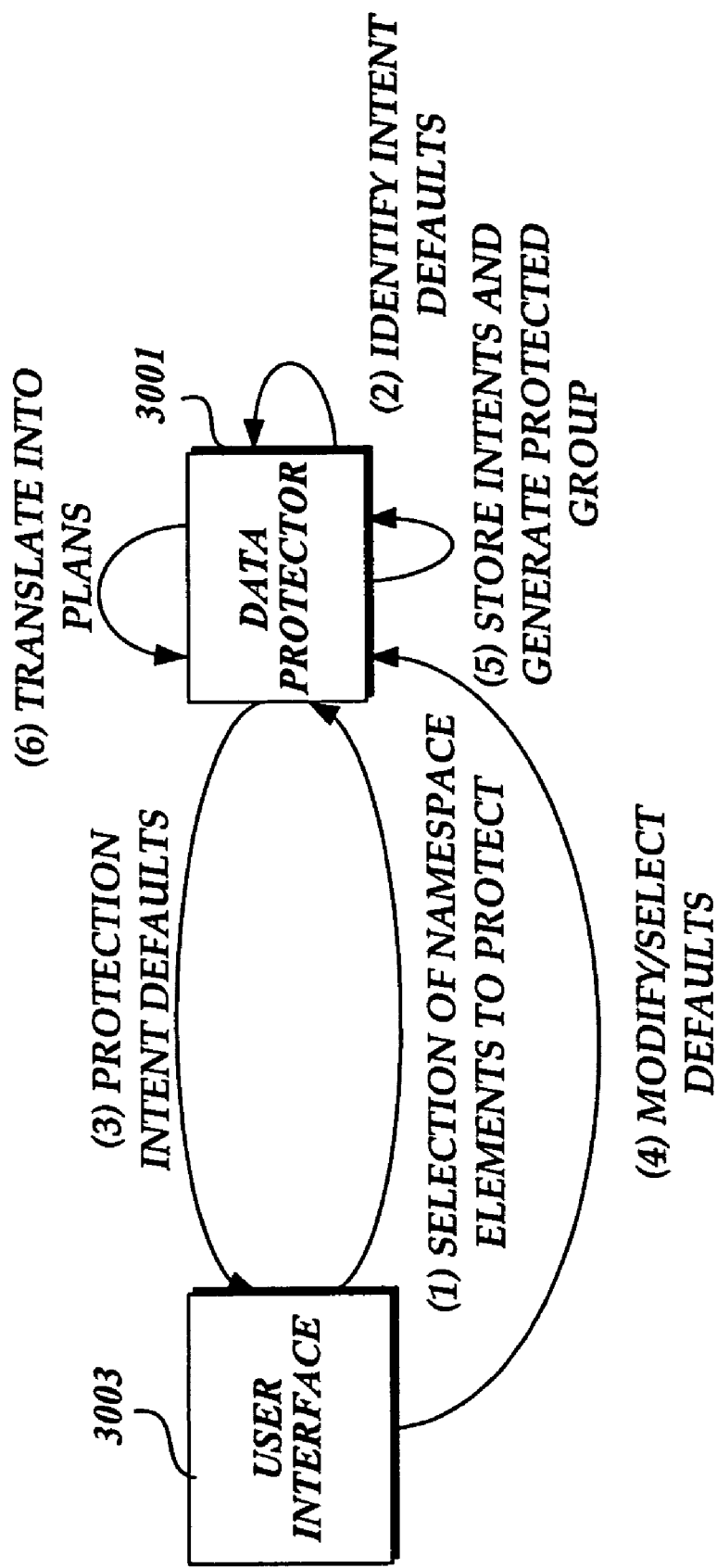
FIG. 30 illustrates a flow diagram for translating protection intents into a plan for protecting a set of data, in accordance with an embodiment of the present invention.

FIG. 30 illustrates a flow diagram for translating protection intents into a plan for protecting a set of data, in accordance with an embodiment of the present invention. A user interfacing with the data protection system via a user interface 3003 selects a list of Namespace Elements to protect. Selection of Namespace Elements to protect is transferred to the data protector 3001, and in response the data protector provides to the user, via the user interface 3003, protection intent defaults. In particular, the data protector, upon receipt of selected Namespace Elements, identifies the protectable objects associated with the selected Namespace Elements and identifies a default list of protection intents that are provided to the user.

A user, in response to receiving protection intent defaults, interacts with the user interface 3003 and modifies or selects the appropriate default. The data protector 3001 receives the selection or modifications and stores the intents and creates a protected group for the objects. The intents may be stored in any format including, but not limited to, binary, Extensible Markup Language (XML), or a database table. The data protector 3001 applies any modifications to the protection intent defaults and uses the modified protection intents to create a detailed plan for protecting the protected group that may also be stored in any form including, but not limited to, binary, XML, or a database table.

Similar to creating a detailed plan for protecting a protected group, the data protector has the ability to create a recovery plan for selected recoverable objects given stated recovery intents, recovery parameters, and a selection of a Namespace Element to recover. To create a recovery plan, the data protector determines the necessary recovery sources and sequences them appropriately. Additionally, the data protector determines a recovery target that is the physical path identifying where the data is to be restored.

Several different recovery intents may be specified to control how recovery proceeds. For example, an overwrite intent controls what happens if when trying to recover a file to the production location, it is determined that the file already exists at the production location. Several alternatives may be provided, including, but not limited to, always overwrite, never overwrite, use the most recent of the two. Another recovery intent that may be specified is how the security of the restored objects should be set. For example, it may be specified that the security of the restored object inherits the security from the parent object (e.g., the security of a file restored to a folder would receive the same security as the folder). An alternative model is to restore the security of the recovered object to exactly what it was when it was backed up. Intents may also specify if the recovered object is to be encrypted during transmission and/or when stored.

Figure 31:
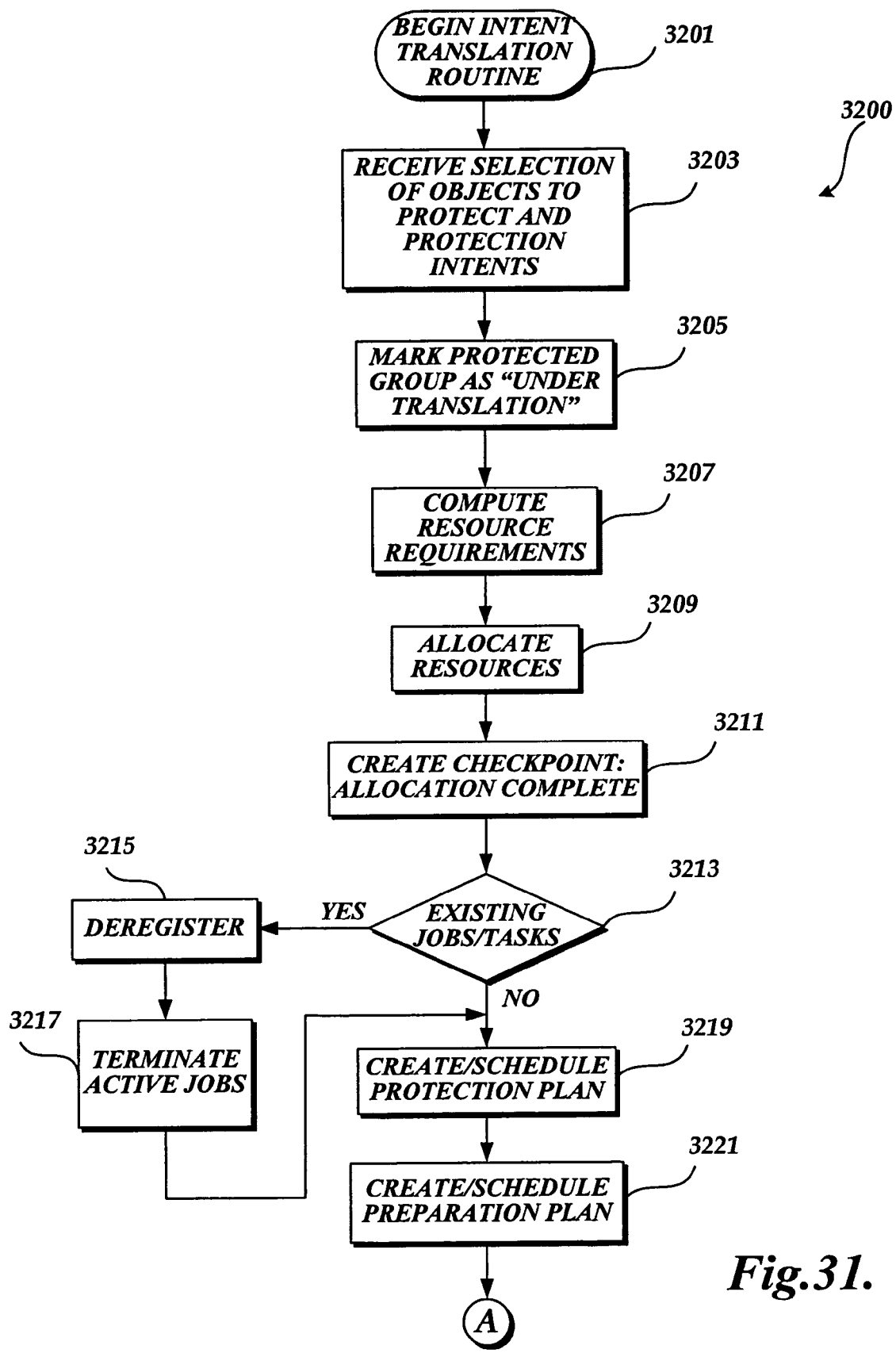
FIGS. 31 and 32 illustrate a flow diagram of an intent translation routine for translating protection intents into a detailed plan for protecting physical objects located at a production location, in accordance with an embodiment of the present invention.
Figure 32:
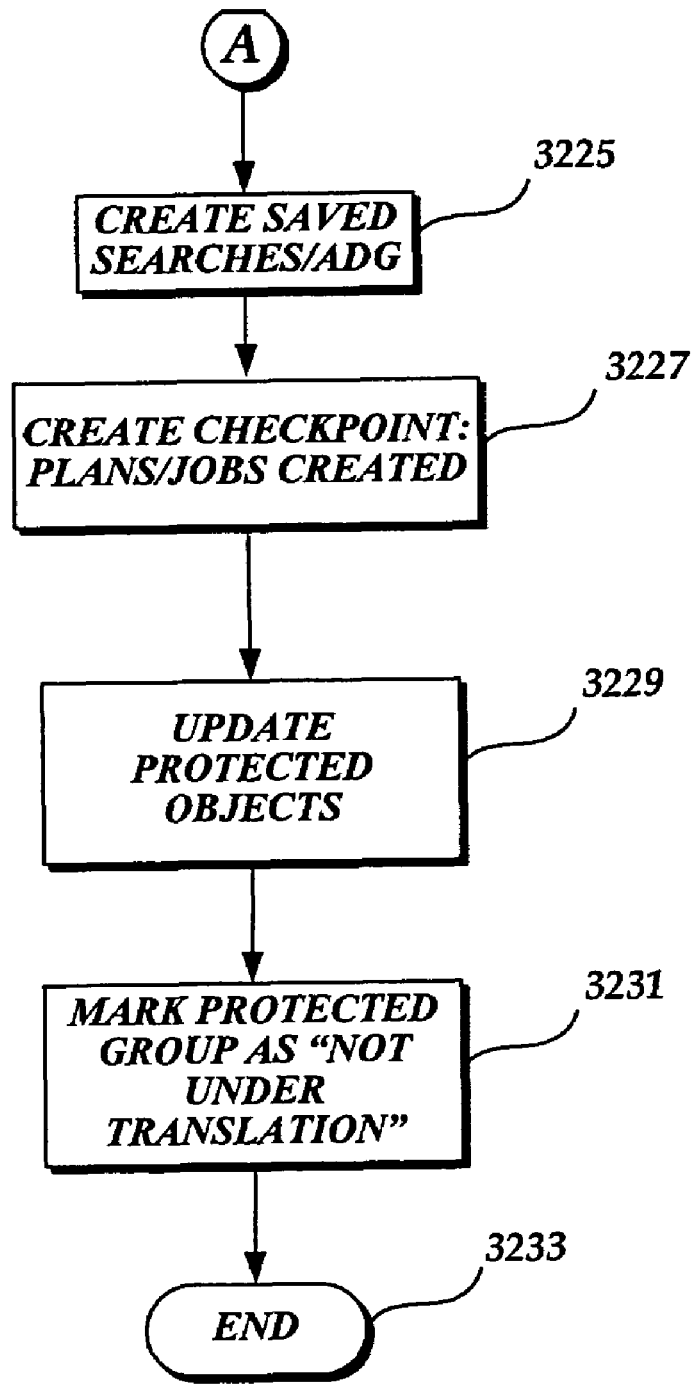

FIGS. 31 and 32 illustrate a flow diagram of an intent translation routine for translating protection intents into a detailed plan for protecting physical objects located at a production location, in accordance with an embodiment of the present invention. The intent translation routine 3200 begins at block 3201, and at block 3203 a selection of Namespace Elements that are to be protected and protection intents that are to be applied for the selected Namespace Elements are received. As described above, Namespace Elements are mapped to protectable objects located at a production location. In addition, as described above, selection of Namespace Elements and the associated protectable objects are compiled by the data protection system into a protected group to which the protection intents are applied. At block 3205 that protected group is marked "under translation." Marking the protected group "under translation" prevents a user from making any changes to the protected group until either intent translation completes successfully or fails, rolling back any changes it had made.

At block 3207, the resource requirements necessary to adequately provide protection to the selected protected group are computed. The resource requirements are identified by determining what changes are required for the protected group. Examples of changes that may be required for a protected group include, but are not limited to, a new data source being added to the protected group, a data source being removed from the protected group, a data source for the protected group being changed by either adding or removing protected objects, resources being added or reclaimed (e.g., addition or deletion of disk space to a replica, addition or deletion of removable media to an archive), protection goals or schedules being adjusted for the protected group, or a new protected group being added for the first time. In addition, the size of the resources necessary is determined by identifying the size of the protected objects located on the production location that are going to be copied and stored at the storage location and the particular protection method and protection intents that have been specified.

At block 3209, the resource plan is generated and executed to allocate the resources necessary for providing protection for the protected group. A resource plan determines the needed resources and includes any jobs necessary to obtain those resources. For example, such jobs may include allocating disk space, growing existing storage space, allocating tape media, allocating tape library changer and drive, requesting tape from a free media pool, etc. The jobs included in the resource plan are dependent on the type of protection desired by the user. For example, for replication, the jobs would include allocating disk resources for a replica and temporal version, and possibly allocating resources for a log area. The jobs associated with the resource plan generated at block 3209 are executed and the necessary resources for the protected group are allocated.

After the resources have been allocated, at block 3211 a checkpoint is created by the data protection system. In an alternate embodiment, the resource plan may only include the creation of the jobs necessary to allocate those resources and not actually include execution of those jobs. Execution of jobs associated with a resource plan may be scheduled and performed as part of the preparation plan. In such an embodiment, the checkpoint would not be generated until intent translation completed. Thus, if intent translation did not complete, it would have to restart from the beginning. As discussed below with respect to block 3209, creating a checkpoint after allocation of resources, provides a known point where the intent translation routine may restart if the routine does not complete successfully.

Since it is possible for some but not all of the resources to be allocated during execution of resource allocation jobs (e.g., the system crashes after allocating part of the physical resources but not others), there is included in an embodiment of the present invention a clean-up routine to clean up resources that were not fully allocated in an incomplete run of the intent translation routine. This clean-up routine is accomplished by designing the resource allocation of the system to behave in a certain way. In an actual embodiment, resources are allocated on a per datasource basis and either all resources necessary for a given datasource are allocated or none are. If some but not all of the resources are allocated and the allocation jobs are interrupted, then a refresh job is created to clean up any partially allocated resources from a previous run of the allocation jobs of a resource allocation plan. Once the clean-up routine has cleaned up any partially allocated resources, then the data protection system can re-allocate resources as needed. Intent translation may continue for those new protected objects for which resources have been successfully allocated.

Referring back to FIG. 31, at block 3211 upon successful completion of the allocation of the resources at block 3209, a checkpoint is generated. Creation of a checkpoint after resources have been allocated, provides the ability for the data protection system to resolve any problems that may have been created if the intent translation routine 3200 is interrupted after the resources have been allocated but prior to completion. For example, if the system crashes before completion of the intent translation routine, but after the first checkpoint has been added, as illustrated by block 3211, upon restart, the data protection system identifies that an intent translation routine was interrupted and locates the checkpoint added subsequent to allocation of resources. By identifying the checkpoint, the previously allocated resources may used, and the intent translation routine 3200 can resume from that checkpoint without having to completely restart and reallocate resources. Restarting after an interruption to an intent translation routine will be described in more detail with respect to FIG. 38.

At decision block 3213, the intent translation routine 3200 determines if there are any existing jobs and/or tasks currently associated with the protected group. If it is determined at decision block 3213 that there are existing jobs and/or tasks associated with the protected group, at block 3215 those jobs and tasks are de-registered and any active jobs are terminated, as illustrated by block 3217. Jobs and tasks may previously exist for a protected group if that protected group is being modified, rather than being created for the first time.

If it is determined at decision block 3213 that there are no existing jobs and/or tasks for the protected group, or after termination of existing jobs and/or tasks at block 3217, the intent translation routine 3200, at block 3219, creates and schedules a protection plan. As will be described in more detail below, a protection plan includes a list of jobs that are necessary to maintain the accuracy of the copy of the protected group at a storage location over time. In addition, the intent translation routine 3200, at block 3221, creates and schedules a preparation plan. As described in more detail below, the preparation plan includes a list of one-time jobs that are utilized to place the production location and storage location in a state such that the jobs associated with the protection plan may be executed and the accuracy of protection of a protected group may be accomplished. For example, if this is the first time the protected group has been created and it is to be stored on a replica, there will be no copy of the data associated with the protected group residing on the replica. Thus, one of the jobs associated with the preparation plan may be the creation of a copy of the protected objects and storage of that copy on the replica.

Referring now to FIG. 32, at block 3225 the intent translation routine 3200 creates the saved searches and auto discovery groups discussed above. As discussed above, those auto discovery groups and saved searches are executed as part of the scheduled discovery routine.

After the jobs for the resource plan, preparation plan, protection plan, saved searches, and auto discovery groups have been created, at block 3227 a second checkpoint indicating the completion of the creation of jobs is added to the data protection system. As indicated above and discussed in more detail below, this checkpoint may be used by the data protection system to recover from an interruption that occurs during the intent translation routine 3200. For example, if the intent translation routine 3200 is interrupted after a checkpoint has been created, as illustrated by block 3227, during re-start the data protection system identifies that an intent translation routine 3200 was in progress, and locates the checkpoint indicating that the plans and jobs have been created. Upon identification of the checkpoint, the intent translation routine 3200 may be resumed and completed from that checkpoint.

At block 3229, the status of newly protected objects and previously protected objects that have been removed from protection are updated to reflect their inclusion in and exclusion from the protection plan. Protected objects that are marked as having resource allocation errors in block 3209 are returned to the "pending state." At block 3231, all checkpoints are deleted and the protected group is marked as "not under translation." If all protected objects have been removed, the protected group may be deleted. At block 3233 the intent translation routine 3200 completes.

Figure 33:
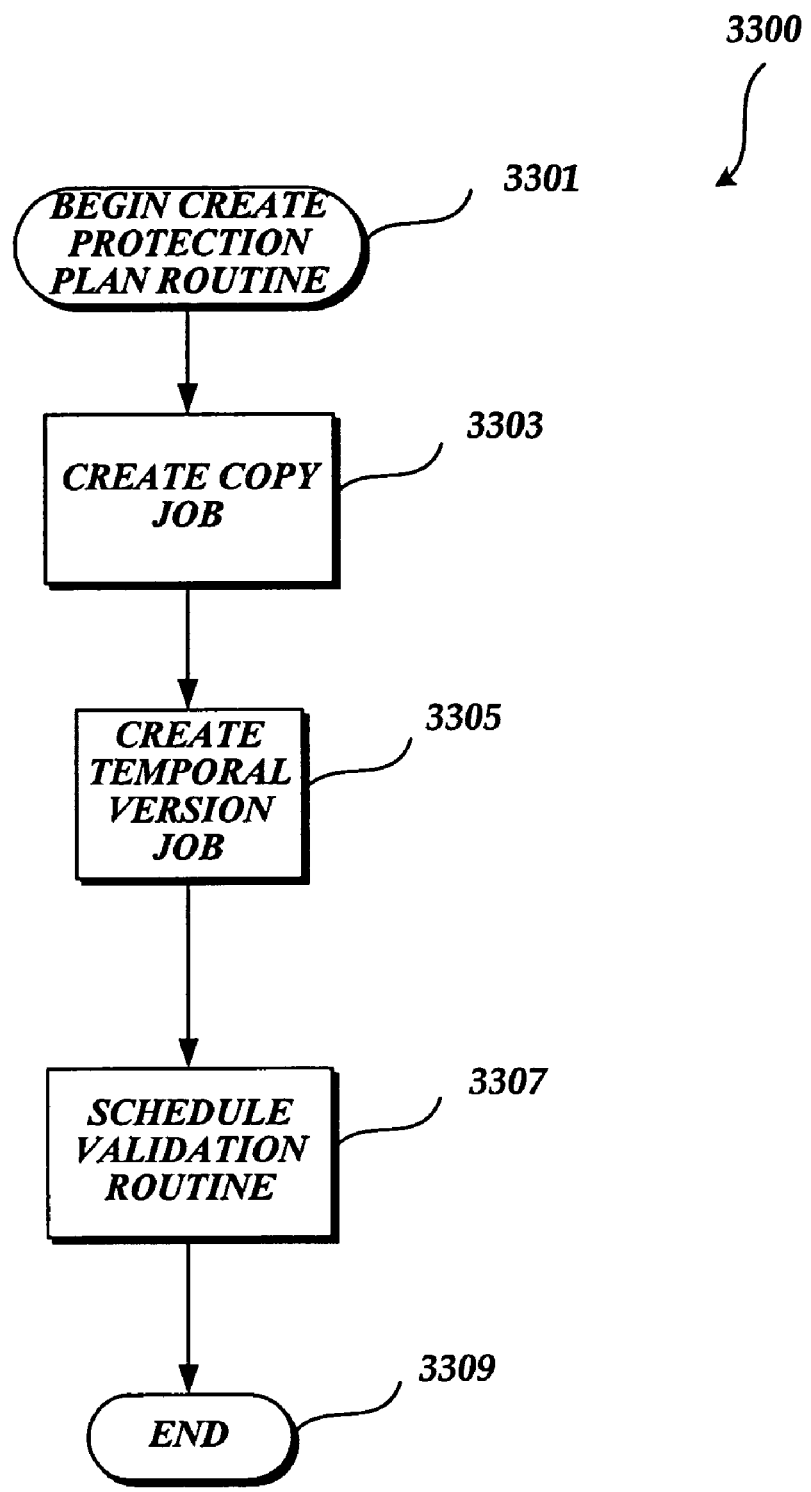
FIG. 33 is a flow diagram of a protection plan creation routine for creating a protection plan for a protected group, in accordance with an embodiment of the present invention.

FIG. 33 is a flow diagram of a protection plan creation routine for creating a protection plan for a protected group, in accordance with an embodiment of the present invention. The protection plan creation routine 3300 describes in more detail the creation and scheduling of a protection plan referred to above with respect to block 3219 (FIG. 31). The protection plan creation routine 3300 begins at block 3301 and at block 3303 a copy job for the protected group is created and scheduled. A copy job is a job that copies changes that have occurred to one or more protectable objects at a production location to a copy of the corresponding one or more protectable objects stored at a storage location. For example, if during the day a user modifies protected objects located at the production location, upon execution of a copy job, those changes are copied, transferred to the storage location, and the copy is updated to include those changes.

At block 3305 the protection plan creation routine 3300 creates and schedules a temporal version job. A temporal version job is a job scheduled to perform the actual versioning of data at the storage location. Creation of temporal versions is known by those skilled in the relevant art and will not be described in detail herein.

At block 3307 a validation routine is created and scheduled. When executed, the job performs the validation routine as described in detail below with respect to FIG. 35. At block 3309 the protection plan creation routine 3300 completes.

Figure 34:
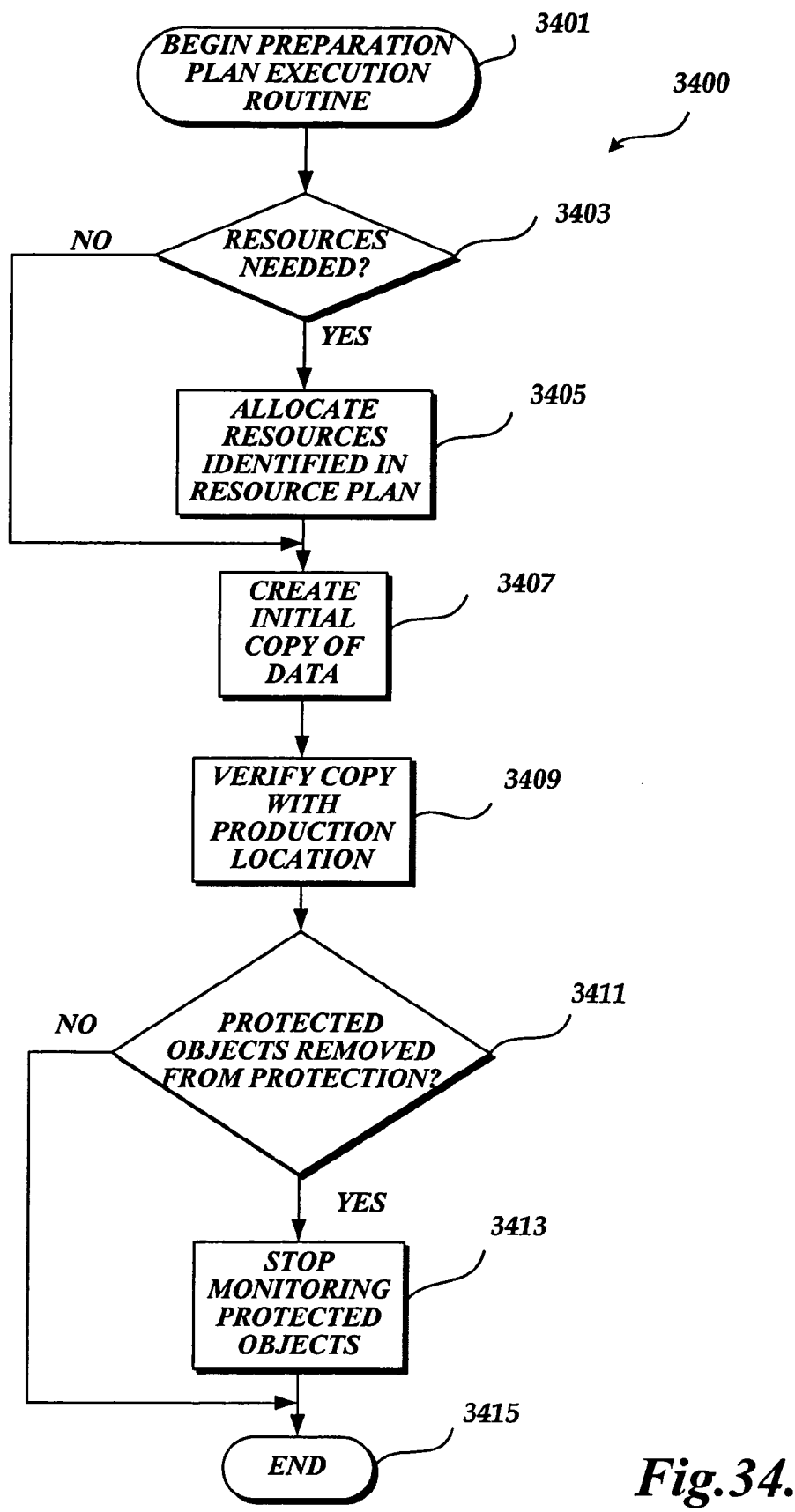
FIG. 34 is a flow diagram of a preparation plan execution routine for execution a preparation plan, in accordance with an embodiment of the present invention.

FIG. 34 is a flow diagram of a preparation plan execution routine for executing a preparation plan, in accordance with an embodiment of the present invention. The preparation plan execution routine 3400 begins at block 3401 and at block 3403 a determination is made as to whether additional resources are needed for protecting the protected group. As described above, a resource plan is generated for determining the resources necessary for protecting a protected group at a storage location. In one embodiment, those resources may be allocated during the resource plan prior to creation and execution of a preparation plan.

If it is determined at decision block 3403 that resources are needed, at block 3405 the jobs created in the resource plan for allocating those resources are executed and the resources are allocated.

Subsequent to the allocation of resources at block 3405, or if it is determined at block 3403 that additional resources are not needed for protection of the protected group, at block 3407 an initial copy of the physical objects associated with the protected group is created, transferred to the storage location, and stored on the previously allocated resources. Once the initial copy of the protected group is created and stored at the storage location, for replication, at block 3409 that copy is validated with the actual physical objects located at the production location. Validation will be discussed below with respect to FIG. 35.

At decision block 3411 a determination is made as to whether any protected objects have been removed from the protected group. If it is determined at block 3411 that protected objects have been removed from the protected group, at block 3413, the preparation plan includes jobs to stop monitoring those objects and those objects remain protectable objects. Since monitoring consumes resources, the jobs stop monitoring when it is no longer needed. At block 3415 the preparation plan execution routine 3400 completes.

As mentioned above, more or fewer blocks may be used for performing the routines described herein. For example, when copying is accomplished via media load, the preparation plan 3400 does not create an initial copy of the data (block 3407). Likewise, when the copy is for archive, the preparation plan 3400 does not create an initial copy of the data (block 3407).

Figure 35:
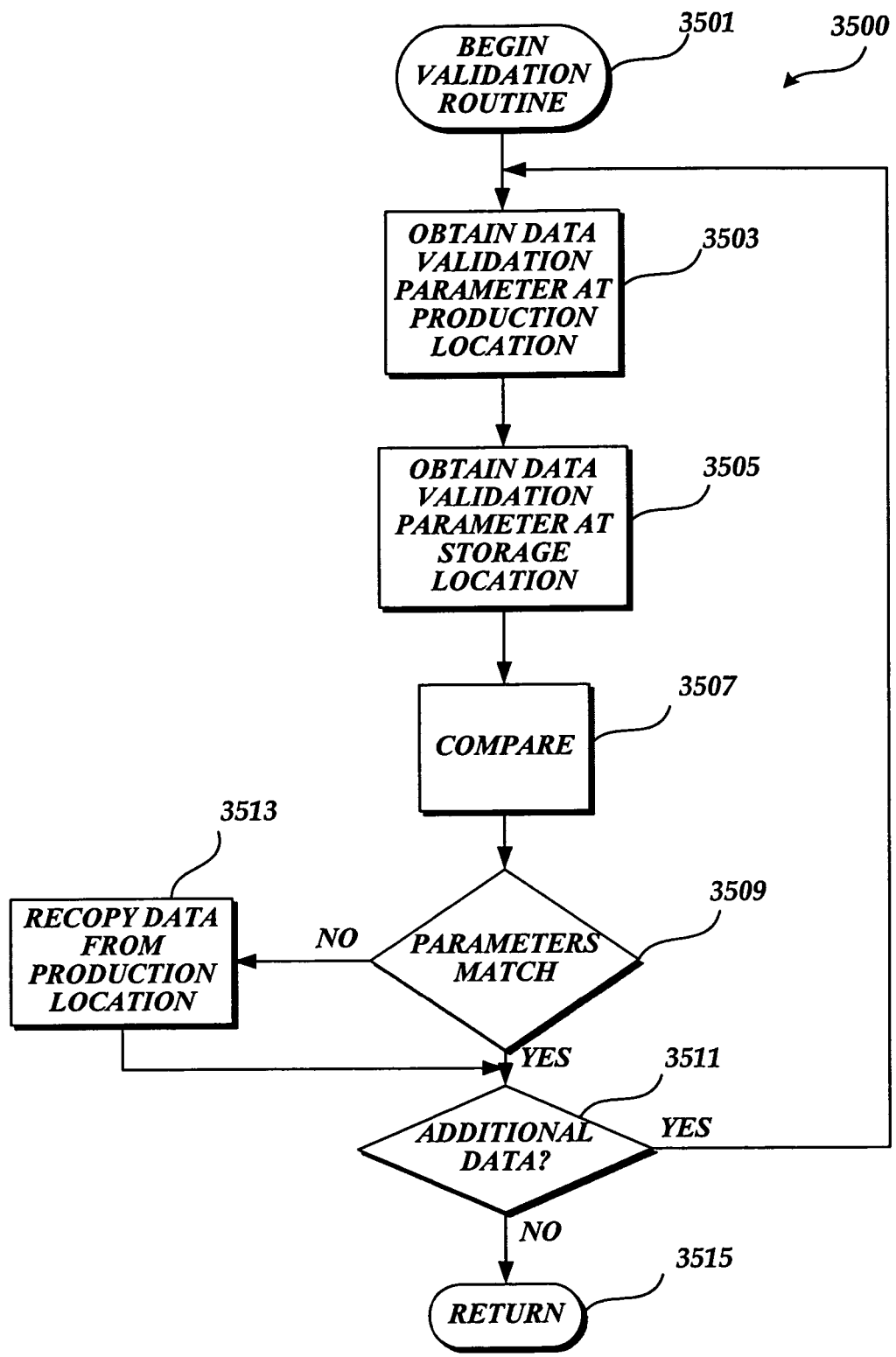
FIG. 35 is a flow diagram of a validation routine for validating a copy of data located at a storage location, in accordance with an embodiment of the present invention.

FIG. 35 is a flow diagram of a validation routine for validating a copy of data located at a storage location, in accordance with an embodiment of the present invention. The validation routine 3500 begins at block 3501, and at block 3503 the validation routine 3500 obtains a validation parameter for physical objects located at a production location. As will be appreciated by one skilled in the relevant art, a validation parameter may be a checksum of the physical objects located at the production location. Alternatively, a validation parameter may be a last change time of the physical objects at the production location, or a size of the physical objects located at the production location. In general, the validation parameter may be any type of identification for physical objects located at the production location.

At block 3505 the validation routine 3500 obtains a validation parameter for the objects located at the storage location. Similar to the validation parameter for objects at a production location, the validation parameters of objects at a storage location may be a checksum, last change time, file size, etc.

At block 3507 the validation parameters of the protected objects at the production location obtained in block 3503 and the validation parameters of the objects at the storage location obtained in block 3505 are compared to confirm that the objects located at the storage location match the protected objects located at the production location. At decision block 3509, a determination is made as to whether the parameters compared at block 3507 match. If it is determined at block 3509 that the parameters do not match, at block 3513 the validation routine 3500 recopies the non-matching protected objects from the production location and replaces the objects located at the storage location and proceeds to decision block 3511.

However, if it is determined at decision block 3509 that the parameters match, at decision block 3511 a determination is made as to whether there is additional data that has not yet been validated for the protected group. If it is determined that there is additional data located at the storage location that has not been validated for the protected group, the validation routine returns to block 3503 and the process continues. Alternatively, if it is determined at decision block 3511 that there is no additional data, the storage location is validated, and the validation routine completes at block 3515, thereby confirming that the objects located at the storage location match the protected objects.

In addition to the validation routine executing as part of the preparation plan during intent translation to confirm the accuracy of a copy, validation routines may be scheduled to subsequently reconfirm the accuracy of the protection of physical objects. Still further, a validation routine may be scheduled and executed to place a copy of objects located at a storage location into a valid state. A copy of physical objects located at a storage location may be in an invalid state if the system crashes or if some other type of unscheduled change occurs. For example, a replica may become invalid if a change log (discussed below) overflows due to a failure to apply those changes at the storage location.

Figure 36:
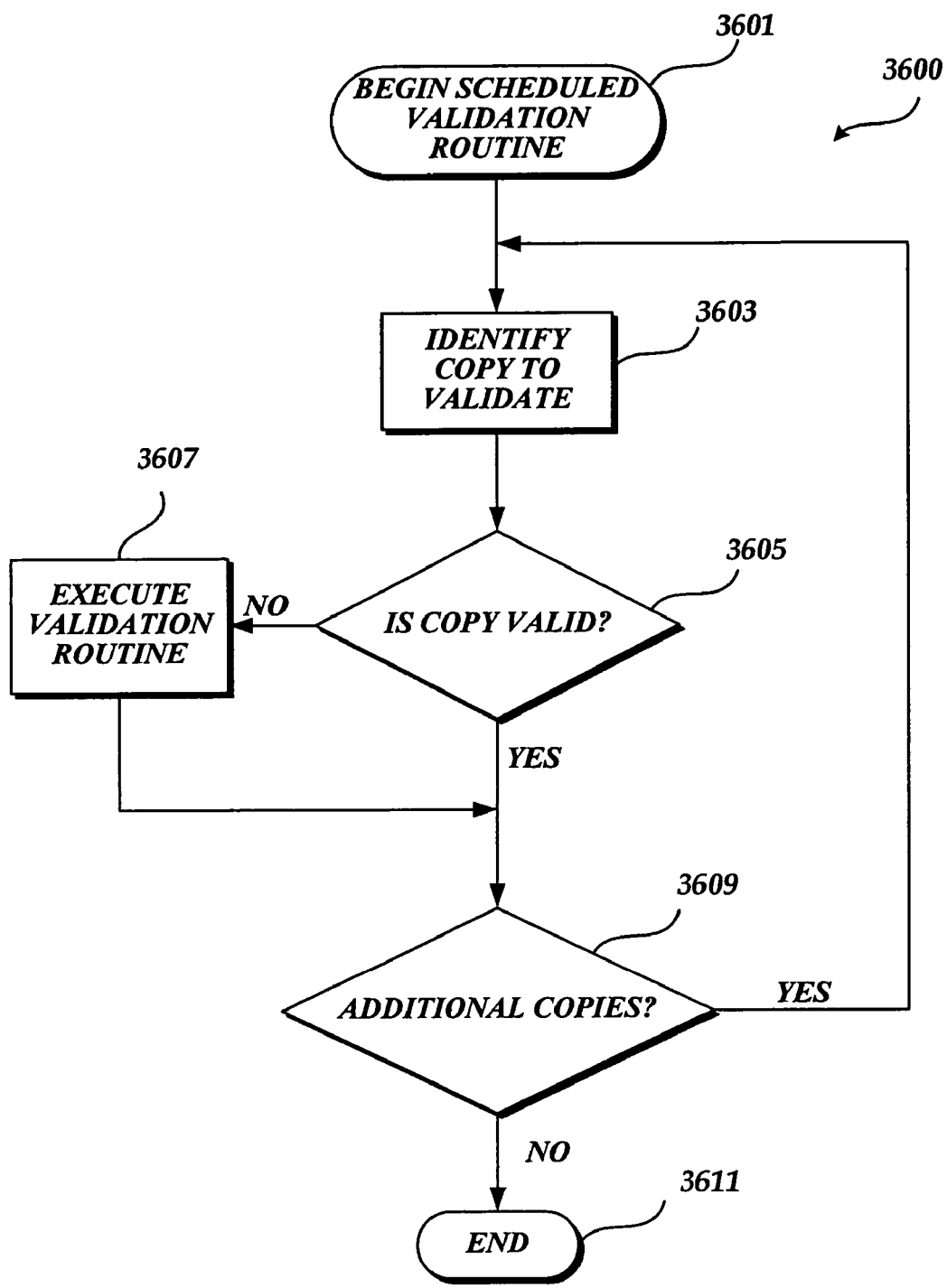
FIG. 36 is a flow diagram of a scheduled validation routine for validating a copy of objects located at a storage location, in accordance with an embodiment of the present invention.

FIG. 36 is a flow diagram of a scheduled validation routine for validating a copy of objects located at a storage location, in accordance with an embodiment of the present invention. The scheduled validation routine 3600 begins at block 3601 and at block 3603 the routine identifies the copy of objects of a protected group that are located at a storage location that are to be validated. At decision block 3605, a determination is made as to whether the identified copy is in a valid state or an invalid state. If it is determined at decision block 3605 that the identified copy is in an invalid state, at block 3607 the scheduled validation routine 3600 executes the validation routine 3500 described with respect to FIG. 35.

However, if it is determined at decision block 3605 that the copy is in a valid state, at decision block 3609 a determination is made as to whether any additional copies of protected groups located at a storage location need to have their validity confirmed. If it is determined at decision block 3609 that additional copies need to have their validity confirmed, the scheduled validation routine 3600 returns to block 3603 and identifies the additional copies to be validated and continues with that process. However, if it is determined at decision block 3609 that there are no additional copies located at the storage location that are to be validated, the scheduled validation routine 3600 completes, as illustrated by block 3611.

Figure 37:
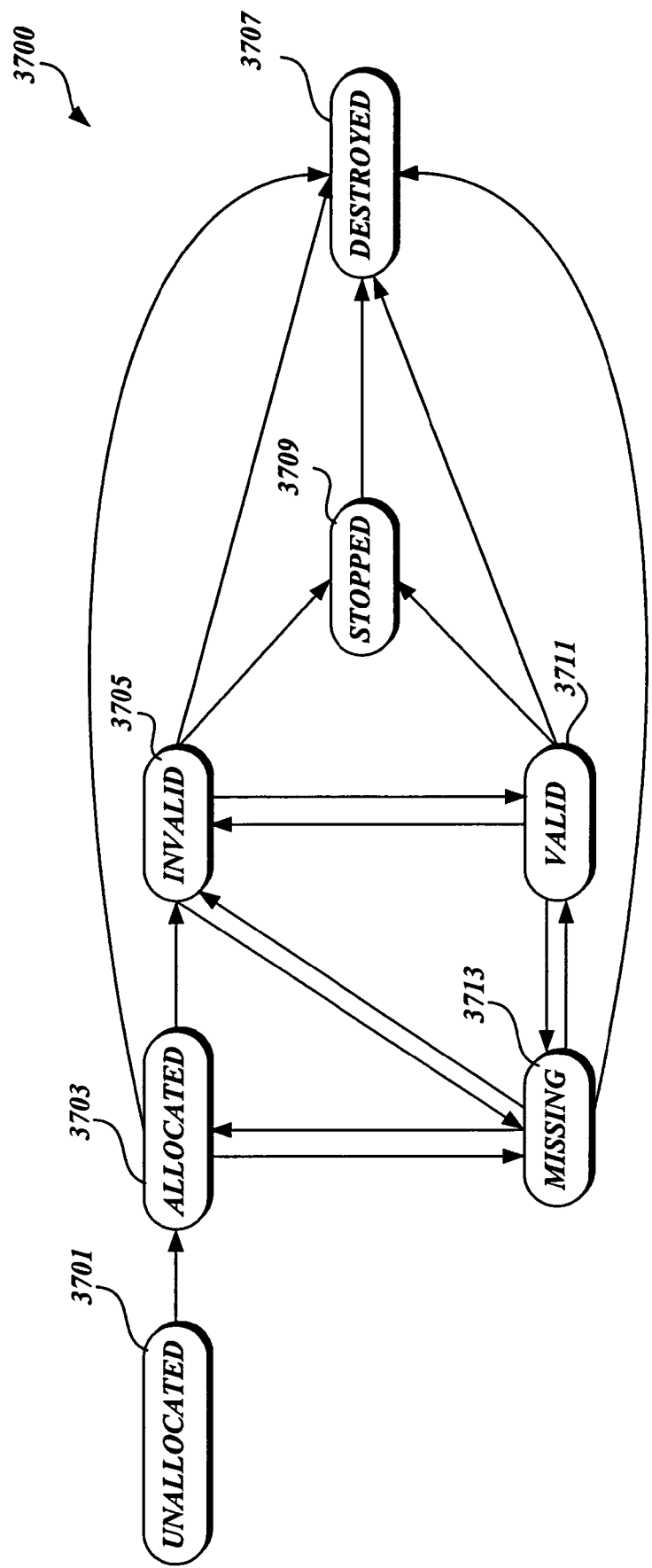
FIG. 37 illustrates a block diagram of state transitions for a storage portion of a storage location and/or an entire storage location, in accordance with an embodiment of the present invention.

FIG. 37 illustrates a block diagram of state transitions for a replica, in accordance with an embodiment of the present invention. Prior to allocating part of a storage location during resource allocation, the replica is in an unallocated state. After intent translation allocates the resources for a protected group, the replica transitions to an allocated state. The contents (copy of the protected group) must then be transferred and stored at the storage location. Transfer and storage may be accomplished using either disk-to-disk initialization (automatically by the data protection system), by an automated media load, or manually by the administrator (for example, by a manual media load). If disk-to-disk initialization is done, the intent translator automatically creates an initial copy job. The initial copy job, upon execution, will place the replica in an invalid state. If the copy is initialized using a media load, then the user indicates when the media load is complete and the replica is placed in an invalid state at that point.

Once the replica is in an invalid state, it is necessary for a validation job to be run to place it into a valid state. As discussed above, a validation job makes sure that the copy at the storage location matches the protected objects at the production location.

In addition to a replica being in an allocated state 3703, an invalid state 3705, or valid state 3711, a replica may transition to a missing state 3713. For example, over time, the physical media allocated for a replica for a particular protected group may fail, thereby placing the replica in the missing state. From the missing state 3713, the data protection system, with interaction from a user, determines whether the information that was being replicated needs to continue being protected. If the protected group is to have continued protection, resources are reallocated, thereby transitioning the replica back to an allocated state 3703. If it is determined from the missing state 3713 that the information associated with that replica no longer needs to be protected, the replica may transition to the destroyed state 3707, and replication for the protected group will no longer be performed by the data protection system.

The replica may also temporarily transition to the missing state 3713. For example, a disk may be temporarily disconnected or unavailable due to some hardware problem and subsequently become available again. In such an instance, upon the disk becoming available again, the replica may return to the valid state 3711 or the invalid state 3705

The destroyed state 3707 is reached in response to a user indicating that it no longer wants to protect the protected group. A replica may transition to the destroyed state 3707 from any other state. For example, if a replica is in the invalid state 3705, a user may indicate that it no longer wants to protect the protected objects copied on the replica, thereby transitioning the replica to the destroyed state 3707. Placing a replica in a destroyed state indicates to the data protection system that the user is done protecting the protected objects copied on the replica and the physical media, such as a hard disk, may be returned to the free media pool and may be allocated to other protected groups.

In an embodiment of the present invention, when a user indicates that it no longer wants to continue protection of the protected objects copied on the replica, the replica may transition to a stop state 3709, whereby the replica and its temporal versions are maintained for a finite period of time. Maintaining information after it has been indicated as no longer protected provides a user with the ability to recover that information up to the point it stopped protection.

Figure 38:
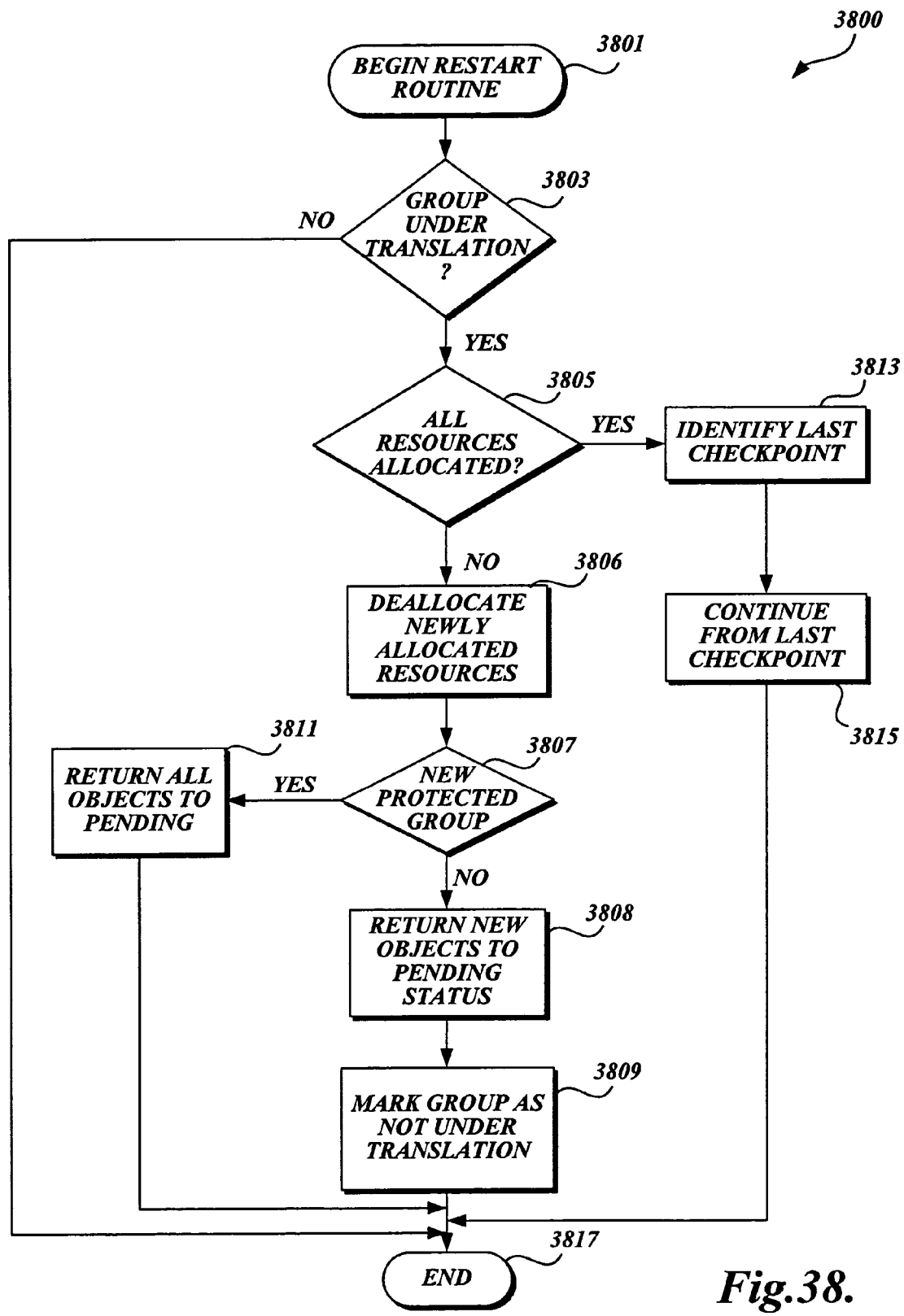
FIG. 38 illustrates a flow diagram of a restart routine for restarting the intent translation routine subsequent to an interruption that occurred during a previous intent translation routine, in accordance with an embodiment of the present invention.

FIG. 38 illustrates a flow diagram of a restart routine for restarting the intent translation routine subsequent to an interruption that occurred during a previous intent translation routine, in accordance with an embodiment of the present invention. The restart routine 3800 begins at block 3801, and at decision block 3803 the routine determines whether a protected group was currently under intent translation. If it is determined at decision block 3803 that a protected group was under intent translation, at decision block 3805 a determination is made as to whether all the resources had been allocated for the protected group under intent translation. If it is determined at decision block 3805 that all the resources had not been allocated, then any resources that were allocated prior to the restart are deallocated, as illustrated by block 3806. After deallocation of any previously allocated resources, at decision block 3807 it is determined whether the protected group under intent translation was a new protected group. If it is determined at decision block 3807 that the protected group is not a new protected group, at block 3808 the routine returns new objects that have been added to the existing protected group to a pending status. In particular, the new objects are returning to not protected by the user and pending user action.

At block 3809 the existing protected group is marked as not being under translation and at block 3817 the routine completes. Returning the existing group to not being under translation, and returning the new objects to a pending status returns the data protection system to its state prior to the attempted translation. In particular, the new objects must again be added to an existing protected group and objects of an existing protected group continue to be protected as they were protected prior to the initial attempt at the intent translation routine.

Referring back to decision block 3807, if it is determined that the protected group that was under intent translation when the interruption occurred was a new protected group, at block 3811 all protected objects of the new protected group are returned to a pending status (i.e., not protected by the user and pending user action) and the routine completes at block 3817. In addition to returning the objects to a pending state, the protected group may also be deleted as there are no protected objects within the group.

Referring back to decision block 3805, if it is determined that all the resources were allocated prior to the interruption, at block 3813 the last checkpoint that was generated by the attempted intent translation routine is identified. As discussed above, checkpoints are generated at two different points in the intent translation routine. In particular, a checkpoint is generated after resources have been allocated and again after the protection plan has been created or updated and after the preparation plan has been created. Once the last checkpoint has been identified at block 3813, the intent translation routine is restarted from the last checkpoint that was identified, as illustrated by block 3815 and the process completes at block 3817.

There are several ways that physical objects may be protected at a storage location. For example, replicas may be maintained on a computing device such as a server, archive copies may be stored on physical media such as tape or other removable media, etc. The type of protection desired by user is provided as part of the protection intents, or high level goals, that are translated to a set of plans by the intent translator, as discussed above. For archive of data onto tape or other removable media, data protection works by creating "datasets" which contain, via one or more physical pieces of media, a representation of data of a protected group at a specific point-in-time or changes thereof with respect to a point-in-time. A dataset is a result of one or more archive paths associated with one or more protected objects. Additionally, each dataset may contain one or more recovery sources because multiple recovery sources may contribute to a recovery, multiple datasets may also be necessary to contribute to a recovery.

Unlike other backup applications, where media is the primary object that is managed, according to an embodiment of the present invention, datasets and the association of datasets with the media are managed, instead of the media itself.

Archiving is designed to keep data over long periods of time (on the order of weeks, months or years). Archived media is typically kept offsite to protect against disasters that affect the entire production location such as an earthquake or fire. Archived media may also be kept onsite for recovery from smaller outages, including loss of a server or disk or user error. Additionally, for those embodiments utilizing both replication and archive, the archived media may be kept at the storage location with the replica, at the production location, or at a separate location.

Figure 39:
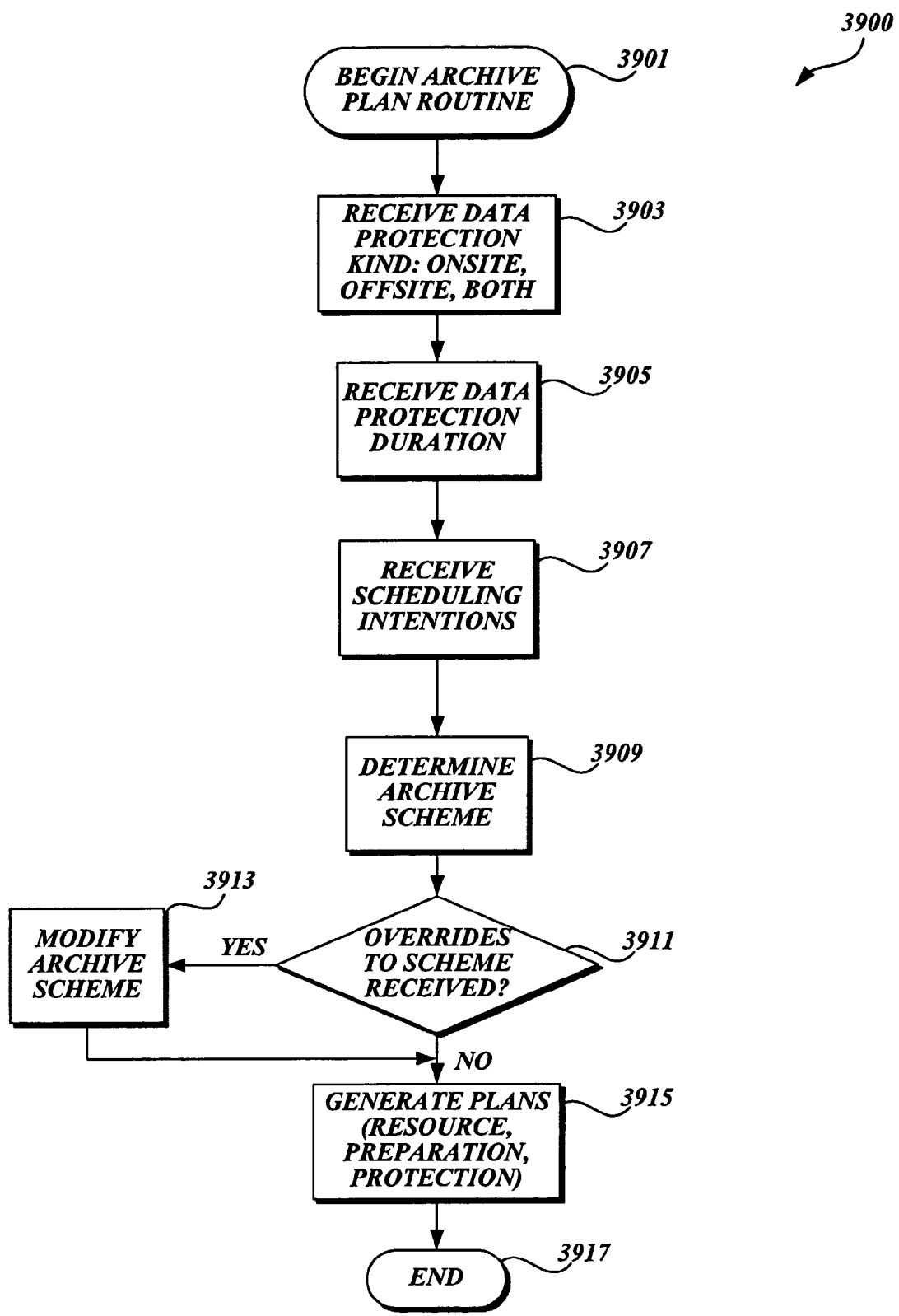
FIG. 39 illustrates an archive protection plan creation routine for generating a plan for archiving data, in accordance with an embodiment of the present invention.

FIG. 39 illustrates an archive protection plan creation routine for generating a plan for archiving data, in accordance with an embodiment of the present invention. The archive protection plan creation routine 3900 begins at block 3901, and at block 3903 the routine receives a data protection kind. A data protection kind is identified by a user as to whether they want to archive their data onsite, offsite, or both onsite and offsite. In addition to receiving a data protection kind, at block 3905 the routine receives a data protection duration. The duration of data protection is a high level intent provided by a user as to how far in the past they want to be able to recover the protected information. These intents may be stated as goals as to what a user wants to be able to recover.

For example, providing the intent of "I want to be able to recover data for up to seven years" will translate into an archive plan that will allow the user to be able to recover data for information that existed at the production location seven years ago. Data protection duration may be years, months, weeks, or days. As illustrated by block 3907, the archive protection plan creation routine 3900 also receives scheduling intentions, such as when a user wants to have the action of archiving data occur. In an alternative embodiment, a data protection format may also be received. Data protection format includes, but is not limited to, full backup, differential backup, and incremental backup. A full backup, as used herein, is a backup in which all protected objects are copied to a storage location. A differential backup, as used herein, is a backup in which protected objects that have been modified since the last full backup are copied to the storage location. Incremental backup, as used herein, is a backup in which only the protected objects that have been modified since the time of some previous backup (full, differential, or incremental) are copied. As discussed herein, differential and incremental backup are referred to generally as a "partial backup," and such is intended to identify either. A user may also specify whether the archive should be created from the original data at the production location or that the archive should be created from the copy at the storage location.

Based on the data protection kind and the protection duration, the archive protection plan creation routine 3900 determines a default archive scheme that satisfies the high level requirements specified by the user. In an actual embodiment, there are four different types of schemes for archiving data. A first scheme, referred to as a great grandfather, grandfather, father, son (GGFS) provides a yearly full backup that is maintained onsite for four weeks and a copy is maintained offsite for some number of years; a monthly full backup that is maintained onsite for four weeks and a copy is maintained offsite for a year; a weekly full backup that is maintained onsite for four weeks and a copy is maintained offsite for four weeks; and daily differential backup that is maintained onsite for two weeks. In an alternative embodiment, only onsite or offsite copies may be maintained depending on the protection kind identified in block 3903. In another embodiment, the onsite copy itself may be transferred and maintained offsite after a period of time based on the protection kind identified at block 3903. Another scheme is referred to herein as a grandfather, father, son (GFS) scheme. The GFS scheme provides a monthly full backup that is maintained onsite for four weeks and a copy is maintained offsite for a year; a weekly full backup that is maintained onsite for four weeks and a copy is maintained offsite for four weeks; and a daily differential backup that is maintained onsite for two weeks.

Another archive scheme is referred to herein as a father, son (FS) scheme. The FS scheme provides a weekly full backup that is maintained onsite for four weeks and a copy is maintained offsite for four weeks, and a daily differential backup that is maintained onsite for two weeks. Another archive scheme referred to herein is a son (S) scheme. An S scheme provides a daily full backup that is maintained onsite for one week and a copy is maintained offsite for one week. Finally, an ad hoc routine is also available that provides a backup taken outside of the normal protection scheme. This may be a full backup with no expiration that is kept onsite or offsite.

It will be appreciated by one skilled in the art that the default archive schemes may be modified at any level by the user and additional/alternative default archive schemes may also be presented. For example, the kind (onsite, offsite), duration (month, year), and format (full, differential, incremental) may be modified. Additionally, a user may specify scheduling controls for the archive scheme. For example, a user may indicate the day of the week on which the scheme is to begin, the time of the day the archives are to be generated, whether the scheme is to operate on a corporate calendar, monthly calendar, etc.

Referring back to FIG. 39, the default archive scheme is provided to a user and the user is given the ability to override any portion of the provided scheme. At decision block 3911 a determination is made as to whether the user has provided any overrides to the determined archive scheme. If it is determined at decision block 3911 that a user has provided overrides, at block 3913 the archive scheme is modified to include those overrides. Overrides may be provided for any portion of a backup scheme and may be varied in scope. For example, the overrides may include the backup format (full, differential, incremental) the number of onsite copies to be maintained, the number of offsite copies to be maintained, the retention period for offsite copies, whether to disable the S level, whether the dataset produced by the backup should be verified and when, whether the archive should take place at the production location, storage location, or elsewhere, the starting day of the week, the number of working days, etc. Disabling the S level may be desirable for a variety of reasons. For example, if a user has implemented both archive and replication, the user may decide to dispense with daily archive protection (the S level) and rely on replication to handle all onsite recovery requirements.

Once the archive scheme determined in block 3909 has either been accepted or modified as illustrated at block 3913, at block 3915 the archive plan creation routine 3900 generates the plans necessary for protecting the data by archive. As discussed above, the plans necessary for protecting data may include a resource plan, a preparation plan, and a protection plan. Finally, after the plans have been generated as illustrated by block 3915, the archive protection plan creation routine 3900 completes at block 3917.

FIG. 40 is a table illustrating an example of the different generations that may be used for generating an archive scheme, in accordance with an embodiment of the present invention. The table 4000 identifies a son generation 4001 having an incremental mode of backup that maintains one onsite copy for two weeks that occurs five days a week (e.g., Monday-Friday) and maintains no offsite copies. The father generation 4003 maintains a full mode of backup with one onsite copy that is retained for four weeks and a full backup is performed once per week (e.g., Saturday), except for one week out of each month it is not performed (e.g., the last Saturday of each month). Likewise, the father generation 4003 maintains one offsite copy for four weeks. The grandfather generation 4005 has a full mode of backup that maintains one onsite copy for four weeks that is generated once per month (e.g., the last Saturday of each month), with the exception of one month per year it is not performed (e.g., the last Saturday of the year). Additionally, the grandfather generation 4005 maintains one offsite copy for 12 months. Finally, the great grandfather generation 4007 has a full mode of backup that maintains one onsite copy that is retained for four weeks and generated once per year (e.g., the last Saturday of the year). Additionally, the great grandfather generation 4007 maintains one offsite copy for seven years.

As an alternative to scheduling according to a corporate calendar (last Saturday of the month, last Saturday of the year, etc.), scheduling may be accomplished according to a physical Calendar. For example, jobs may be scheduled to occur on the last day of the month, last day of the year, first day of the month, etc. Those days may or may not be a Saturday. As will be appreciated by one skilled in the relevant art, any type of scheduling and/or calendering may be utilized with embodiments of the present invention, and utilizing a corporate calendar or a physical calendar are provided as examples only. Another aspect of the scheduling is the ability to specify periods in which jobs are to be executed. Scheduling a period for execution times for jobs allows a user the ability to identify particular times when jobs may be performed. Additionally, the data protection system may provide advance warning when the protection system sees that jobs may not complete by the specified time. Alternatively, when a job does not complete during the scheduled period of execution time, it may be automatically terminated, and possibly rescheduled.

As will be appreciated by one skilled in the relevant art, generations such as son 4001, father 4003, grandfather 4005, and great grandfather 4007 may be modified to utilize different variations on the protection plan described with respect to FIG. 40. The only requirement is that the parent be an equal or superset of the child. For example, if the father generation is a full backup, the son generation may be a full, differential or incremental backup. Additionally, the number of copies maintained onsite or offsite may be any combination from zero to any number desired by a user. The retention time and frequency with which copies are made may also be adjusted as desired by a user.

In addition to creating an archive scheme for long-term protection of data, the data protection system provides an ongoing allocation, rotation, vaulting (offsite storage) and retirement of media. Thus, according to an embodiment of the present invention, associated with each protected group is a media pool. A media pool is both a container of media as well as an object on which various intents are placed in order to control the allocation and recycling of media. As will be described in more detail with respect to FIG. 41, there are several types of intents for controlling media allocation, such as co-location intents. Examples of co-location intents that may be used according to an embodiment of the present invention are: job collocation intents, son collocation intents, and father/son collocation intents. Job collocation intents attempt to use the same media for tasks within the same job. This reduces the number of mounts/dismounts of the media when a job has multiple tasks and the data from those tasks fit on a single piece of media. Son's collocation intent controls how media is used for the son jobs of either a GGFS, GFS, FS or S archive schemes. If the son's collocation intent is specified, the first son job of a cycle (such as a week cycle) will start on a new piece of media, but all subsequent sons will attempt to append to the same piece of media unless it is unavailable or does not contain sufficient space. Use of a father/son collocation intent will cause a weekly full and subsequent daily differential and incremental backups to be stored on the same piece of media.

Figure 41:
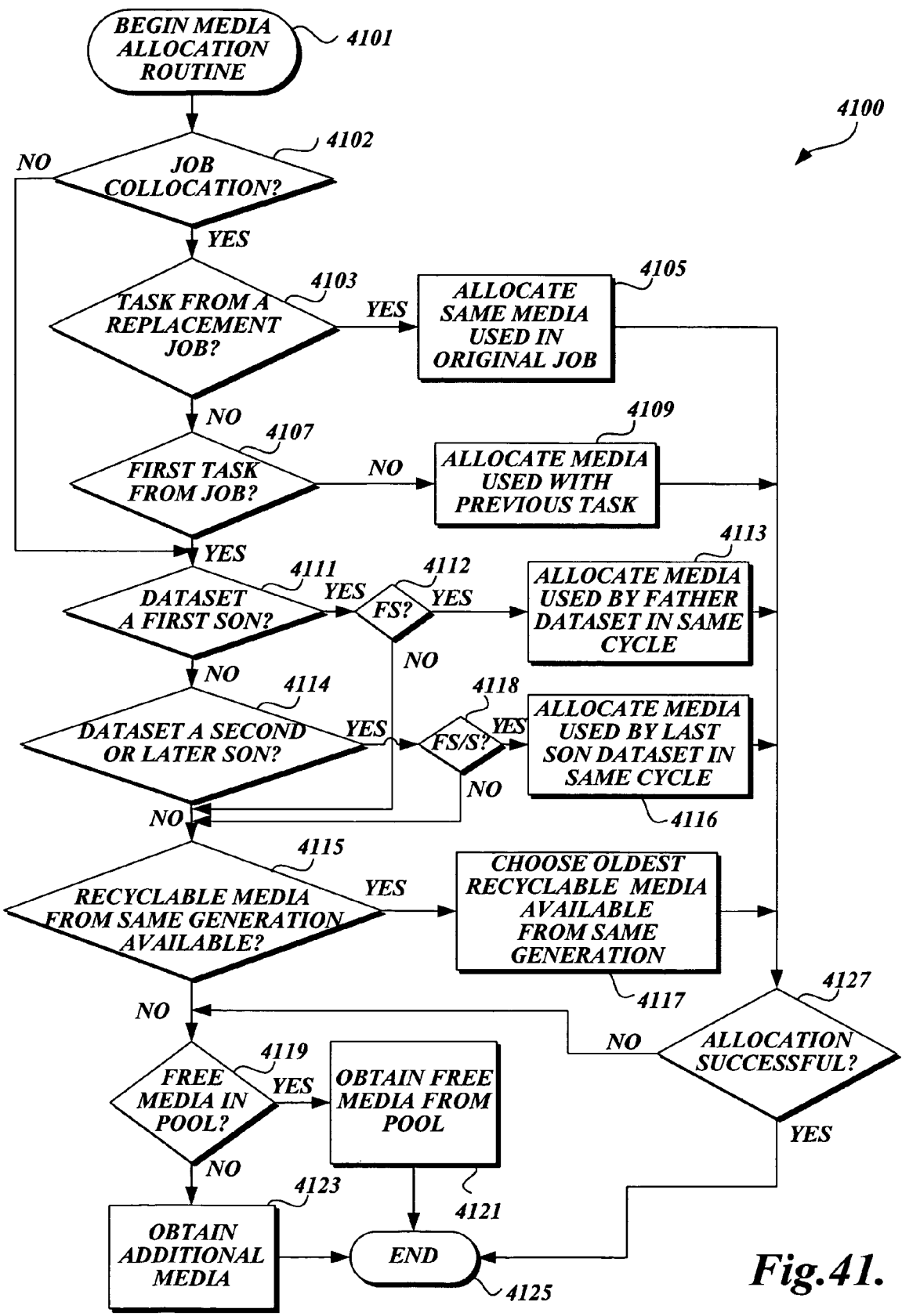
FIG. 41 is a flow routine for allocating media for archiving data, in accordance with an embodiment of the present invention.

FIG. 41 is a flow routine for allocating media for archiving data if each of the job collocation intent and the sons collocation intent have been specified, in accordance with an embodiment of the present invention. As will be appreciated, other combinations of the collocation intents may be specified for allocating media for archive, and the routine described with respect to FIG. 41 is only one example. The media allocation routine 4100 is performed whenever media is needed. The media allocation routine 4100 begins at block 4101 and at decision block 4102 it is determined whether job collocation has been specified. If it is determined that job collocation has not been specified, the media allocation routine proceeds to decision block 4111, and continues as described below. However, if it is determined at decision block 4102 that job collocation has been specified, at decision block 4103 a determination is made as to whether the task that is attempting to allocate media is from a replacement job. A replacement job is a job that is replacing a previous job that did not complete successfully. If it is determined at decision block 4103 that the task is from a replacement job, at block 4105 the routine attempts to allocate the same physical media that was used and allocated in the original job that did not complete successfully.

However, if it is determined at block 4103 that the task is not from a replacement job, at decision block 4107 a determination is made as to whether the task is the first task from a job. If it is determined that the task is not a first task from a job, at block 4109 the media allocation routine 4100 attempts to allocate media that was already allocated for previous tasks of the same job.

However, if it is determined at decision block 4107 that the task is not the first task from a job, at decision block 4111 a determination is made as to whether the dataset being protected is a first son dataset. If it is determined at block 4111 that the dataset being protected is a first son dataset, at decision block 4112 it is determined whether the FS collocation intent is specified. If the FS collocation intent is specified, at block 4113 the media allocation routine 4100 attempts to allocate media used by the father dataset of the same cycle. A cycle as described herein, is a scheduled length of time for the archive set (such as days or weeks). However, if it is determined at decision block 4112 that the FS collocation intent is not specified, the routine proceeds to decision block 4115, described below.

If it is determined at decision block 4111 that the dataset is not a son dataset or is not the first son of a cycle, at decision block 4114 it is determined whether the dataset is a second or later son dataset. If it is determined that the dataset is a second or later son dataset, at decision block 4118 it is determined whether the FS collocation intent or the S collocation intent is specified. If the FS collocation intent or the S collocation intent is specified, at block 4116 the media allocation routine 4100 attempts to allocate media used by the last son dataset of the same cycle. However, if it is determined at decision block 4118 that neither the FS collocation intent nor the S collocation intent is specified, the routine proceeds to block 4115, described below.

However, if it is determined at decision block 4114 that the dataset is not a second or later son dataset, at decision block 4115 a determination is made as to whether recyclable media from the same generation is available. For example, if a dataset is a father dataset, a determination is made as to whether there are other father datasets contained on media that is available. If it is determined at decision block 4115 that there are available recyclable media from the same generation, at block 4117 the media allocation routine 4100 chooses the oldest recyclable media available from the same generation and attempts to allocate that media.

If it is determined at decision block 4115 that there is no media available from the same generation, or if it is determined at decision block 4127 that one of the attempted allocations of blocks 4105, 4109. 4113, 4117 did not complete successfully, at decision block 4119 a determination is made as to whether there is any media in the pool that is free. If it is determined at decision block 4119 that there is media within the pool, at block 4121 the media allocation routine 4100 obtains the free media from the pool and that media is used for allocation.

Finally, if it is determined at decision block 4119 that there is no free media within the pool for the particular protected group, the media allocation routine 4100 at block 4123 attempts to obtain additional media. Additional media may be obtained by notifying the user that additional media is required for the protected pool or querying the existing free media pool. The free media pool contains media that is not associated with another protected group. If no free media is available in the free media pool, the user is notified that additional free media needs to be added to the storage location and assigned to the free media pool. The media allocation routine 4100 completes after the additional media has been allocated or it fails if additional media cannot be allocated, as illustrated by block 4125.

In addition to the intents described with respect to FIG. 41, additional intents may be utilized to control activities of a media pool. For example, a max limit intent that specifies the maximum number of pieces of media that may be maintained in a media pool may be specified by a user. Utilizing the max limit intent prevents the unnecessary additions (either by a user or automatically) of media to the pool beyond the max limit. Similarly, a max daily limit intent may be used to control the number of items of free media assigned to a particular pool during a 24 hour period. Utilization of the max limit and the max daily limit prevent unnecessary or accidental assignment of media from a free pool to a particular pool.

A minimum threshold intent may also be specified for media allocation for archive protection. The minimum threshold intent specifies the minimum number of pieces of media that should be available in the free media pool for allocation into various media pools. If the number of free media falls below the minimum amount then a user is notified that additional media needs to be added to the storage location and assigned to the free media pool. A media erase intent may also be specified which controls whether any recyclable media needs to be erased prior to it being reused or being released to the free media pool for re-allocation.

Replication or copying of protected objects from a production location to a storage location occurs between a pair of agents installed at each location. The actions of the pair of agents are controlled by the data protector. For example, for replication, a clone agent is installed at the production location and a replication agent is installed at the storage location. The actions of the clone agent and replication agent are controlled by the data protector. Additionally, a data mover acts as a conduit between the pairs of agents. The data mover ensures mutual authentication between the agents and optionally performs data encryption, decryption, compression, or decompression. Still further, the data mover includes a throttling flow control to limit the network bandwidth consumed by the data protection system during data transmission.

Figure 42:
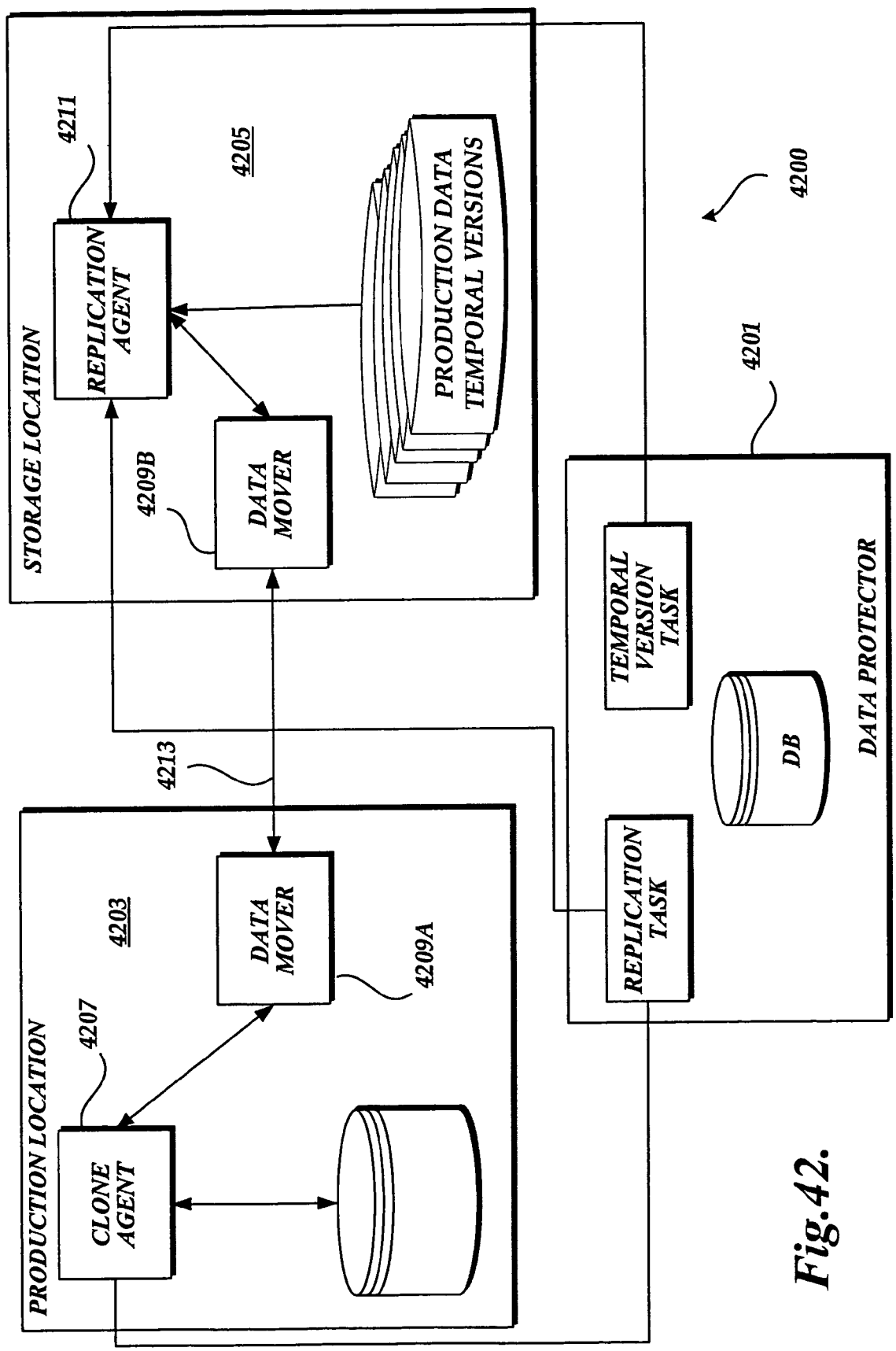
FIG. 42 illustrates a block diagram of a data protection system, in accordance with an embodiment of the present invention.

FIG. 42 illustrates a block diagram of a data protection system, in accordance with an embodiment of the present invention. The data protection system 4200 includes a data protector 4201 for managing the transfer of data (protected objects) from a production location 4203 to a storage location 4205. As mentioned above, for replication, the production location 4203 includes a clone agent 4207 and a data mover portion 4209A for controlling the flow of data from the production location 4203 to the storage location 4205. Likewise, the storage location 4205 includes a replication agent 4211 and a second portion of the data mover 4209B for obtaining information from the production location 4203. Interaction between the production location 4203, storage location 4205, and data protector 4201 is used to transfer data from the production location 4203 to the storage location 4205 and to verify the validity of the transfer of that data by communication with the data protector 4201.

Data is transmitted from the production location 4203 via the data mover 4209A through a communication channel 4213 to the storage location 4205 via the data mover 4209B. The data protection system includes the ability to monitor the transfer of data from the production location 4203 to the storage location 4205, and if such communication channel fails, has the ability to resume the interrupted data transfer. In order to be able to resume the transfer of data, as opposed to starting over, the state of the data transfer needs to be tracked and saved periodically. This is accomplished by the data protector 4201 monitoring the transfer of data from the production location 4203 to the storage location 4205.

Data is transferred over the communication channel 4213 in the form of data blocks or records. In such a transmission system, part of the data is kept by the production location 4203 and part of the data is kept by the storage location 4205. If the communication channel fails, data transfer is interrupted and the transmission state can lose synchronization. For example, the production location 4203 may have transmitted a different number of records than the number of records successfully received by the storage location 4205. To resolve this problem, the data protector 4201 monitors and controls the data transmission process by individually instructing the production location 4203 and the storage location 4205 when to stop or start data transfer.

For protection of data, the clone agent 4207 located at the production location 4203 transfers data to the replication agent 4211 located at the storage location 4205 via the data mover 4209. That data is transmitted as data records over the communication channel 4213 for the purpose of creating a replica or copy of the protected objects located at the production location. The clone agent and replication agent communicate data transfer states to the data protector 4201 as special data blocks referred to herein as record checkpoints. Record checkpoints are received by the data protector 4201 and stored in a database. Additionally, the data protector 4201 communicates instructions/commands to the clone agent and replication agent.

Generally there are two types of data records that the clone agent 4207 at the production location will transmit over the communication channel 4213. The first type of data record represents the changes that have been made to the protected objects located on the production location. The second type of data record includes information (metadata) about the protected objects data. Records containing metadata are generated by the data protection system. As described below, metadata is used to validate the copy of the data that is transmitted and stored at the storage location and may be, for example, a checksum of the data.

The state of the data transfer from a production location 4203 is communicated from the clone agent 4207 by inserting special data markers (record checkpoints) into the data record stream as it is being transmitted from a change log of the clone agent (FIGS. 43-47) to the spill log of the replication agent (FIGS. 43-47). In an actual embodiment, the record checkpoint is appended to the end of a data stream as it is being transmitted by the data mover 4209A of the production location. In an alternative embodiment, the record checkpoint may be added to the change log and transmitted along with the data stream as a item of data. Upon receipt of the data stream by the data mover 4209B of the storage location, the data and any record checkpoints are stored in the spill log.

When the replication agent 4211 encounters such record checkpoints in the data stream, it forwards those record checkpoints to the data protector 4201. In addition, the replication agent produces its own record checkpoints and forwards those to the data protector 4201 as well. Information contained in the record checkpoints generated by both the clone agent 4207 and the replication agent 4211 is used by the data protector when sending commands to start or stop operations.

When the data protector 4201 receives any of the record checkpoints, it automatically stores them in a database thereby making the data protection system resilient to communication failures, processes, and system restarts.

In an actual embodiment of the present invention, the clone agent 4207 generates two types of checkpoints referred to herein as "Class C checkpoints" and "Class A checkpoints." Class C checkpoints represent the state of data records sent from the clone agent 4207 to the replication agent 4211. Class A checkpoints represent a position within the total process of generating metadata records.

The replication agent 4211 generates one type of record checkpoint referred to herein as a "Class B checkpoint" Class B checkpoints identify the data records that have been received and applied by the replication agent 4211.

Class C and Class B checkpoints are data checkpoints. They are used to resume transmission of data from the clone agent 4207 to the replication agent 4211 and to resume application of the received data records on the replication agent 4211. Class A checkpoints are metadata checkpoints. They are used for monitoring long-running processes on the clone agent 4207 that generate metadata. Generating Class A checkpoints reduces the amount of work to be repeated for such long-running processes in the case of an interrupted data transmission.

In more detail, Class C checkpoints contain pointers to the location in the data record stream on the clone agent 4207 system and the replication agent 4211 system. Class C checkpoints are generated by the clone agent 4207 and forwarded to the replication agent 4211. The replication agent 4211 updates the Class C checkpoint with a pointer of the last received record in its spill log.

Class B checkpoints contain a pointer to the data record applied last by the replication agent 4211 at the storage location 4205. When the data protector 4201 receives a Class B checkpoint it identifies to the data protector 4201 that all the data blocks prior to the Class B checkpoint have been applied to the replica of data stored at the storage location.

Class A checkpoints indicate the amount of protected data processed by the clone agent 4207 while generating metadata. Upon receipt of a Class A checkpoint by the replication agent, the replication agent adds its own metadata if necessary and forwards the Class A checkpoint to the data protector. When the data protector receives a Class A checkpoint it means that metadata generation is complete up to the location contained in the checkpoint. In an embodiment, Class A checkpoints may be sequentially referenced (e.g., sequentially numbered) to enable the data protection system to determine if a Class A checkpoint was missed. If a Class A checkpoint is missed validation will be restarted as there is a potential that elements of the difference list may be missing. As discussed below, a difference list includes information that identifies protected objects that do not have a match at the replica. Those objects are identified by comparing the metadata generated at the production location with metadata generated at the storage location.

In addition to the three checkpoint types mentioned above, the data protector 4201 can generate a special marker token and send it to the clone agent located on the production location 4203 to be inserted into the data record stream. This token is then transmitted by the clone agent 4207, via the communication channel 4213, to the replication agent 4211. Upon receipt the replication agent 4211 transmits the token back to the data protector 4201. The purpose of the marker token is to clear all Class A checkpoints from any data communication transmission prior to resuming metadata generation. By passing all Class A checkpoints through the system, the metadata that was already generated by the clone agent 4207 is transmitted and only then is metadata generation resumed. The benefit of this is that it prevents data record transmission logs from overflowing (in case metadata generation process is much faster than the clone agent 4207 can send), and it avoids generating the same metadata multiple times, because the data protector 4201 sees all metadata prior to receiving the marker token.

Figure 43:
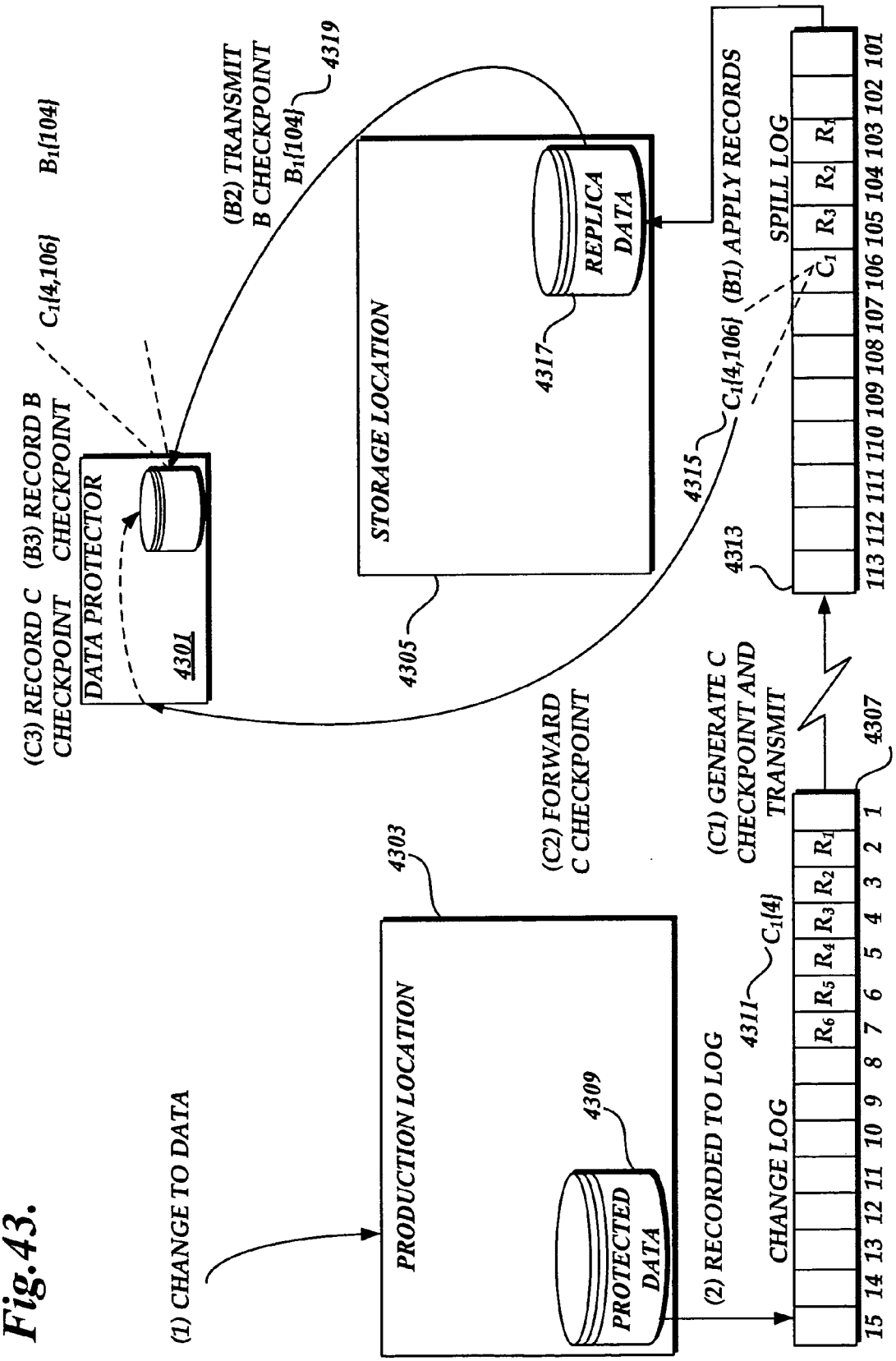
FIGS. 43-44 illustrate a flow diagram of a data transfer monitoring routine performed by a data protection system, in accordance with an embodiment of the present invention.
Figure 44:
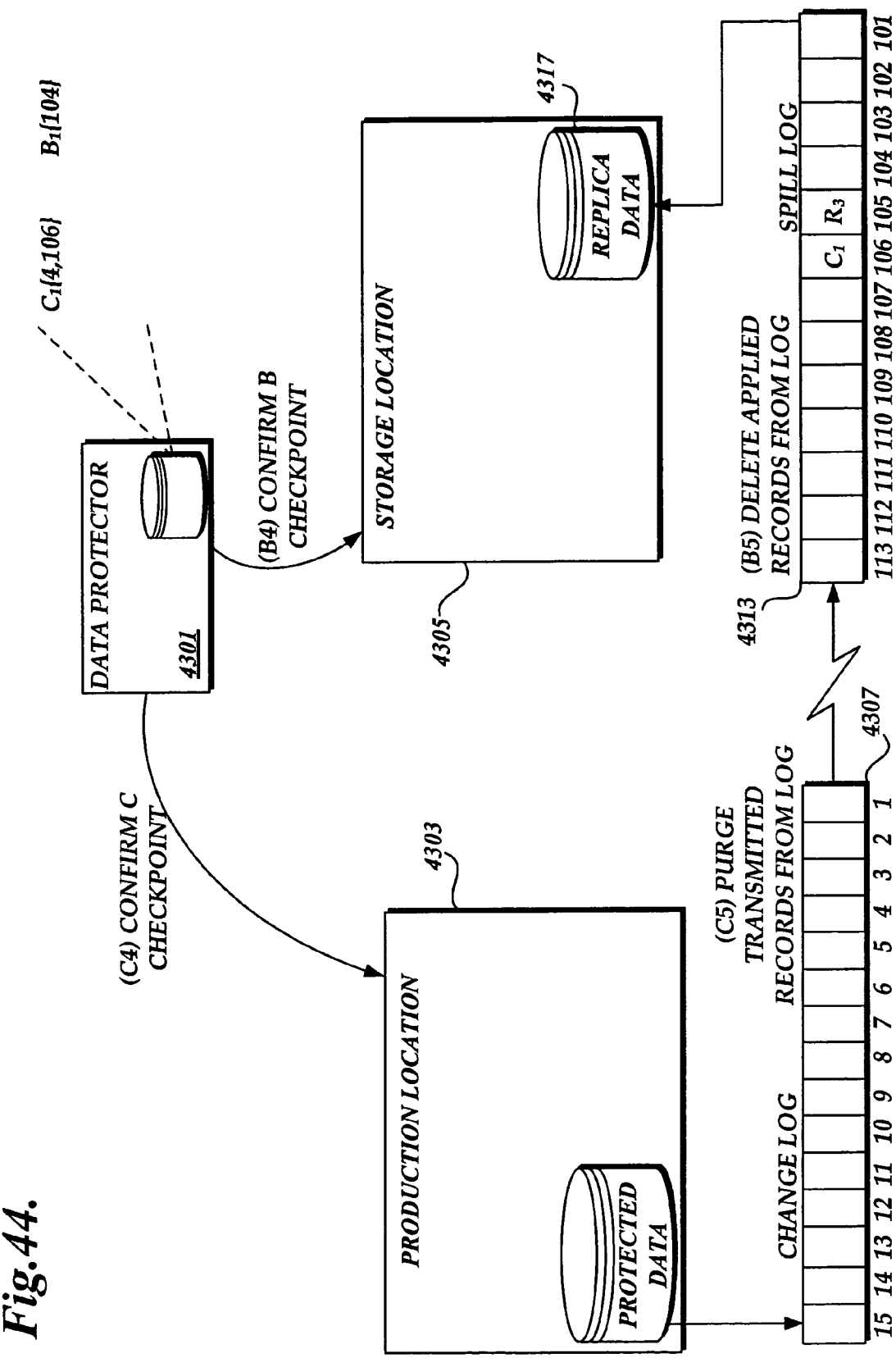

FIGS. 43-44 illustrate a flow diagram of a data transfer monitoring routine performed by a data protection system, in accordance with an embodiment of the present invention. As discussed above, data transfer between a production location 4303 and a storage location 4305 is initiated in response to a user or another individual making a change to protected data or at a scheduled job execution time. In response to a change to protected data made by a user, the production location 4303 records to a change log 4307 a record of the change to the protected data. For example, $R_1$, $R_2$, $R_3$, $R_4$, $R_5$, and $R_6$ are each change records recorded to the change log 4307 by the clone agent at the production location 4303. Periodically, the records contained in the change log 4307 are pulled from the change log 4307 by the data mover, batched together and transmitted to the storage location 4305. In addition, the clone agent generates a Class C checkpoint containing a pointer to a position in the change log 4307 of the last record being transmitted and appends the Class C checkpoint to the end of the transmission batch. For example, the clone agent may pull records $R_1$, $R_2$ and $R_3$ from the change log 4307, batch those records together and transmit the batch to the production location 4305. A Class C checkpoint 4311 is generated containing a pointer to the position in change log 4307 of $R_3$, which in this case is change log position 4. The Class C checkpoint is appended to the end of the batch that is transmitted to the production location 4305.

While the above example illustrates that a Class C checkpoint may be generated and transmitted with every transmission batch of data, in an alternative embodiment, Class C checkpoints may be generated based on the amount of data being transmitted. In such an embodiment, a Class C checkpoint may only be generated if the amount of data exceeds a predefined minimum transmission size. In yet another embodiment, generation and transmission of Class C checkpoints may be dependent upon the time since the previous Class C checkpoint was generated and transmitted. Still further, generation and transmission of Class C checkpoints may be generated and transmitted at a predetermined number of data transmissions. For example, Class C checkpoints may be generated and transmitted for every fifth data transmission. Still further, any combination of the techniques for generating and transmitting checkpoints may be utilized with embodiments of the present invention. For example, Class C checkpoints may be generated if the data exceeds a minimum size or on every fifth transmission.

The replication agent located at the storage location 4305 receives, via the data mover, the transmitted records and the Class C checkpoint and stores the transmitted records and Class C checkpoint in a spill log 4313. Additionally, upon receipt of the Class C checkpoint 4311, the replication agent of the storage location 4305 adds a second pointer to the Class C checkpoint identifying the location in the spill log 4313 of the Class C checkpoint, in this case the pointer added to the Class C checkpoint 4311 is a pointer to spill log location 106. Thus, the Class C checkpoint 4313 contains a pointer to both the location of the last transmission position of the change log 4307 and the location of the Class C checkpoint in the spill log 4313. The Class C checkpoint 4315 is then forwarded by the replication agent to the data protector 4301. The data protector 4301 records the Class C checkpoint in a database. In an alternative embodiment, the Class C checkpoint is not stored in the spill log and instead the replication agent adds a pointer to the Class C checkpoint identifying the last change record transmitted with the batch and forwards the Class C checkpoint to the data protector 4301.

Referring now to FIG. 44, the data protector 4301 upon receipt of a Class C checkpoint from the storage location 4305 stores the Class C checkpoint in a database of the data protector and transmits a Class C checkpoint confirmation to the production location 4303. Receipt of a Class C checkpoint confirmation by the production location 4303 identifies to the production location that all records transmitted prior to the Class C checkpoint have been received by the storage location 4305 and that those transmitted records may be purged from the change log 4307.

In addition to receiving records and storing those records in the spill log 4313, the replication agent located at the storage location 4305 begins applying the received records to the replica of data located at the storage location 4305. At a predetermined point, the replication agent generates a Class B checkpoint that includes a pointer to a position within the spill log 4313 of the last record applied to the replication data 4317. The predetermined point may be based on, for example, but not limited to, the amount of data processed, the time since the last Class B checkpoint, or a combination of the two. For example, the replication agent may apply $R_1$ from spill log 4313 position 103, $R_2$ from spill log 4313 location 104, and after applying $R_2$ to the replica data 4317 generate a Class B checkpoint which contains a reference to the spill log position 104. A generated Class B checkpoint 4319 is forwarded by the replication agent on the storage location 4305 to the data protector 4301. The data protector 4301 stores the Class B checkpoint in a database to allow the record to be used in case of an interruption of the data transfer.

Additionally, in response to receipt of a Class B checkpoint from the storage location 4305, the data protector 4301 stores the Class B checkpoint in its database and transmits a Class B checkpoint confirmation back to the storage location 4305. Receipt of a Class B checkpoint confirmation by the storage location 4305 identifies to the storage location 4305 that the data protector has recorded the last position of the records that have been applied to the replica data 4317 and that those records may be purged from the spill log 4313.

The process of transferring records and applying those records to replica data at a storage location and the cycling of checkpoints confirms the accuracy of transmission of records from a production location 4303 to a storage location 4305 and provides the data protector 4301 with information that it may use to restart data transmission in the result of a failure.

Figure 45:
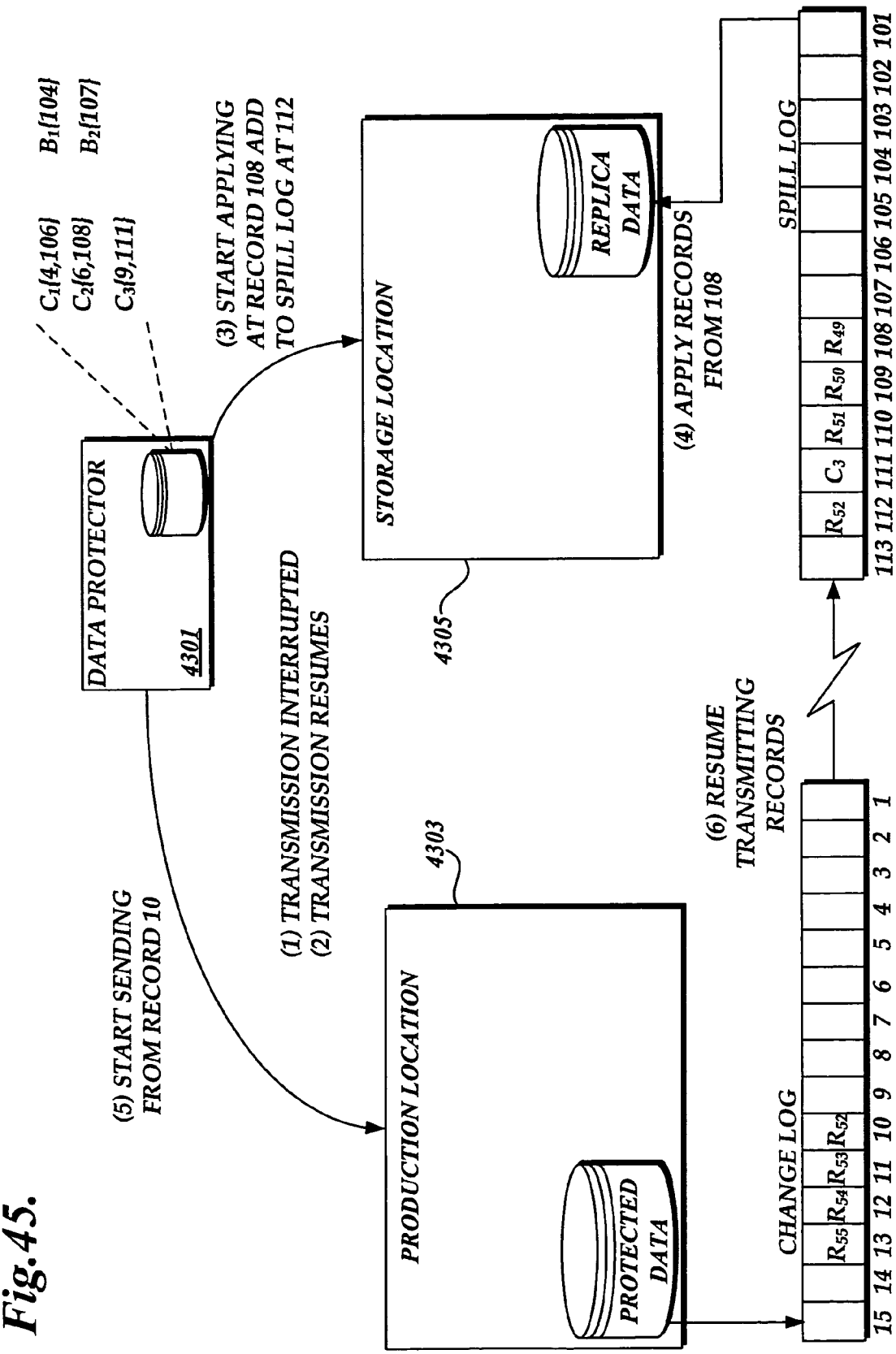
FIG. 45 illustrate a flow diagram of a data protection system that restarts transmission of change records from a production location to a storage location, in accordance with an embodiment of the present invention.

FIG. 45 illustrates a flow diagram of a data protection system that restarts transmission of change records from production location 4303 to a storage location 4305, in accordance with an embodiment of the present invention. For explanation purposes, we will assume that the system was transferring data from the production location 4303 to the storage location 4305 and for some reason the transmission was interrupted and that the system is resuming that transmission.

To resume transmission of data, the data protector 4301 refers to the last recorded Class C and Class B checkpoints stored on the database of the data protector 4301 to identify restart positions for the production location 4303 and the storage location 4305. For example, referring to the recorded Class B checkpoint of $B_2$, the data protector 4301 determines that the position in the spill log 4313 from which the last record was applied was position 107. Thus, the data protector 4301 generates a command that is transmitted to the storage location 4305 instructing the replication agent of the storage location 4305 to start applying records from spill log position 108 and to store the next received data record after spill log position 111 (i.e., spill log position 112). The position that the replication agent is start storing received records (112) is identified by referring to the last Class C checkpoint recorded in the database of the data protector 4301. In this example, the data protector 4301, referring to the Class C checkpoint of $C_3$ identifies that the last known Class C checkpoint that was received by the storage location 4305 is located at spill log position 111.

Likewise, the data protector 4301, referring to the last received Class C checkpoint of $C_3$ identifies that the last record transmitted by the production location 4303 that it knows was successfully received by the storage location 4305 was located at change log position 9. Thus, the data protector 4301 generates a command that is transmitted to the production location 4303 instructing the clone agent located at the production location 4303 to start sending records to the storage location 4305 beginning with record 10.

Overall, to efficiently resume transmission of data records, the data protector 4301 generates and sends three commands. A start sending records command is generated and transmitted to the production location 4303 identifying a transmission start point in the change log 4307. A start applying records command is sent to the storage location 4305 identifying a position within the spill log 4313 for which application is to resume. The third command, start storing received records command, is also generated and sent to the storage location 4305 identifying a position within the spill log 4313 as to where newly received records are to be stored.

Referring to checkpoints such as Class B and Class C and generating a start applying records command, a start sending records command, and a start storing received records command allows the data protection system to resynchronize itself without having to start the transmission of data from the beginning and without losing any data, by restarting from known checkpoints within the data transfer.

In addition to monitoring the transmission of change records from a production location 4303 to a storage location 4305, as discussed above, the data protection system has the ability to validate the integrity of replica data 4317 located at the storage location 4305. In an actual embodiment of the present invention, validation of data is accomplished by transmitting validation records from the production location 4303 that are compared with records at the storage location 4305.

Figure 46:
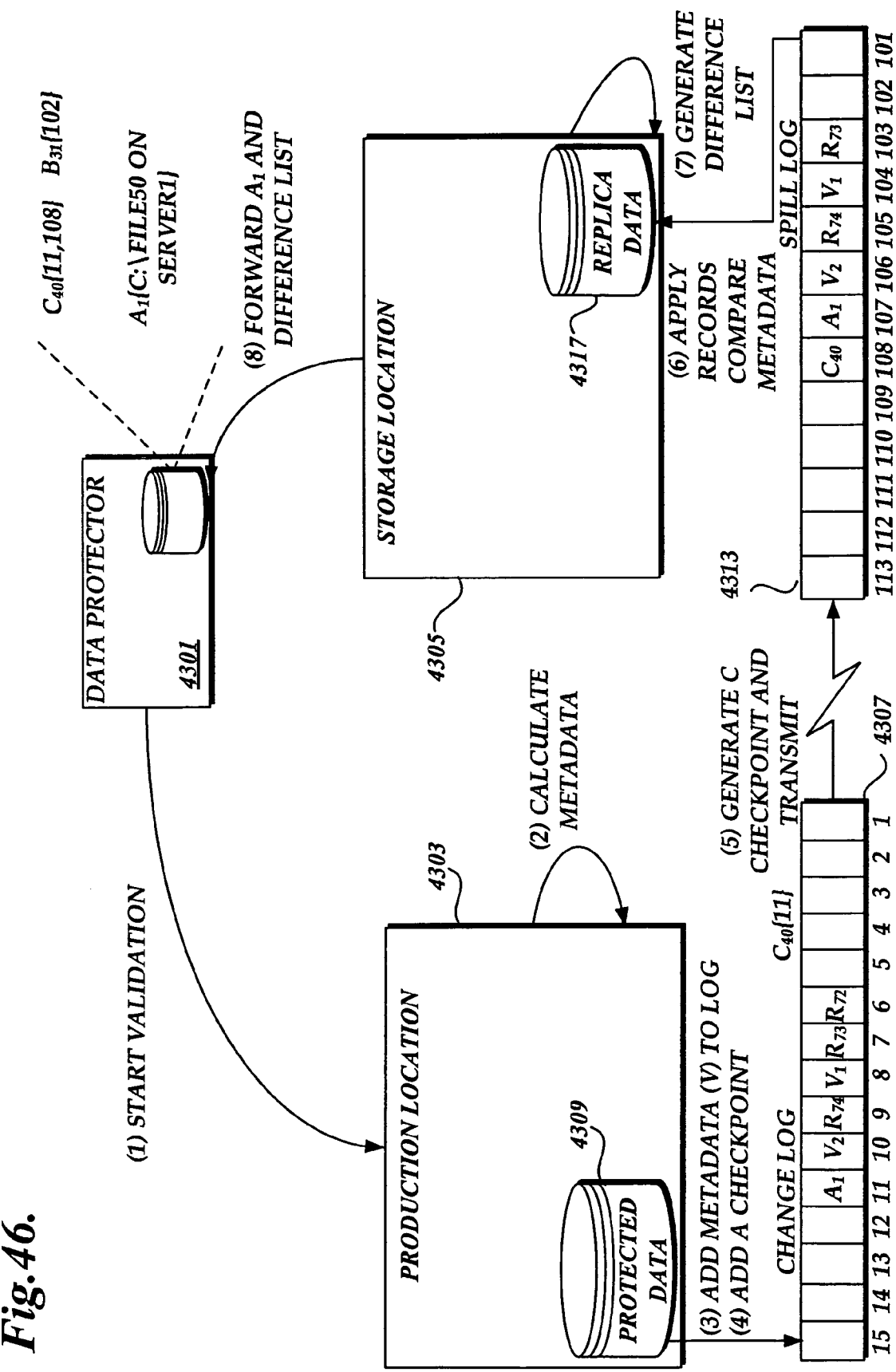
FIGS. 46 and 47 illustrate flow diagrams of a validation routine for validating a replica, in accordance with an embodiment of the present invention.
Figure 47:
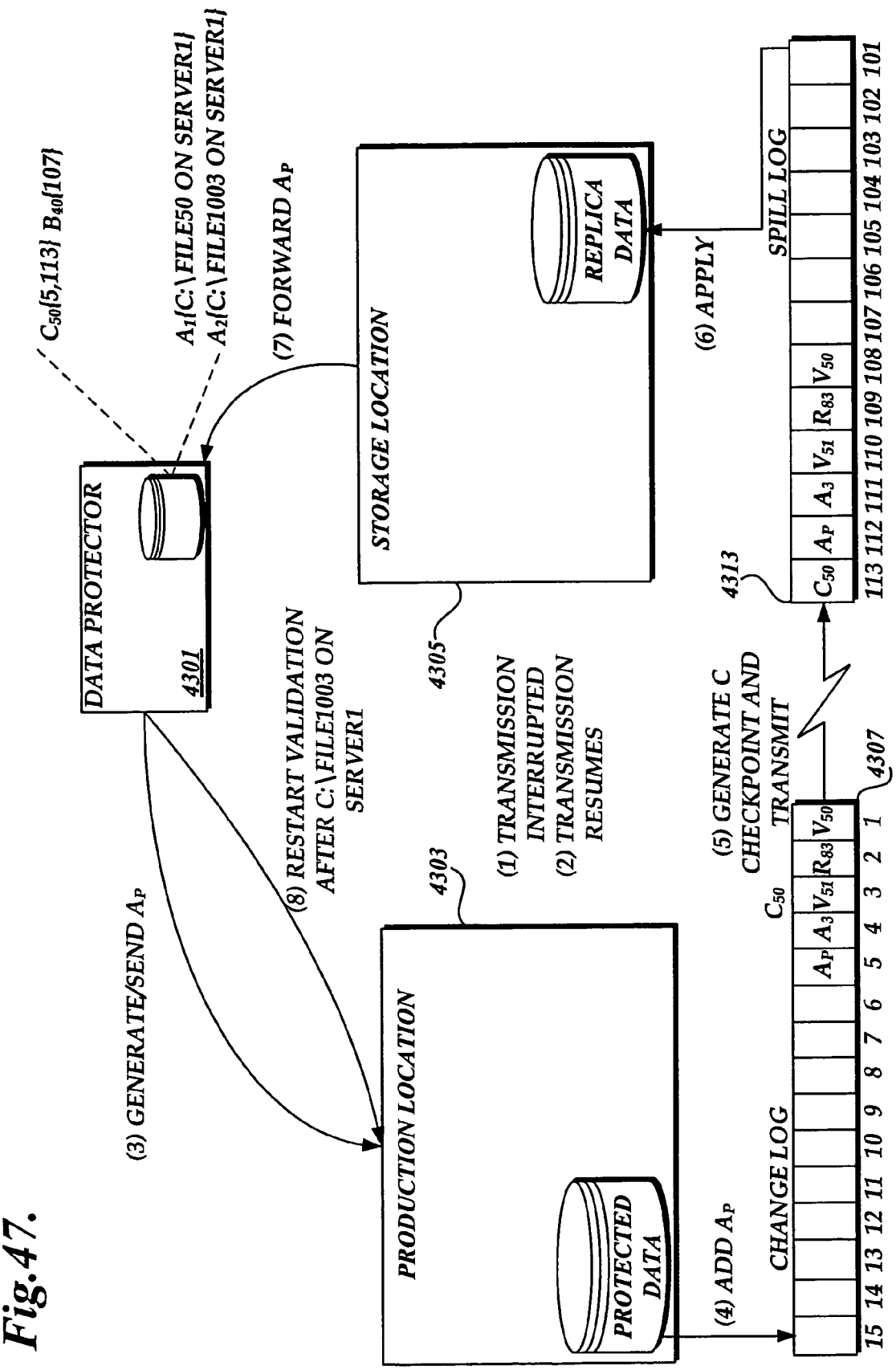

FIGS. 46 and 47 illustrate flow diagrams of a validation routine for validating a replica 4317, in accordance with an embodiment of the present invention. To begin the validation routine, the data protector 4301 generates a command that is issued to the production location 4303 to start validation. In response to receiving a start validation command, the clone agent at the production location 4303 begins generating metadata for each protected object located at the production location 4303. That metadata is added to the change log 4307 as a record and transmitted along with the change records. Records and metadata are transmitted from the change log 4307 to the storage location 4305 as discussed above. Upon receipt of a change record, the replication agent located at the storage location 4305 applies the record to the replica data 4317 as discussed above. Upon application of a metadata record, such as $V_1$, the replication agent located at the storage location 4305 calculates metadata for the same portion of the replica data 4317. The two items of metadata are compared to confirm the validity and integrity of that portion of the replica data. If the metadata does not match, the replication agent generates a difference list identifying the protected object that does not have a match at the replica 4317.

As will be appreciated by one skilled in the relevant art, comparing replica data with protected data utilizing metadata may be accomplished by generating checksums for the data to be compared and/or by comparing any other identifying indicia, such as last change time, for the data.

At a predetermined point-in-time after a set of metadata records such as $V_1$ and $V_2$ have been included in the change log 4307, the clone agent located at the production location 4303 generates a Class A checkpoint that is added as a the record to the change log 4307. The Class A checkpoint, such as $A_1$, is transmitted via a communication channel to the storage location 4305 along with the change records and the metadata records.

Upon receipt of a Class A checkpoint by the replication agent at the storage location 4305, the replication agent forwards the Class A checkpoint and any difference list that has been generated as a result of comparing metadata to the data protector 4301. As illustrated in FIG. 46 the Class A checkpoint may be maintained in the spill log until it is purged. Alternatively, upon receipt of a Class A checkpoint, it may be forwarded along with the difference list and not stored in the spill log.

The data protector 4301 receives the Class A checkpoint and the difference list and records the Class A checkpoint and difference list in a database. The difference list is forwarded to the production location and the identified protected objects are re-replicated and re-transmitted to the storage location. The re-replication and re-transmission of the identified protected objects may occur in response to receiving the difference list or may be schedule to occur at some later point in time (e.g., after validation of the replica is complete).

A Class A checkpoint includes within itself an identification of a particular protected object up to which metadata has been calculated. For example, if metadata is being generated for protected objects located on C:\ at server1 and the last protected object for which metadata was generated was C:\file50 on server1, the Class A checkpoint would contain a reference to C:\file50 on server1. That information is stored by the data protector 4301 in a database so that in the case of interruption of data transmission it will have a reference point from which to restart validation.

FIG. 47 illustrates a flow diagram describing the restart of a validation routine that is generated by the data protection system to restart validation when validation has been interrupted at a particular point-in-time, in accordance with an embodiment of the present invention. For purposes of this discussion it will be assumed first that data transmission has been interrupted and is now being resumed. When resuming data transmission, the data protector 4301 generates and sends a marker token, illustrated in FIG. 47 as $A_p$. The marker token is a unique token generated by the data protector 4301 that is cycled through the system to clear all metadata and Class A checkpoints from the system before validation of data resumes.

The marker $A_p$ is transmitted from the data protector 4301 to the production location 4303 and included in the change log 4307 by the clone agent located at the production location 4303. Upon receipt of a marker token $A_p$ by the production location 4303, the clone agent adds the marker $A_p$ to the change log 4307 and subsequently transmits the marker $A_p$ to the storage location 4305. Upon receipt by the storage location 4305 of the marker token $A_p$, the replication agent located at the storage location 4305 forwards the marker token $A_p$ back to the data protector 4301.

Upon receipt of the marker token $A_p$ by the data protector 4301, the data protector 4301 becomes aware that all metadata for the system that had previously been generated has been transmitted from the production location 4303 to the storage location 4305. The data protector 4301, referring to the database of Class A checkpoints, identifies the last Class A checkpoint that was transmitted and prepares a restart command including a position at which the production location is to restart validation of data. The data protector 4301 transmits to the production location 4303 the restart validation command and the identification of a point at which validation of data is to resume.

For example, referring to FIG. 47, the data protector 4301 identifies from its database that the last protected object for which metadata was calculated during the previous validation routine was C:\file1003 on server1. Thus, the data protector 4301 knows that metadata has been generated and transmitted for all files up to file1003 on volume C: at server1, and thus generates a restart validation command instructing the production location 4303 to restart generation of metadata after C:\file1003 on server1.

Figure 48A:
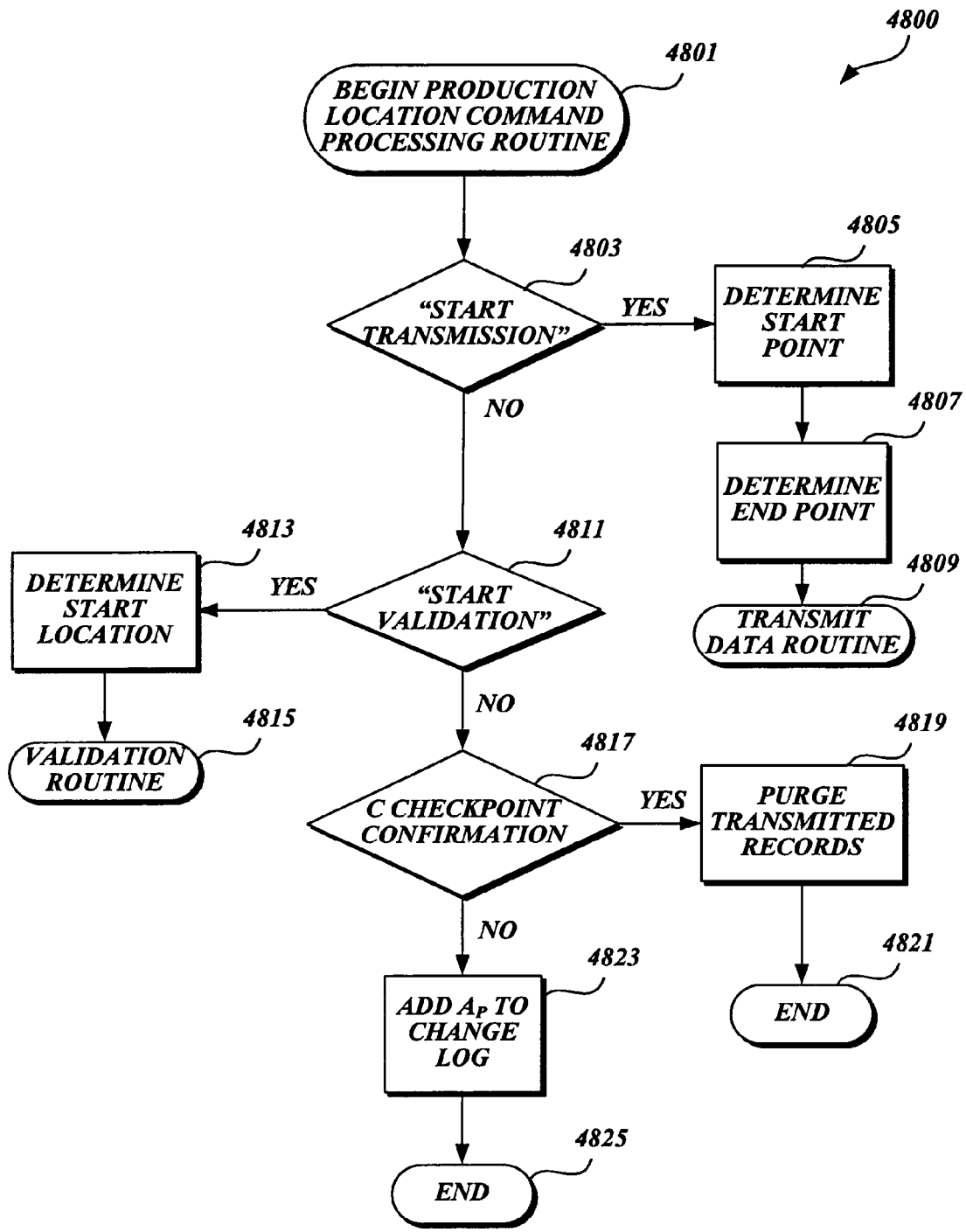
FIG. 48A is a flow diagram of a command processing routine for processing commands received by a production location, in accordance with an embodiment of the present invention.

FIG. 48A is a flow diagram of a command processing routine for processing commands received by a production location, in accordance with an embodiment of the present invention. The command processing routine 4800 begins at block 4801 and at decision block 4803 a determination is made as to whether a received command is a "start transmission" command. As discussed above, commands are generated by the data protector for controlling agents deployed throughout the data protection system. If it is determined at decision block 4803 that the received command is a "start transmission" command, at block 4805 a start transmission point is identified. A start transmission point may be included in the "start transmission" command. The start transmission point identifies a location within the change log from which data transmission is to begin.

Additionally, at block 4807 an end transmission point is identified. An end transmission point may be determined in a variety of ways. For example, an end transmission point may be identified by finding the last record contained within the change log and using it as the end transmission point, by determining a max size of the data transmission and identifying a point within the log that reaches that size, etc. Upon identification of the start and end transmission points, at block 4809 the command processing routine 4800 passing control to the data transmission flow (FIG. 48B).

Referring back to decision block 4803, if it is determined that the received command is not a "start transmission" command, at decision block 4811 it is determined whether the received command is a "start validation" command. If it is determined at decision block 4811 that the command is a "start validation" command, at block 4813 a location within the production location is identified as to where validation is to begin. As with the start and end points for transmission, the location may be contained within the start validation command or obtained separately. Upon identification of a location within the production location where validation is to begin, the command processing routing 4800 passes control to the validation routine (FIG. 48C), as illustrated by block 4815.

If it is determined at decision block 4811 that the received command is not a "start validation" command, at decision block 4817 it is determined whether the received command is a C checkpoint confirmation. If it is a C checkpoint confirmation, the records contained in the change log that were transmitted prior to the C checkpoint that has been confirmed are purged from the change log, as illustrated by block 4819, and the routine completes at block 4821. However, if it is determined at decision block 4817 that the received checkpoint is not a C checkpoint confirmation, then the received command is a marker token $A_p$. At block 4823 the marker token $A_p$ is placed in the change log and the routine completes a block 4825.

Figure 48B:
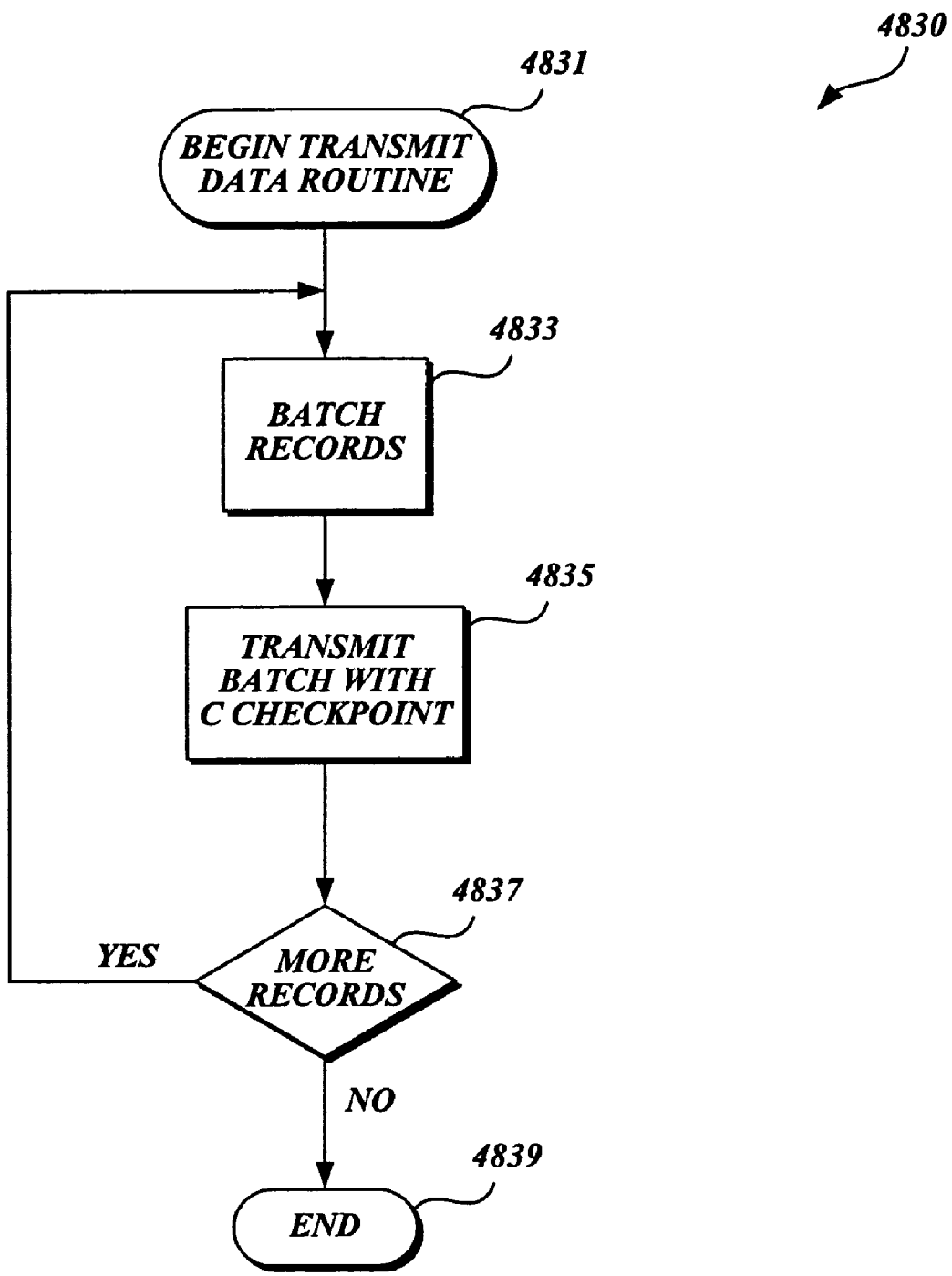
FIG. 48B is a flow diagram of a transmit data routine for transmitting change records from a production location to a storage location, in accordance with an embodiment of the present invention.

FIG. 48B is a flow diagram of a transmit data routine for transmitting change records from a production location to a storage location, in accordance with an embodiment of the present invention. The transmit data routine 4830 begins at block 4831 and at block 4833 a group of change records obtained from the change log are batched together for transmission. The batch of records may be any number of records. Creating a batch of records may occur in response to a max size of the change log being reached, after a change occurs, at a predetermined point in time. As will be appreciated by one skilled in the relevant art, the timing for generation of a batch of records, and the size of a batch of records provided are simply examples and any timing and size for creating a batch of records may be utilized with embodiments of the present invention. For example, the batch of records may only include one record and may be created every time a change occurs to the data protection system.

At block 4835 the batch of records is transmitted from the production location. In addition to transmitting the batch of records a Class C checkpoint is generated and appended to the end of the batch of records and transmitted with as part of the batch of records. As discussed above, Class C checkpoints contain pointers to the location within the change log of the last change record included in the batch of records. At decision block 4837, a determination is made as to whether there are additional records within the change log. If it is determined at decision block 4837 that there are addition records, the transmit data routine 4830 returns control to block 4833 and the routine continues. However, if it is determined at decision block 4837 that there are no more records to transmit the routine completes, as illustrated by block 4839.

Figure 48C:
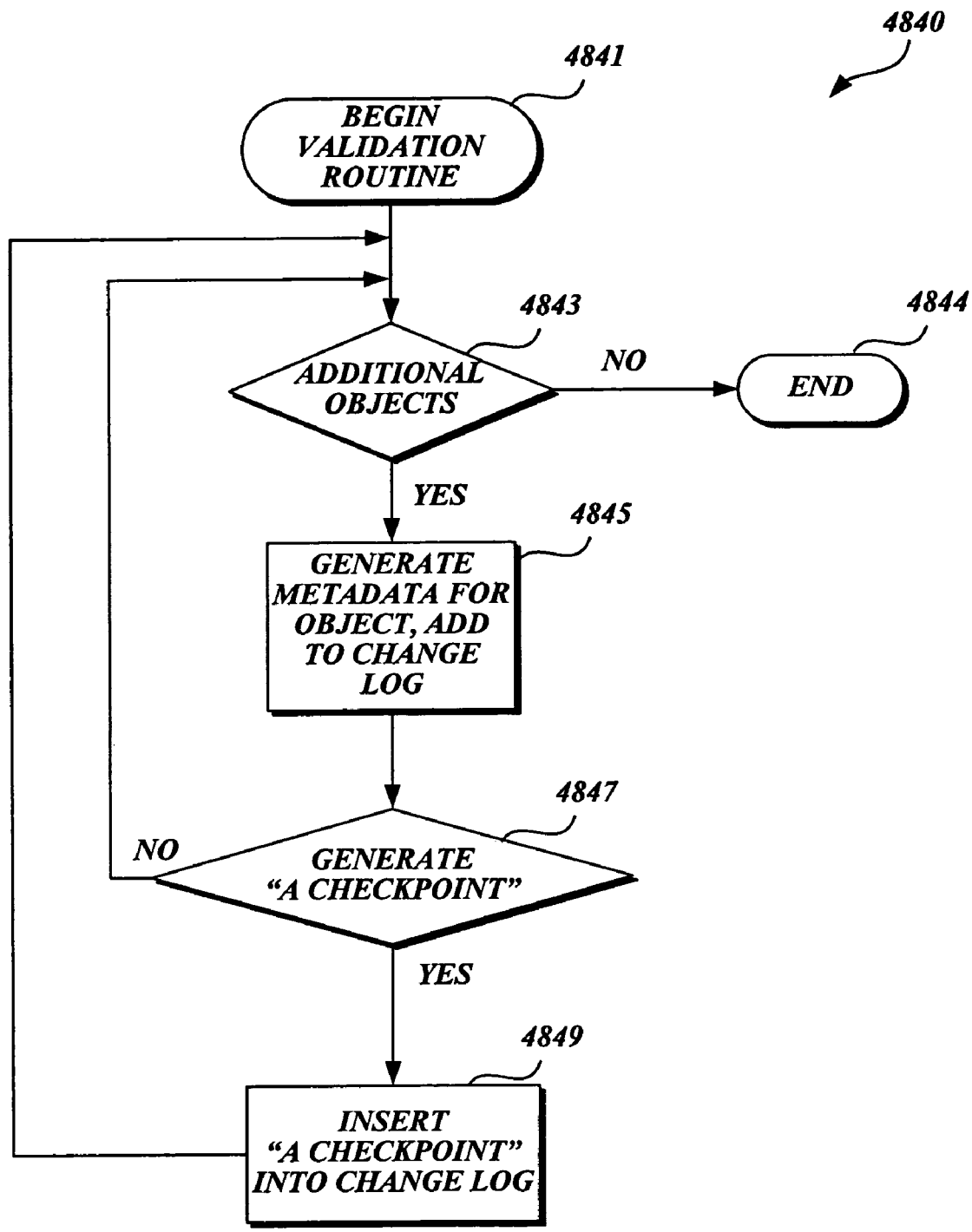
FIG. 48C is a flow diagram of a validation routine for validating data, in accordance with an embodiment of the present invention.

FIG. 48C is a flow diagram of a validation routine for validating data, in accordance with an embodiment of the present invention. The validation routine 4840 begins at block 4841 and at decision block 4843 it is determined whether there are any objects within the production location for which validation needs to occur. If it is determined at decision block 4843 that there are no additional objects to validate the routine ends, as illustrated by block 4844. However, if it is determined that there are additional objects to validate, at block 4845 metadata for an object is generated. In particular, the first object for which metadata may be generated is the object corresponding to the start location identified at block 4813 of the command processing routine 4800 (FIG. 48A). Upon generation of metadata, that metadata is added to the change log in the form of metadata record (V).

At decision block 4847 a determination is made as to whether a Class A checkpoint is to be generated and added to the change log. As discussed above, Class A checkpoints represent a position within the total process of generating and transmitting metadata records and may be used for restarting data validation. Additionally, Class A checkpoints may include sequential markers so that it may be determined if one of the transmitted Class A checkpoints was not received. If it is determined at decision block 4847 that a Class A checkpoint is to be generated, at block 4849 the checkpoint is generated and added to the change log as a record that will be batched and transmitted with other records contained within the change log. Upon addition of a Class A checkpoint to the change log, the validation routine 4840 returns control to decision block 4843 and the routine continues. However, if at decision block 4847 it is determined that no Class A checkpoint is to be generated, the validation routine 4840 returns to decision block 4843 and continues.

Figure 49A:
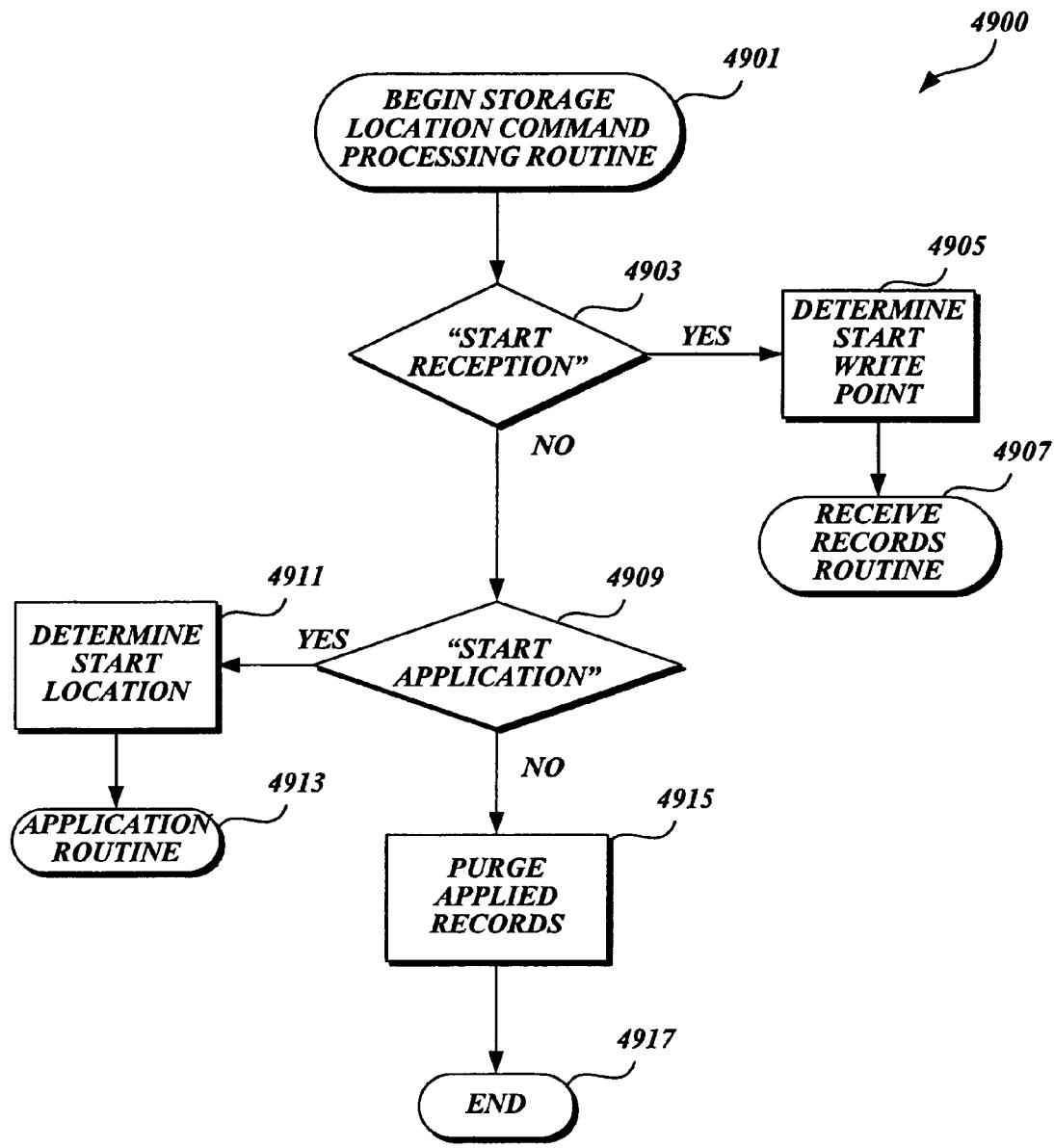
FIG. 49A is a flow diagram of a command processing routine for processing commands received by a storage location, in accordance with an embodiment of the present invention.

FIG. 49A is a flow diagram of a command processing routine for processing commands received by a storage location, in accordance with an embodiment of the present invention. The command processing routine 4900 begins at block 4901 and at decision block 4903 a determination is made as to whether a received command is a "start reception" command. A "start reception" command is an instruction to the storage location to begin receiving records that are being transmitted from a production location. If it is determined at decision block 4903 that the command is a "start reception" command, at block 4905 a starting point from within the spill log for storing received records is identified. Identification of a location within the spill log may be determined by receiving a location contained within the "start reception" command or as a separate instruction. Upon identification of a location within the spill log as to where to begin storing received records, the command processing routine 4900 passes control to the receive records routine (FIG. 49B), as illustrated by block 4907.

Referring back to decision block 4903, if it is determined that the received command is not a "start reception" command, at decision block 4909 it is determined whether the received command is a "start application" command. If the received command is a start application command, at block 4911 a starting location in the spill log from which to begin applying records is identified. As with the start receiving records location, identification within the spill log may be identified by a location being included with the "start application" command, received as a separate command, or identified by some other means. Upon identification of a location within the spill log from which to start application, the command processing routine 4900 passes control to the apply change records routine (FIG. 49C).

If it is determined at decision block 4909 that the command is not a "start application" command, then the command is a Class B checkpoint confirmation and at block 4915 all records contained within the spill log that have been applied to the copy at the storage location prior to transmission of the confirmed Class B checkpoint are purged from the log. At block 4917 the routine completes.

Figure 49B:
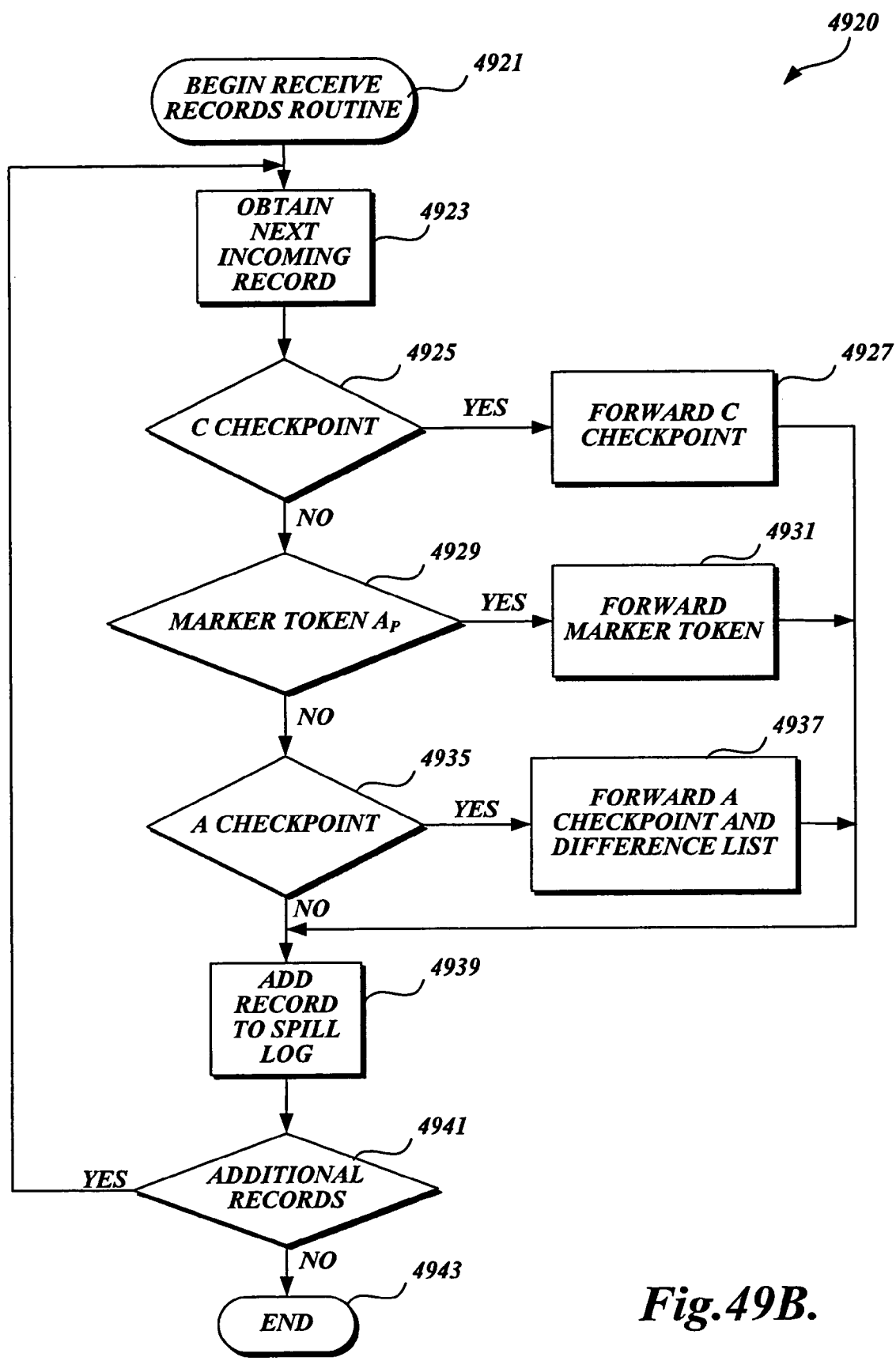
FIG. 49B is a flow diagram of a receive records routine for receiving records at a storage location, in accordance with an embodiment of the present invention.
Figure 49C:
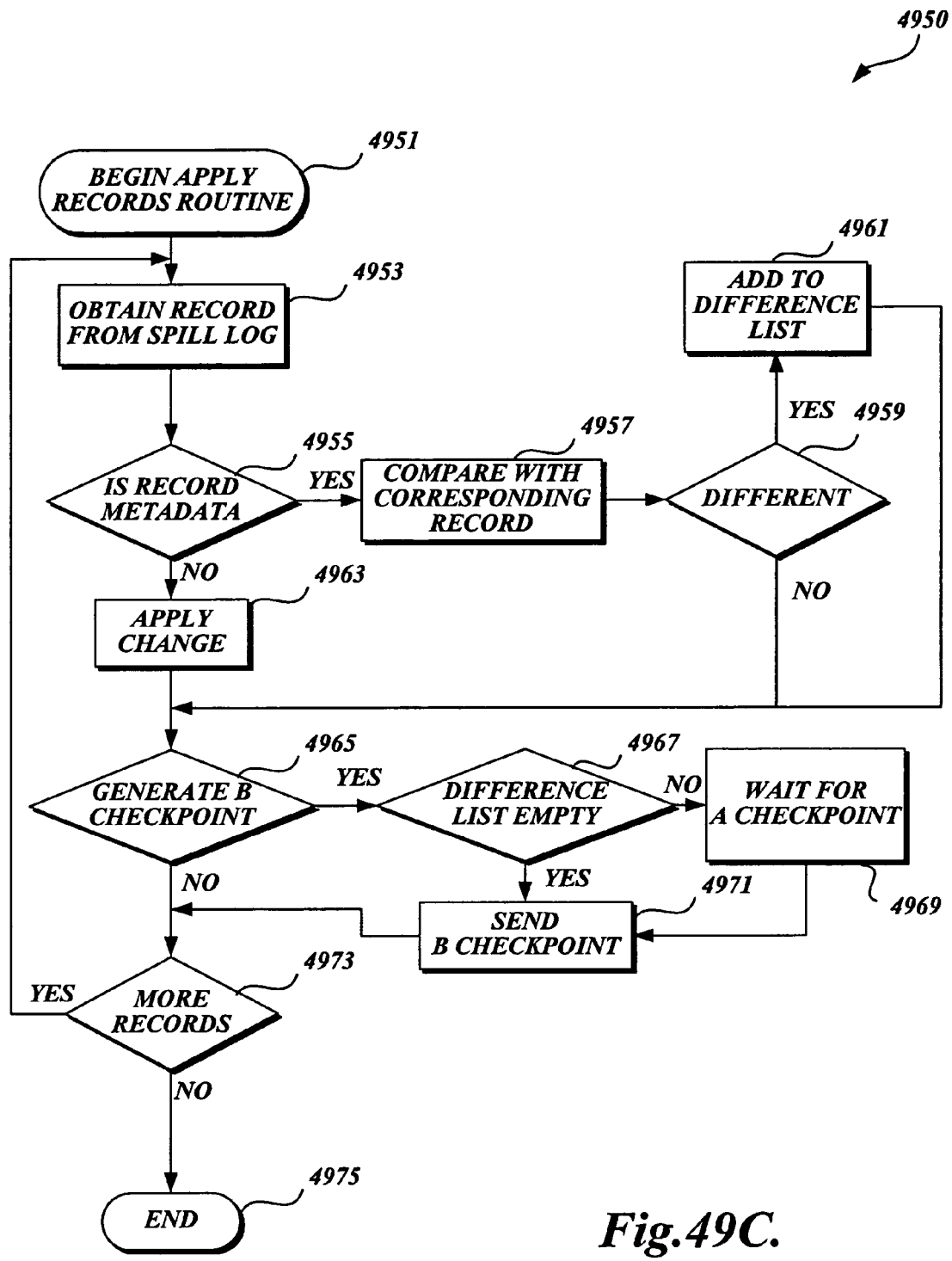
FIG. 49C is a flow diagram of a apply change records routine for applying change records to a replica at a storage location, in accordance with an embodiment of the present invention.

FIG. 49B is a flow diagram of a receive records routine for receiving records at a storage location, in accordance with an embodiment of the present invention. The receive records routine 4920 begins at block 4921 and at block 4923 the next incoming record is received. As discussed above, transmission of records may be accomplished using any type of transmission medium, including, but not limited to, wired, wireless, etc. At decision block 4925 it is determined whether the received record is a Class C checkpoint. If it is a Class C checkpoint, the spill log location of the Class C checkpoint is added to the Class C Checkpoint and the Class C checkpoint is forwarded to the data protector, as illustrated by block 4927. However, if it is determined at decision block 4925 that the record is not a Class C checkpoint, at decision block 4929 it is determined whether the record is a marker token $A_p$. If the record is a marker token, at block 4931 the marker token is forwarded to the data protector.

If it is determined at decision block 4929 that the record is not a marker token, at decision block 4935 it is determined whether the record is a Class A checkpoint. If it is determined at decision block 4935 that the record is a Class A checkpoint, at block 4937 the Class A checkpoint and a difference list are forwarded to the data protector. If it is determined at decision block 4935 that the record is not a Class A checkpoint, or after forwarding the record to the data protector (blocks 4927, 4931, 4937) the received record is added to the spill log, as illustrated by block 4939. At decision block 4941 it is determined whether there are additional records that have been received. If there are additional records, the receive records routine 4920 returns to block 4923 and the routine continues. If there are no additional records, the routine completes at block 4943.

FIG. 49C is a flow diagram of a apply change records routine for applying change records to a replica at a storage location, in accordance with an embodiment of the present invention. The apply records routine 4950 begins at block 4951 and at block 4953 a record is obtained from the spill log. At decision block 4955 it is determined whether the obtained record contains metadata about the protected objects. If it is determined that the record contains metadata, at block 4957 the metadata is compared with a corresponding object stored on the replica. As discussed above, metadata may be any form of identification for an object, such as last change time, size, a calculated checksum, etc. At decision block 4959, upon comparison of the metadata, it is determined whether the metadata is different. If the compared metadata is different, at block 4961 an identification of the object for which metadata was compared is added to the difference list. Upon addition of the identified object to the difference list (block 4961) or if it is determined at decision block 4949 that the metadata is not different, the apply change records routine 4950 continues to decision block 4965 and continues. Returning back to decision block 4955, if it is determined that the record is not metadata, the record is a change record and it is applied to the replica, as illustrated by block 4963.

At decision block 4965 it is determined whether a Class B checkpoint should be generated. As discussed above, generation of a Class B checkpoint may be created based on any form of criteria. For examples, a Class B checkpoint may be generated after each application of a change record, after a predetermined period of time, etc. If it is determined at decision block 4965 that a Class B checkpoint should be generated, at decision block 4967 it is determined whether the difference list is empty. If it is determined that the difference list is not empty, at block 4969 the routine 4950 waits for receipt of a Class A checkpoint. Waiting for a Class A checkpoint if the difference list is not empty ensures that no metadata records that generated an addition to the difference list are lost if the system restarts. Receiving a Class A checkpoint prior to transmission of a Class B checkpoint, ensures that when the difference list is sent all metadata records that were utilized to generate that difference list are no longer needed. If it is determined at decision block 4967 that the difference list is empty, or upon receipt of a Class A checkpoint at block 4969, a Class B checkpoint is generated and transmitted, as illustrated by block 4971.

Referring back to decision block 4965, if it is determined that a Class B checkpoint is not to be generated, or after transmission of a Class B checkpoint (block 4971), at decision block 4973 it is determined whether there are additional records in the spill log that have not yet been applied to the replica. If there are additional records, the apply change records routine 4950 returns to block 4953 and continues. However, if it is determined at decision block 4973 that there are no additional records to apply, the routine completes, as illustrated by block 4975.

Embodiments of the present invention provide the ability to protect data at a production location using any type of backup technique, such as replication with temporal versioning and/or archiving copies of data to removable media. In an embodiment of the present invention, the ability to protect data at a production location is accomplished through the use of distributed control and coordination of actions performed by agents located at different portions of the data protection system. For example, an agent may be located at the production location, storage location, and/or data protector location. These activities, referred to as jobs, are typically run on a scheduled basis. Because jobs often involve communication with remote agents, they are typically asynchronous and may take long periods of time to complete. A job is a scheduled unit of activity that can run either once or on a periodic basis. A job consists of one or more tasks. Tasks can run either serially or in parallel. In addition, the job may fail when any of the tasks fail or the job may continue to execute all tasks until they either complete or fail.

For data protection, jobs are organized to perform a given activity for all members of a protected group. Data protection occurs through the organization of jobs containing tasks for performing the appropriate activities for a particular job. For example, a protection or recovery plan includes one or more jobs and schedules for those jobs. In an actual embodiment of the present invention, jobs may be considered to be one of four different types: protection, recovery, discovery, and housekeeping. Protection jobs perform data protection activities such as replication, temporal version management, archive, or dataset staging. Each protection task is associated with a protected group. Recovery jobs perform data recovery from replica, datasets, archives, or a combination thereof. Each recovery task is associated with a recovery source. Discovery jobs, such as the initial discovery routine (FIG. 25) and the scheduled discovery routine (FIG. 26), discover entities external to the data protector. Discovery is performed for searching, navigation, auto discovery group refresh or saved searches, and protected group membership determination. Housekeeping jobs perform activities necessary for data protection system maintenance. Housekeeping jobs include agent installed version survey, creation of a summary trail, media migration, and data protection system database garbage collection.

Each job of the data protection system is monitored by a job manager. The job manager monitors the overall progress of jobs, reads information from a data protector database related to those jobs, and writes information received from those jobs to a particular portion of the data protector database that it maintains. For the portion of the database that the job manager maintains, it is the only manager of the data protection system that may write information to that portion of the database.

Figure 50:
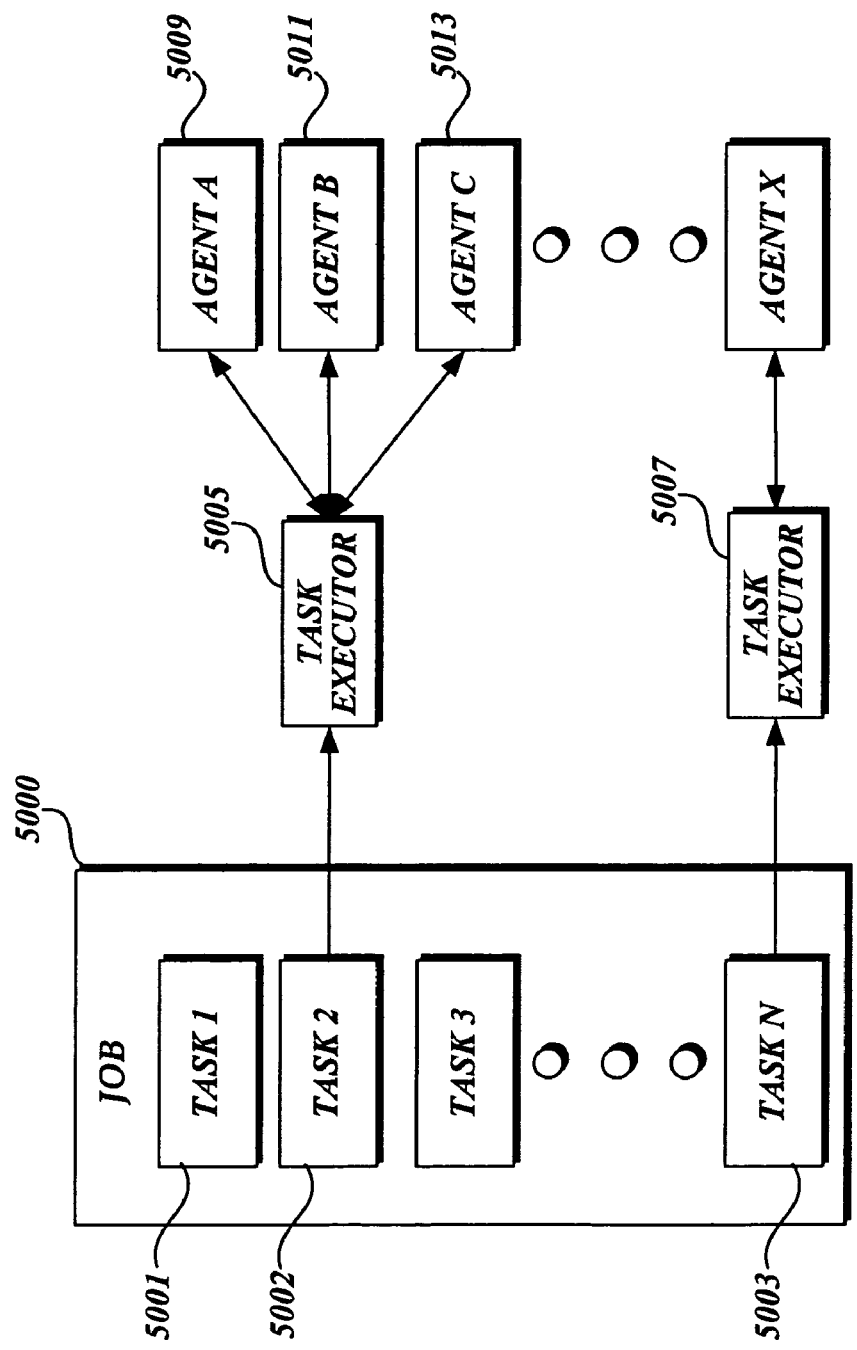
FIG. 50 is a block diagram of a job containing a plurality of tasks, in accordance with an embodiment of the present invention.

FIG. 50 is a block diagram of a job containing a plurality of tasks, in accordance with an embodiment of the present invention. As mentioned above, a job 5000 includes one or more tasks, such as task 1 5001, task 2 5002, up to any number of tasks, illustrated by task N 5003. Each task of a job is executed and managed by a task executor, 5005, 5007. The task executor 5005 in executing a task, such as task 2 5002, may generate one or more commands that are performed by different agents distributed throughout the data protection system. For example, the task executor 5005 may generate three different commands for task 2 5002, each of which is completed by a different agent. A first command for task 2 5002 may be executed by agent A 5009, a second command by agent B 5011, and a third command by agent C 5013. Depending on the type of task and the type of job, the agents 5009-5013 may execute the commands serially or in parallel.

Job properties apply to all tasks of a job. Specific tasks of a job may also have specific properties. Job and task properties for protection jobs are determined by the intent translator as part of creating the jobs of a group plan. In an actual embodiment of the present invention, all jobs have the following properties: action on success/failure, and execute in parallel or only serially. Additionally, any job involving data movement may have the following properties: encryption, compression, throttling, and collocation intents.

Each task executor 5005, 5007 may be generated as a finite state machine (FSM) executed by a common engine that transitions the FSM through different states in response to inputs, persists states, and performs restart logic. For example, a task executor may transition based on the response from a previously issued command to an agent. Utilizing a common engine allows the design of all FSM to follow a common design methodology and for different FSMs to share the same common blocks (such as polling to determine whether an agent is alive and obtaining status from an agent).

Typically, a task executor issues commands to agents and transitions into and out of a wait state based on the success or failure of those commands, and responses provided from those commands. Additionally, a task executor 5005, 5007 may transition after a particular amount of time has passed during execution of a task, in response to a cancel request (e.g., a cancel request from a user, an internal cancel request due to a job exceeding a maximum time allocated for that job, etc.), or in response to an internal message generated based on the state of the database. At each transition the task executor persists its progression through the task. Persisted progression points may be stored in the data protector database. Persisting progression points through a task provides the data protection system with robustness in the event of an unexpected termination (such as a power outage). Upon restart, the task executor can refer to the persisted points and identify the appropriate state of the task and immediately fail from that point, and perform any clean up that may be necessary.

For example, for a data transmission job for replication, as discussed above, a task executor issues commands to appropriate agents for performing each task of the job. Included in those commands would be a command issued to the clone agent to start transmission of change records. Likewise, the task executor issues a command to the replication agent to begin receiving and applying records. As the agents are performing those commands, the task executor begins a timer and transitions to a wait state. At each transition (issuing commands, beginning waiting) the task executor persists a point of progress for the task. A response that may be received by the task executor may be a Checkpoint, a timeout event, a cancel request, etc. Upon receiving a response, the task executor transitions according to the response and persists that point in the task. This process continues until the task completes either via success or failure.

If a timeout event occurs, the task executor 5005 may also poll each agent to determine if the agents are still alive and potentially obtain updates regarding the progress of the commands be executed by that agent. In addition to persisting transition points thereby increasing robustness, long-running activities are designed so that they can be restarted from intermediate points, checkpoints, so that all work is not lost in the case of a failure. For example, referring back to FIGS. 43 through 47, during data transmission and validation checkpoints are created. Those checkpoints are obtained by a replication manager and stored in the data protection database. As discussed above with respect to FIGS. 43-47, upon restart from a failure, those checkpoints may be assessed and data transmission and validation may be resumed from a point identified by the checkpoints.

In addition to running a task to completion, a task executor 5005, 5007, in an embodiment of the present invention, notifies a job manager on completion of the task and whether the task completed with success or failure. The job manager maintains its own trail giving summary information about all tasks in the job. For example, the job trail may contain the number of tasks that completed successfully. The job manager also persists information received from the task executors in a task trail in the data protector database. Additionally, a task executor may also maintain its own task trail with task executor specific information related to the task. A task trail may include any errors encountered during the task as well as statistics related to the task that would be useful to a user of the data protection system. Task type specific trails are received and maintained by managers associated with that particular task. Task type specific trails may include task specific information, such as total time taken to move data, total time for completing the task, total amount of data transferred, etc. Upon restart of the data protection system, the task trail may be utilized to identify an error path that resulted in a failure. Additionally, tasks may maintain task private metadata. That private metadata may be used at restart to clean up a failed task and to create the task trail at completion (success or failure) of the task. Still further, a task executor 5005, 5007 may also manage metadata associated with the task.

In the case of failure, upon restart, jobs do a very simple cleanup. They do not reschedule themselves or perform complex recovery actions. Instead, the task of the job that failed simply updates any physical object state and fails. The failure is recorded in the task trail and job trail. For tasks that are important enough to warrant prompt and automated recovery activity, the data protection system, via a health manager, may create a makeup job that is used to complete the job from the point where the task failed, or at a last checkpoint generated by a task, to completion. A health manager utilizes the task trial as well as the state of various objects in the database to implement the more complex recovery mechanisms to enable data protection to proceed.

For tasks that are considered critical, such as replication, a health manager may monitor those tasks. In an embodiment, the health providers are instantiated by the health manager. Critical tasks, upon failure, raise failure events. The health provider monitors those events and determines whether any recovery needs to be performed. If recovery is necessary, a makeup job is created and scheduled to recovery one or more failed tasks. In addition, at system startup the health manager starts the health providers. Each health provider makes an alternate and independent determination whether recovery of failed tasks that may have been running at the time the system previously terminated are necessary. If recovery is necessary, a makeup job is created and scheduled. A makeup job may contain a single task in the case of a single task failure within a failed job or all incomplete tasks from a failed job including those tasks that where never started.

Figure 51:
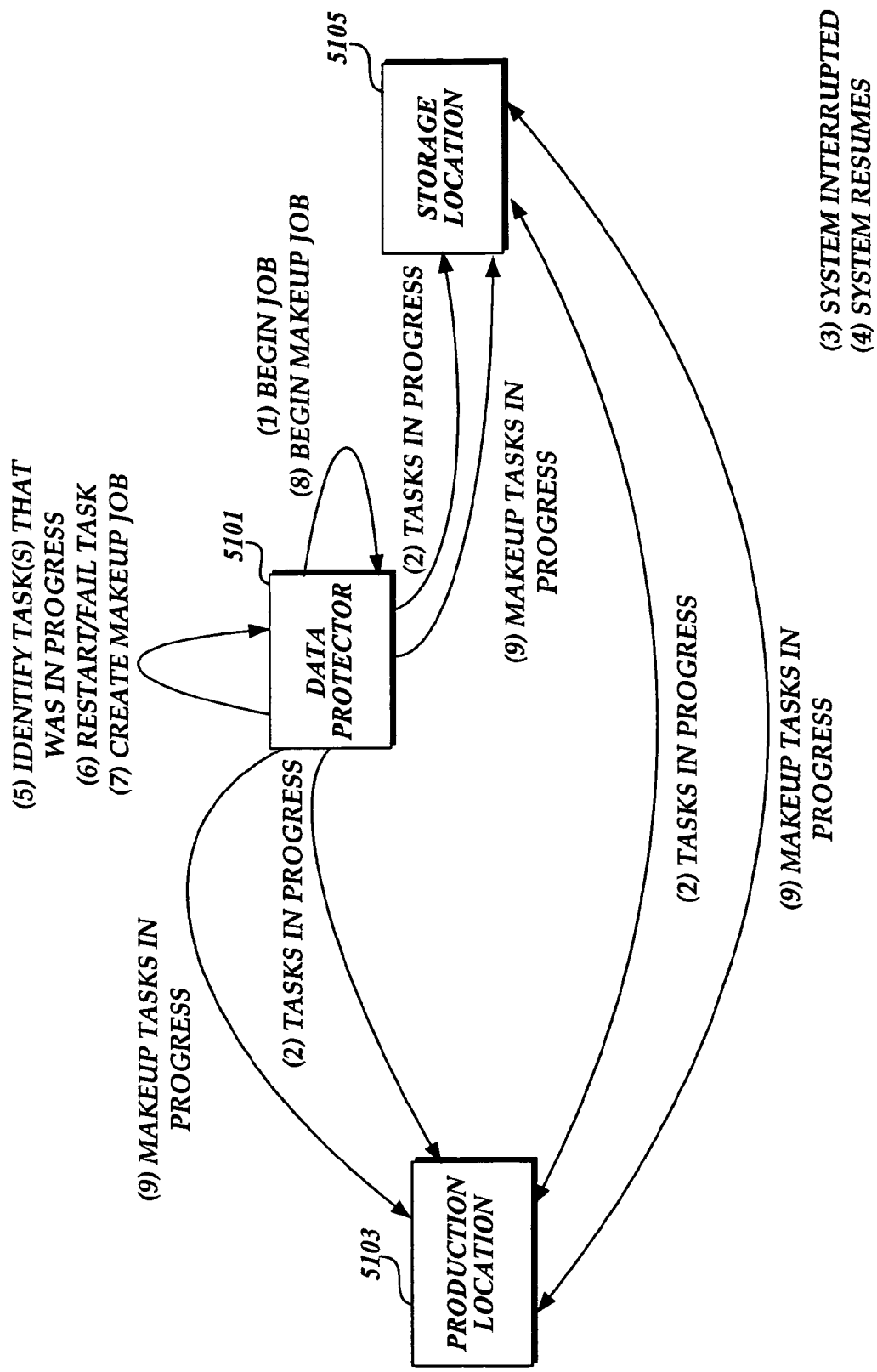
FIG. 51 is a flow diagram illustrating the monitoring of tasks and creation of a makeup job, in accordance with an embodiment of the present invention.

FIG. 51 is a flow diagram illustrating the monitoring of tasks and creation of a makeup job, in accordance with an embodiment of the present invention. As described above, each action within the data protection system is organized in the form of a job having several tasks. The data protector 5101 may create a job, such as replication of protected objects at the production location 5103 that are to be transferred and to be stored at the storage location 5105 as a result of execution of one or more tasks. That job is initiated by the data protector 5101, and each task of the job is executed by one or more task executors. For example, for a replication job, the task executor issues commands to several agents, one of which may be located at the production location 5103, and one of which may be located at the storage location 5105. Those tasks are executed and are currently in progress, and for purposes of this example, the job is interrupted and subsequently recovers. Job interruption may occur through a system failure, such as a power outage. Upon recovery, the data protector 5101 identifies that a task of a job was in progress prior to the system failure. Upon identifying that a task of a job was in progress, the data protector 5101 issues a command restarting the task. Upon restart of the task, the task executor fails the task and performs simple cleanup for the failed task. If the task was critical, the appropriate health provider is notified.

A makeup job is a job that picks up where the previous job left off. The makeup job includes tasks that failed in the previous job or were not started in the previous job. For example, if the failed job is a replication job, the health provider identifies what task of the replication job did not complete successfully and creates a makeup job including the incomplete task and all of the other tasks that did not complete for that job. If the makeup job is generated in response to receiving a failed task, the health manager identifies the failed task and creates a job containing that task and potentially any other tasks that are to be executed, either serially or in parallel, with that job. Upon generation of the makeup job, the health manager schedules the makeup job for execution. That makeup job then proceeds as scheduled as if it were its own job and the tasks of that makeup job are executed. Additionally, because the makeup job is scheduled as its own job, from the perspective of the job manager is treated as any other job and the job manager may not know that it is a makeup job.

Figure 52:
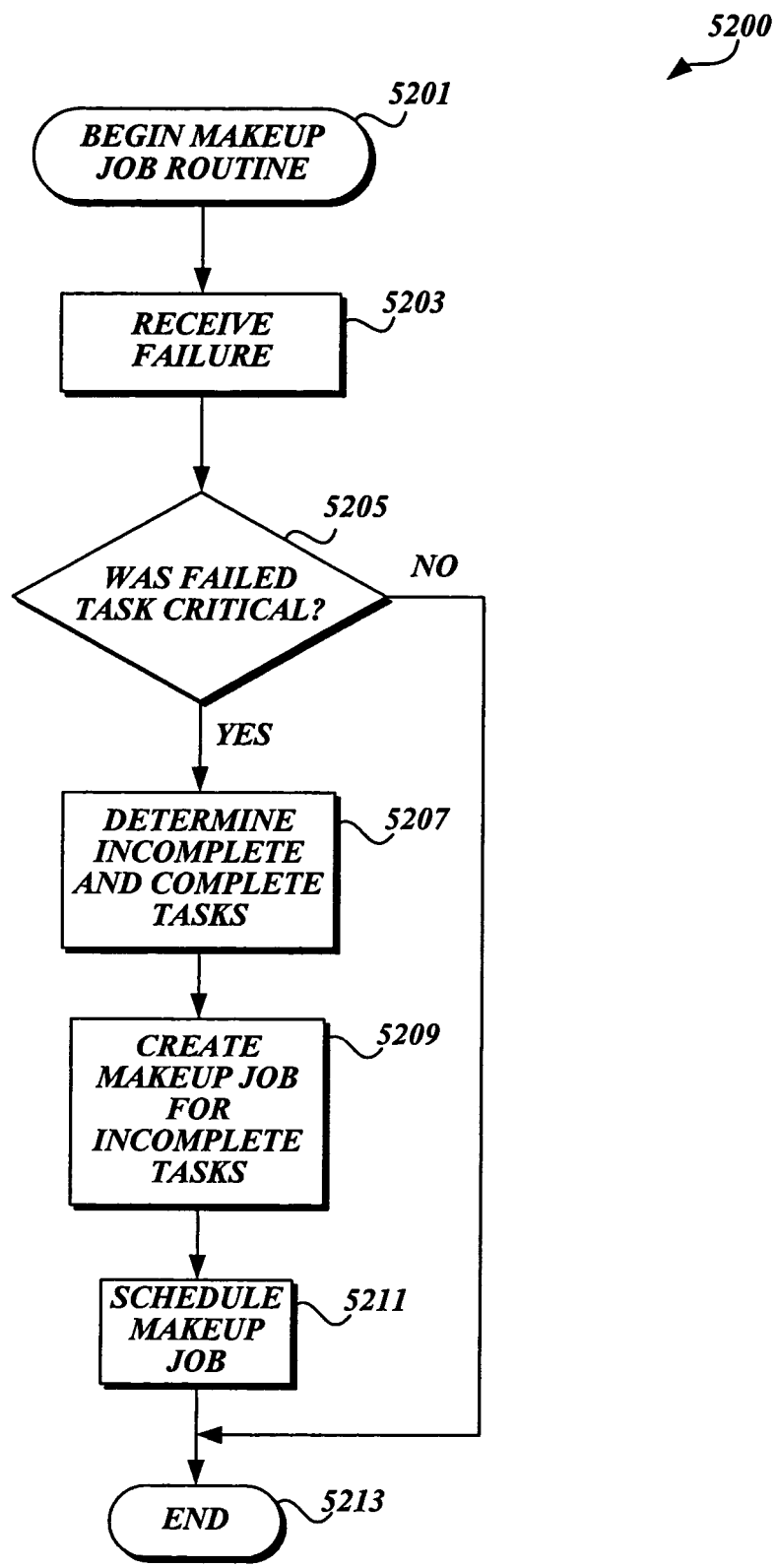
FIG. 52 illustrates a flow diagram of a makeup job routine for identifying a task failure and creating a makeup job if that task was critical, in accordance with an embodiment of the present invention.

FIG. 52 illustrates a flow diagram of a makeup job routine for identifying a task failure and creating a makeup job if that task was critical, in accordance with an embodiment of the present invention. The makeup job routine 5200 may be executed by the data protection system or, in an actual embodiment of the present invention, it may be executed by a health manager.

The makeup job routine 5200 begins at block 5201 and at block 5203 receives a task failure. As discussed above, if a task is interrupted, upon restart, the task executor restarts and fails the previously running task, issuing a task failure notification. The task executor performs clean-up for the failed task.

At decision block 5205 the makeup job routine 5200 determines whether the failed task was critical. In an alternative embodiment, a user may specify what tasks are to be considered critical. If it is determined at decision block 5205 that the failed task was critical, at block 5207, the incomplete task, and any associated tasks are identified. At block 5209 the makeup job routine 5200 creates a makeup job for each of the incomplete tasks and at block 5211 the makeup job is scheduled.

Referring back to decision block 5205, if it is determined that the failed task was not critical, the makeup job routine completes, as illustrated by block 5213. A task may be identified as not critical if it is part of a routine job that is performed multiple times. For example, a replication job for background replication may be considered a non-critical job if the replication job is scheduled to be executed every hour. Thus, because the replication job will proceed again as scheduled, the data protection system may determine that the tasks of the replication job are not critical.

In addition to determining if a makeup job should be scheduled, the data protector, via the job manager, in response to a task failure determines whether the job containing the failed task should continue or also fail. If the failed task is a task that has been determined would fail the job, then the job manager fails the associated job. Even though a task may be considered critical (thus necessitating a makeup job) it may not require that the job fail. Likewise, failure of a non-critical task may result in job failure. For example, when a job includes replication from multiple data sources, failure of one of the replication tasks (a critical task) may not result in failure of the job.

As mentioned above, the data protection system includes managers that control particular portions of the data protection system. For example, the data protection system may include, but is not limited to a replication manager, a configuration manager, a health manager, a summary manager, a job manager, a media manager, an archive manger, etc. Each manager maintains a particular portion of the data protector database. Each portion of the database consists of a set of tables that can only be written by the corresponding manager. Those tables may be read by any manager and other external applications, but since the corresponding manager is the only one that can write data into the tables, all concurrency control and synchronization logic is owned by the manager. The health manager, in addition to monitoring tasks and jobs, may also monitor other managers. The health manager is configured to respond to failures of any of the tasks associated with the manager and can examine the state of the database corresponding to the manager to determine what recovery actions are necessary.

Additionally, a manager may also contain one or more task executors that implement the functionality of the manager. For example, the replication manager may contain all task executors associated with replicas including, but not limited to, replication task executors, temporal versioning task executors, and recovery from the temporal versions task executors.

For the physical objects of the data protection system (e.g., replicas, media, disks, libraries, drives) a state model is maintained. Each state model describes the possible states that the object can be in and the allowable transitions between states. For example, FIG. 37 illustrates a state model for a replica, in accordance with an embodiment of the present invention. A state model describes the lifecycle of an object and indicates what activities need to be performed to transition the object from one state to another. For example, when a replica is in the invalid state 3705 (FIG. 37), base on that state, the data protection system knows that a validation job should be performed to place the replica in a valid state 3711. The state of an object is often an input to the health provider.

Maintaining a state model maintains a known state that may be utilized by the health provider for recovery and thus, simplifies error handling. Additionally, by monitoring the state of objects a user is presented with how the data protection system handled any error conditions.

The data protection system also monitors events generated by portions of the data protection system and provides reports to a user regarding the overall status of the data protection system itself. Alternatively, the reports may provide specific information about different physical objects within the data protection system. For example, if a server at the production location is unavailable, a report error may be generated informing the user of the problem and providing a suggested solution.

Events are reviewed by the data protection system and based on that review, a report regarding the review events is generated. That report is classified into one of three categories: informational, warning, or error. Overall if the report is an error report, it identifies that user action is necessary. If the report is a warning report, it identifies that no immediate user action is necessary, but may become necessary if the warning is not resolved, either automatically or by the user. Finally, if the report is an informational report, it informs the user that no action is required from the user, and provides information regarding the data protection system. As one who is skilled in the art will appreciate, reports may be presented in any form in addition to, or in alternative to informational, warning, and error.

The reports are created by reviewing events generated by different portions of the data protection system. Based on those events, the data protection system compiles a report regarding the events and the state of that portion of the data protection system. Thus, a user is not provided with all of the events generated by the data protection system and instead is provided with a report that has been categorized into either an informational report, warning report, or error report. The provided report may, if necessary, include a suggested resolution to a problem detected by the data protection system. Reports may be generated regardless of whether a task failed on the last job. For example, as illustrated below, even if the last copy job succeeded (block 5409), if the disk space used for maintaining the copy at the storage location exceeds a predetermined threshold (block 5411) an event is generated that the data protection system classifies as a warning and a warning report is provided to the user (block 5413) informing the user that they may want to allocate more disk space.

Report types (informational, warning, error) may be determined by analyzing particular portions of the data protection system. For example, referring to the temporal version diagnosis routine 5700 (FIG. 57), the number of missed temporal versions over a predetermined period of time and a total retention period are computed (block 5725) and a decision on the report classification (warning, error) is determined based on the percentage of missing temporal versions over those time periods.

Figure 59:
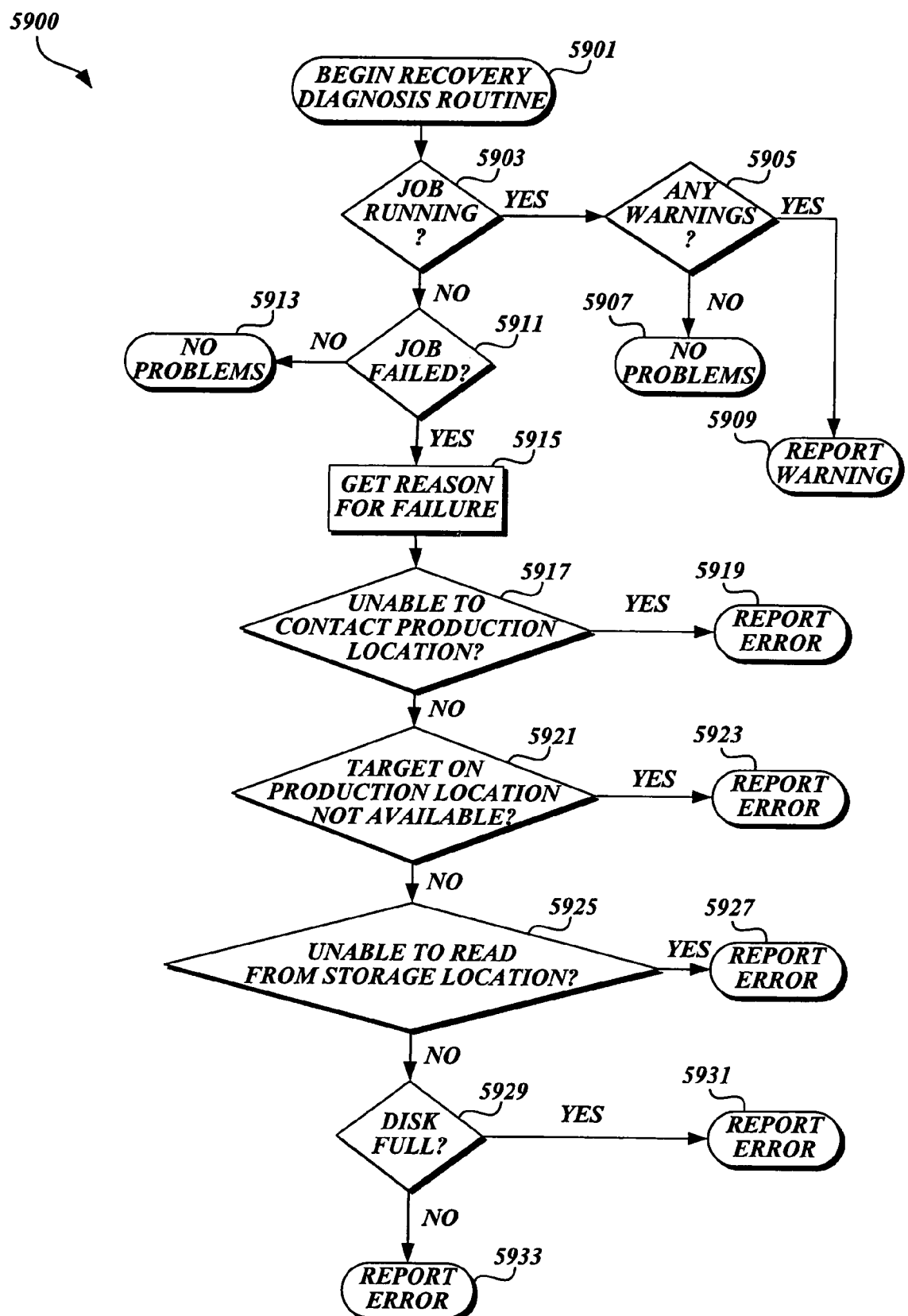
FIG. 59 is a flow diagram describing a recovery diagnosis routine for diagnosing potential problems with recovery of information in the data protection system, in accordance with an embodiment of the present invention.

Additionally, in some instances, a series of tests may be performed to determine the suggestions that are to be included in the report. For example, in the copy diagnosis routine 5400, if it is determined that the copy is not valid 5403 and a validation job failed 5445 the data protection system proceeds to determine, via a series of tests (decision blocks 5447, 5451, 5455, 5459), what suggested solution should be included in the error report generated to the user. A similar example is illustrated in the recovery diagnosis routine 5900 (FIG. 59). In particular, if it is determined that a job failed 5911, the data protection system determines, via a series of tests (decision blocks 5917, 5921, 5925, 5929), what suggested solutions should be included in the error report.

Figure 53:
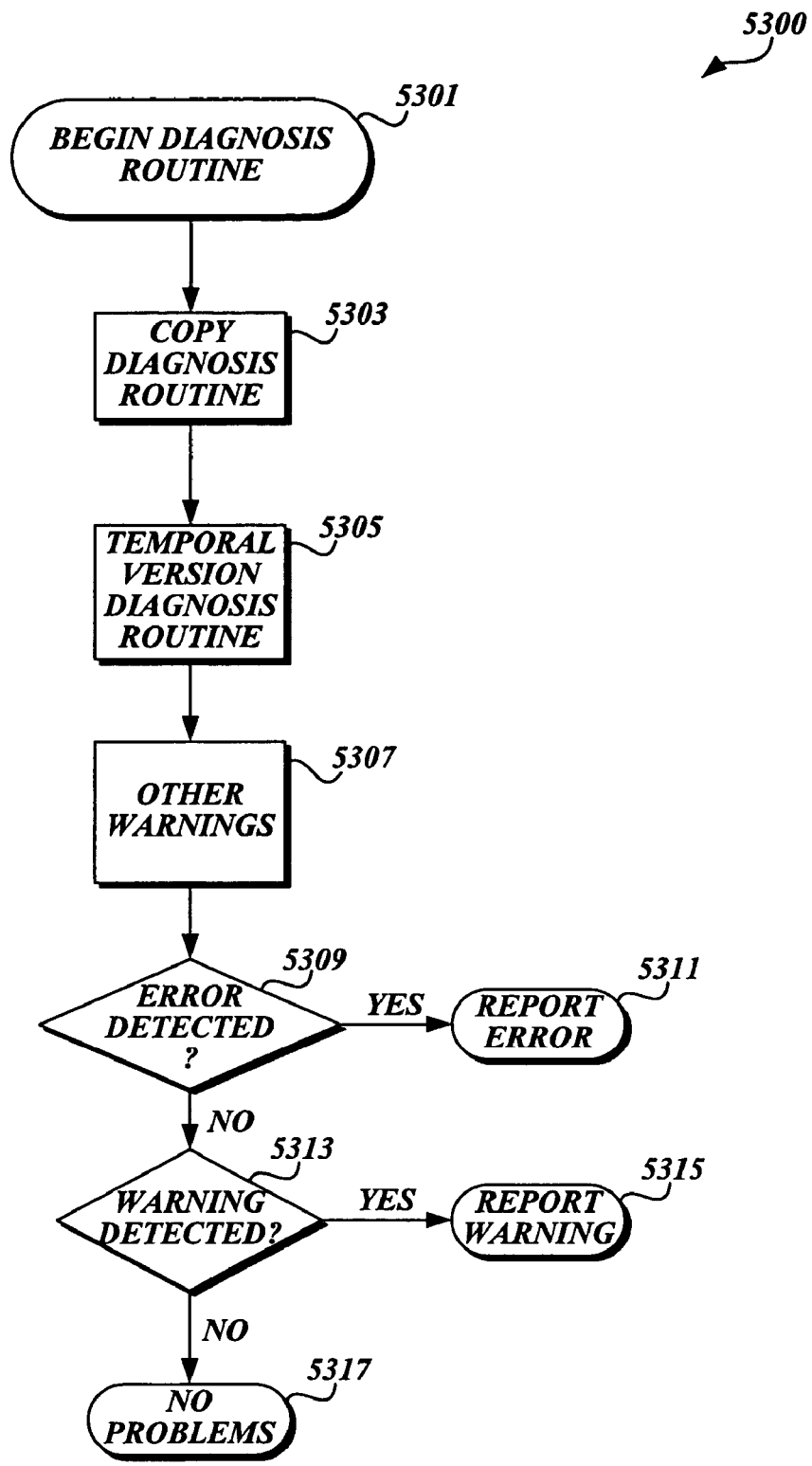
FIG. 53 illustrates a flow diagram for diagnosing problems associated with copy and temporal versions, and for generating a report with suggested corrections if a problem is detected, in accordance with an embodiment of the present invention.

FIG. 53 illustrates a flow diagram for diagnosing problems associated with copies of data and for generating a report with suggested corrections if a problem is detected, in accordance with an embodiment of the present invention. As mentioned above, the reports may be categorized into one of three states: error, warning, and informational.

Figure 54:
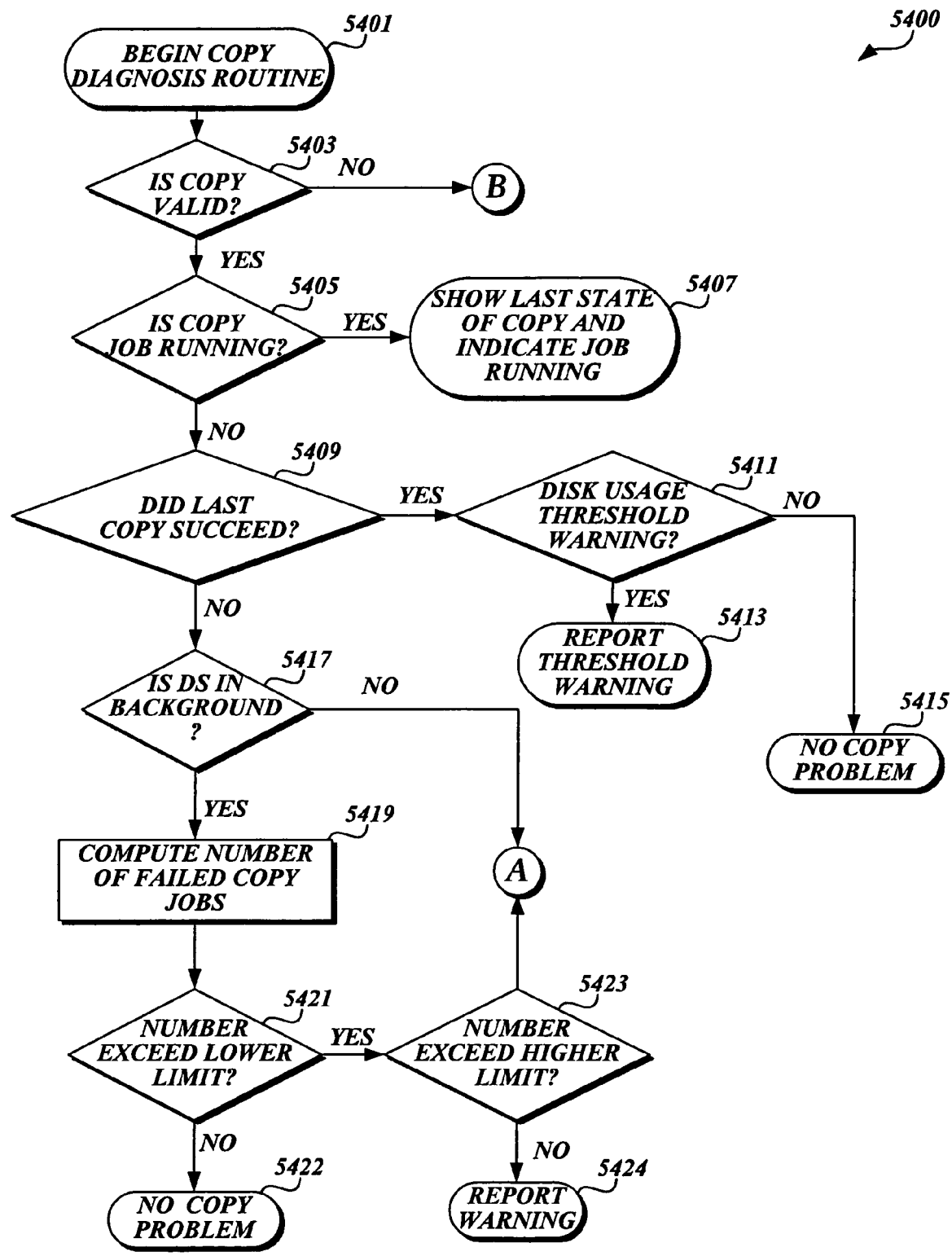
FIGS. 54-56 illustrate a flow diagram describing the details of a copy diagnosis routine for diagnosing potential problems with the copying of data in the data protection system, in accordance with an embodiment of the present invention.
Figure 55:
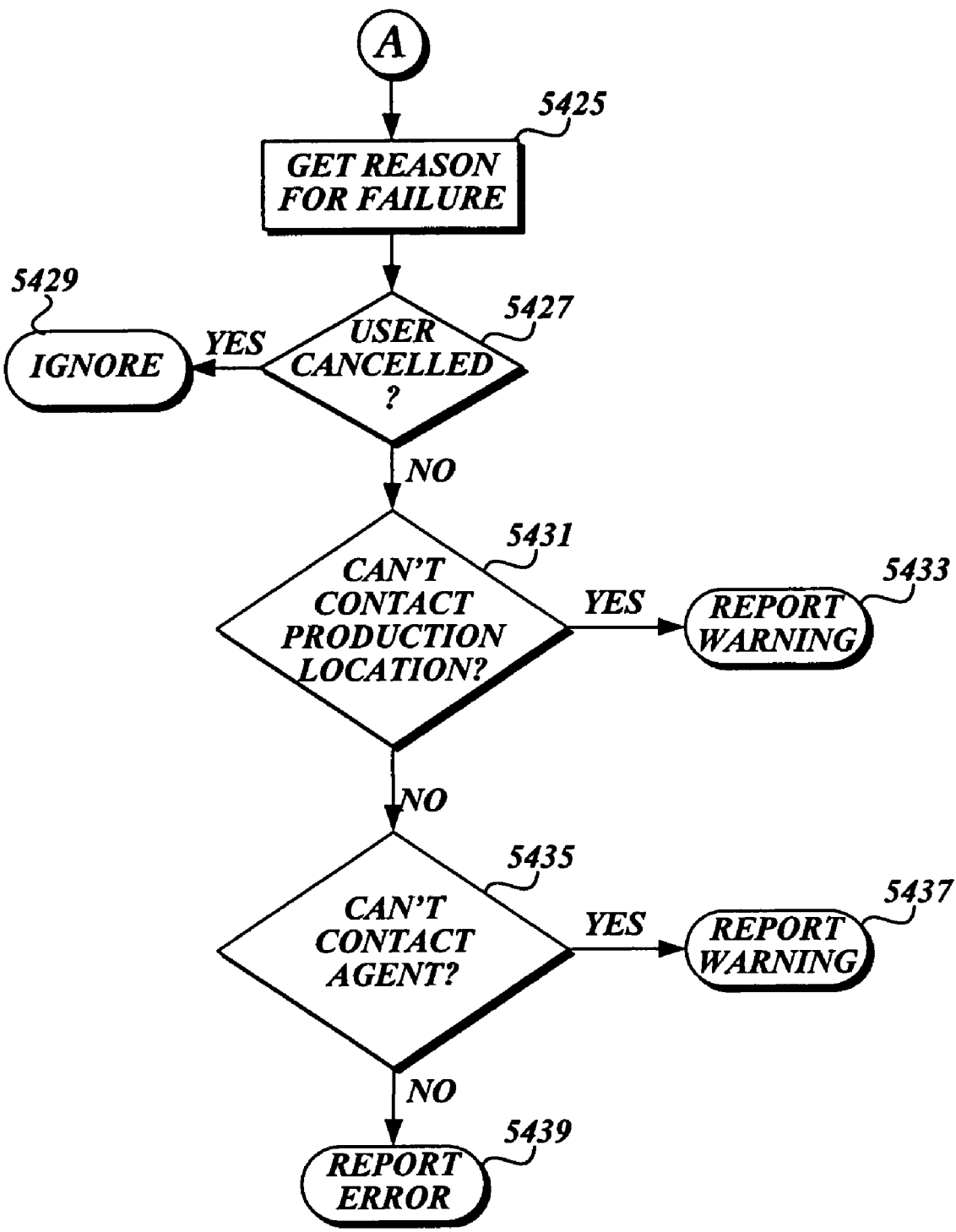
Figure 56:
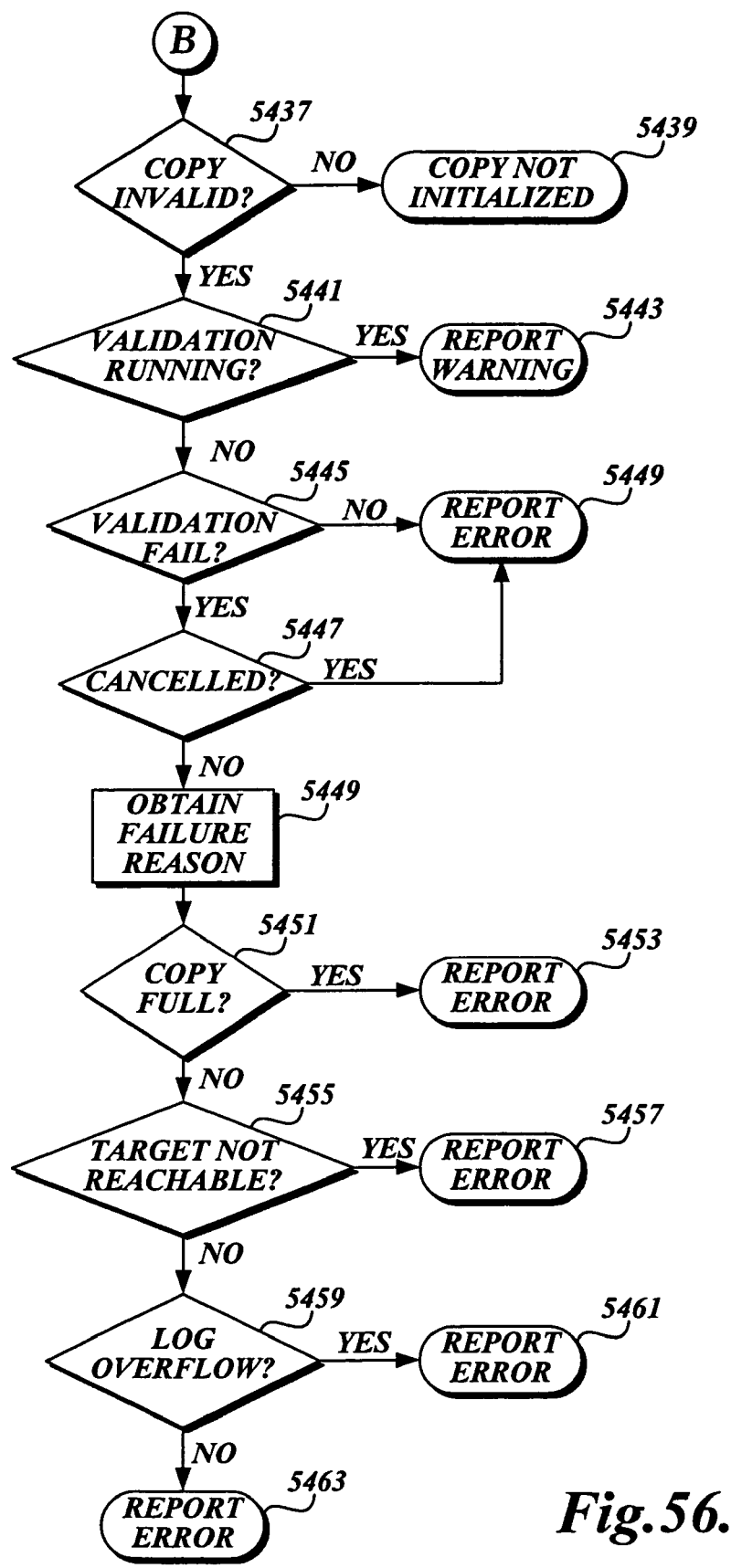

The diagnosis routine 5300 begins at block 5301 and at block 5303 the routine performs the copy diagnosis routine, as described in detail with respect to FIGS. 54-56. In addition to performing the copy diagnosis routine 5303, the diagnosis routine 5300 performs a temporal version diagnosis routine, as described with respect to FIGS. 55-58. Finally, the diagnosis routine 5300 determines if there are any other warnings that have been issued by the data protection system.

At decision block 5309 a determination is made as to whether there were any errors detected in any one of the copy diagnosis routine, temporal version diagnosis routine, or provided by other warnings. If it is determined at decision block 5309 that an error has been detected, at decision block 5311 a error report is generated describing the error and providing a user with suggested steps to be taken to resolve the reported error. However, if it is determined at decision block 5309 that no errors are detected, at decision block 5313 a determination is made as to whether there were any warnings that were generated from any one of the copy diagnosis routine, temporal version diagnosis routine, or provided by other warnings. If it is determined at decision block 5313 that a warning was detected, at block 5315 a warning report is generated describing the warning to a user and providing the user with potential steps that may be performed for resolving the warning. Finally, if it is determined at decision block 5313 that no warning was detected, at decision block 5317 an informational report is generated informing the user that there are no problems with the data protection system and that it is protecting the information as requested by the user.

By proceeding through each of the routines of block 5303, 5305, and 5307 and then determining the most serious problem of those routines (decision blocks 5309, 5313) any potential problems may be provided as a single report. For example, if an error is identified, the error and suggested solution may be presented and any warning or informational reports may be withheld until the more severe problem, the error, is resolved.

FIG. 54 illustrates a flow diagram describing the details of a copy diagnosis routine for diagnosing potential problems with the copying of data in the data protection system, in accordance with an embodiment of the present invention. The copy diagnosis routine may be utilized for any type of storage, such as replica storage, archive, or both replica and archive. As described in detail below, the copy diagnosis routine 5400 determines whether the last copy task succeeded or failed. If the last copy task failed then different paths are followed based on whether the copy mode is background or backup (block 5417). Since a task that runs once a day and fails is much more significant than a task that runs every hour that fails, different reports are generated based on those failures. For example, if the mode is background and a task fails an informational report may be provided to the user if the number of failures has not exceeded a predetermined lower limit. Alternatively, for background mode, no report may be generated for tasks that are scheduled to run frequently, as a subsequent execution of that task may resolve the problem automatically. In contrast, if the copy mode is backup and a task fails, either a warning report or an error report is provided to the user.

The copy diagnosis routine 5400 begins at block 5401, and at decision block 5403 a determination is made as to whether the copy is valid. If it is determined at decision block 5403 that the copy is valid, at decision block 5405 a determination is made as to whether a copy job is currently running. If it is determined at decision block 5405 that a copy job is running, at block 5407 the data protection system generates an informational report identifying the last state of the copy and providing an indication to a user that a copy job is currently running.

However, if it is determined at decision block 5405 that a copy job is not currently running, at decision block 5409 a determination is made as to whether the last copy job succeeded. If it is determined at decision block 5409 that the last copy job did succeed, a determination is made at decision block 5411 as to whether a disk usage threshold warning was generated from the last copy job. A disk usage threshold warning is generated in response to the data protection system identifying that the portion of the storage location for which the copy is currently being stored is running low on available disk space. For example, whenever disk space on a replica is running low or, when archive is performed to disk rather then tape media and either media in the pool is running low or media in the free pool is running low, a disk usage threshold warning may be generated. This threshold level is a predetermined and preset size value that when reached generates a threshold warning.

If it is determined at decision block 5411 that a disk usage threshold warning has been generated, at block 5413 a warning report is generated indicating that disk usage at the storage location has exceeded the predetermined threshold value and provides a suggestion that additional disk space be allocated for the copy. In an alternative embodiment, in addition to generating a warning report informing a user of the threshold warning, the data protection system may also check to see if the warning is still applicable by confirming the current disk space status for the copy.

If it is determined at decision block 5411 that a disk usage threshold warning was not generated, at block 5415 an informational report is provided to a user indicating that there is no problem associated with this portion of the data protection system.

Referring back to decision block 5409, if it is determined that the last copy job did not succeed, a determination is made at decision block 5417 as to whether the mode of protection is in background mode. As described herein, background mode of protection is the operational mode for the data protection system in which copying is nearly continuous. For example, every hour, 24 hours a day, seven days a week. Alternatively, the mode of copying may be a backup mode. A backup mode of protection is an operational mode in which copying is relatively infrequent. For example, archiving and/or replication may occur nightly.

If it is determined at decision block 5417 that the mode of copying is background, at block 5419 the number of previously failed copy jobs is computed. At decision block 5421 a determination is made as to whether the number of failed copy jobs computed at block 5419 has exceeded a predetermined lower limit. If it is determined at decision block 5421 that the number of previously failed copy jobs has not exceeded a predetermined lower limit, at block 5422 an informational report is generated informing the user that the data protection system is currently operating as expected. Calculating the number of failed copy jobs and comparing it to limits to determine whether to generate a report, provides an opportunity for the data protection system to resolve the problem without needed to notify the user. For example, if copy jobs are being generated hourly and one if missed, the data protection system may resolve this problem the following hour if the copy job completes successfully.

However, if it is determined at decision block 5421 that the number of previously failed copy jobs has exceed the predetermined lower limit, at decision block 5423 a determination is made as to whether the number of previously failed copy jobs has exceeded a second higher limit. If it is determined that the number of previously failed copy jobs has not exceed a predetermined higher limit, at block 5424 a warning report is generated informing the user of the number of copy jobs that have failed. That warning report also informs the user that the number of failed copy jobs did not reach a predetermined higher (critical) number and that no action is currently required by the user.

If it is determined at decision block 5417 that the mode of protection is not in the background mode, i.e., it is in the backup mode, or it is determined at decision block 5423 that the number of failed copy jobs exceeds a predetermined higher limit, the copy diagnosis routine 5400 obtains a reason for the last task failure, as illustrated by block 5425 (FIG. 55). In an embodiment of the present invention, the reasons for failures of copy jobs may be obtained from task trails that are generated by tasks contained within the copy job itself. As described above, task trails include metadata about the task itself, what the task was doing, that the task completed, or why the task failed.

At decision block 5427 a determination is made as to whether the reason for the failure was that the user canceled the previous copy job. If it is determined at decision block 5427 that the copy job failed due to a user canceling that job, the notification of a copy failure is ignored. However, if it is determined at decision block 5427 that the previous copy failed for a reason other than being canceled by the user, at decision block 5431 a determination is made as to whether the previous copy job failed because the data protection system was unable to contact the production location. Inability to contact a production location may result from several different types of external events such as a network outage, a power supply problem, or that the production server was currently shut down for maintenance or other operations.

If it is determined at decision block 5431 that the last copy job failed because the data protection system was unable to contact the production location, at block 5433 a report is generated identifying to a user that the previous copy job did not complete successfully and providing a suggestion to the user that they check the network and/or production location in an effort to determine why the data protection system was unable to contact the production location.

If it is determined at decision block 5431 that the previous failure did not occur because the data protection system was unable to contact the production location, at decision block 5435 a determination is made as to whether the previous failure occurred because the data protection system was unable to contact the agent performing the copying. If it is determined that the failure occurred due to inability to contact the agent doing the copying, a warning report is generated informing the user of the error and providing a suggestion that the user check the agents and possibly restart the routine and/or check the agent installation and/or reinstall the agent if necessary, as illustrated by block 5437.

However, if it is determined that the previous failure was not due to user cancellation (block 5427), inability to contact the production location (block 5431) or inability to contact an agent (block 5435), the problem is unknown and an error is generated informing a user that the data protection system was not able to determine the cause of the failure and providing a suggestion that the user check the network connection and the agents involved in copying.

Referring back to FIG. 54, if it is determined at decision block 5403 that the copy for which diagnosis is being performed using the copy diagnosis routine 5400 is not valid, at decision block 5437 (FIG. 56) a determination is made as to whether the copy that is being diagnosed is invalid (i.e., it is in the invalid state 3705 FIG. 37). If it is determined at decision block 5437 that the copy being diagnosed is invalid, at block 5439 the copy diagnosis routine notifies the user that the copy for the data source is not initialized. In an alternative embodiment, at block 5439 a report may be provided to a user identifying that the copy for the particular data source that is being diagnosed is not initialized and asking the user whether it wants to generate an initialization job.

If it is determined at decision block 5437 that the copy is invalid, at decision block 5441 a determination is made as to whether a validation job is currently running on the copy being diagnosed. If it is determined at decision block 5441 that a validation job is currently running for the particular copy being diagnosed, at block 5443 a warning report is generated informing a user that the copy being diagnosed is currently being validated by a validation job and that no action is currently necessary.

If it is determined at decision block 5441 that a validation job is not running, at decision block 5445 the copy diagnosis routine 5400 determines whether a previous validation job ran and failed. If it is determined at decision block 5445 that a validation job did run and failed, a determination is made at decision block 5447 as to whether the failure was a result of cancellation of the validation job by a user. If it is determined at decision block 5445 that a previously run validation job did not fail, or that a previously run validation job did fail and that failure was a result of being canceled by the user, at block 5449 an error report is generated informing the user of the failure and suggesting that a user run a validation job. Alternatively, the validation job may be run automatically.

However, if it is determined at decision block 5447 that a previously run validation job that failed, failed for reasons other than being canceled by a user, at block 5449 the reason for that failure is obtained from the task trails associated with the previous validation job. Utilizing the reasons for the failure obtained in block 5449, the copy diagnosis routine 5400 determines at decision block 5451 whether the previously run validation job that failed, failed because the amount of the storage location available for the copy was full. If it is determined at decision block 5451 that the space for the copy at the storage location was full, at block 5453 an error is reported informing the user that the storage location is full and providing a suggestion that the user allocate more disk space for storage of the copy. Allocating more disk space may include adding additional disk space for a replica.

If it is determined at decision block 5451 that the failure was not a result of the insufficient space, at block 5455 a determination is made as to whether the failure was a result of the data protection system not being able to reach the storage location at all. If it is determined at decision block 5455 that the data protection system was not able to reach the storage location in order to validate the copy, an error report is generated. The error report informs the user that the storage location was inaccessible and suggests that the user check the communication between the data protection system and the storage location, communication with the target volume, and the integrity of the storage location itself.

If it is determined at decision block 5455 that the failure was not a result of the storage location being inaccessible, at decision block 5459 a determination is made as to whether there was a change log overflow at the production location. A log overflow may result from too many changes being queued in the change log at the production location and/or the spill log at the storage location becoming full. This may occur if change records and validation records are being generated faster than they are being transmitted to or processed at the storage location. If it is determined at decision block 5459 that the failure was a result of a log overflow, an error report is generated informing the user of the log overflow and indicating that the log has overflowed and suggesting that the log be resized appropriately, as indicated by block 5461.

Finally, if the copy diagnosis routine 5400 determines at decision block 5459 that the failure was not a result of a log overflow, at block 5463 an error report is generated informing the user of the failure and suggesting that the user check the production server, the data protector and the storage server for potential communication problems or other potential problems, and if the failure continues, to reinitialize the data protection system.

Another example of diagnosing protection problems is the diagnosis of temporal versions. The temporal version diagnosis routine is mentioned with respect to the overall diagnosis routine described in FIG. 53 (block 5305) and described in more detail with respect to FIG. 57.

Figure 57:
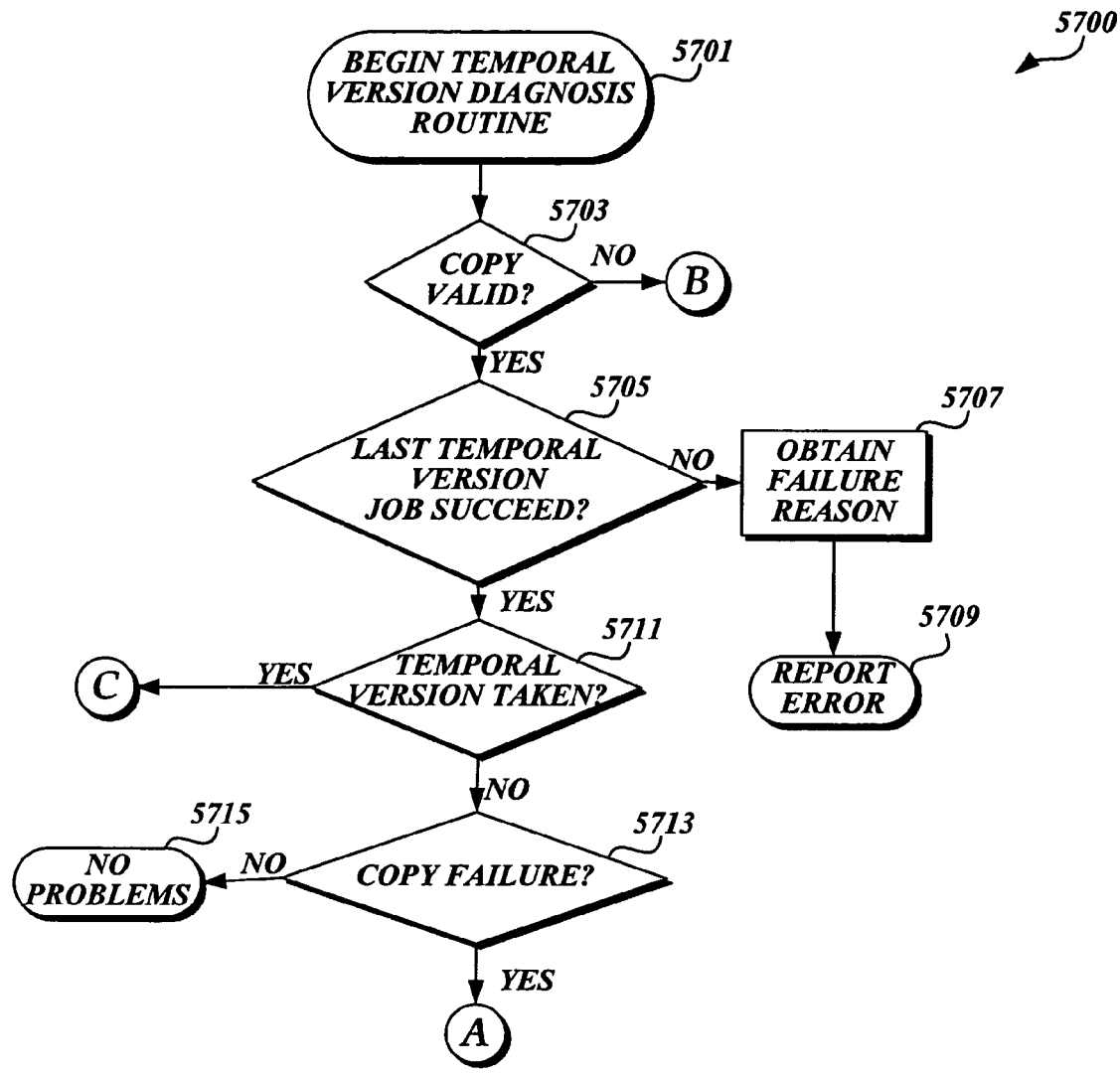
FIGS. 57-58 illustrate a flow diagram describing a temporal version diagnosis routine for diagnosing potential problems with a temporal version generated by the data protection system, in accordance with an embodiment of the present invention.

FIG. 57 illustrates a flow diagram describing a temporal version diagnosis routine for diagnosing potential problems with a temporal version generated by the data protection system, in accordance with an embodiment of the present invention. The temporal version diagnosis routine 5700 begins at block 5701 and at decision block 5703 a determination is made as to whether the copy for which a temporal version is being created is in a valid state. If it is determined at decision block 5703 that the copy for which a temporal version is being generated is in a valid state, at decision block 5705 a determination is made as to whether the last temporal version job of that copy succeeded. If it is determined at decision block 5705 that the last temporal version job of the copy did not succeed, at decision block 5707 the reason for the failure of the temporal version job is obtained from the task trails associated with the task of the temporal version job.

At decision block 5709 an error report is generated providing an explanation and suggesting to the user that a temporal version be taken again. In an alternative embodiment, in addition to generating a report providing an explanation, the data protection system may automatically schedule a temporal version job for taking a subsequent temporal version.

Referring back to decision block 5703, if it is determined that the copy for which the temporal version is to be taken is not in a valid state, the temporal version diagnosis routine 5700 continues as described above with respect to the blocks illustrated in FIG. 56.

If it is determined at decision block 5705 that the last temporal version job of a valid copy did succeed, at decision block 5711 a determination is made as to whether a temporal version was actually taken. If it is determined at decision block 5711 that a temporal version was not actually taken, a determination is made at decision block 5713 as to whether there was a copy job failure. If it is determined at decision block 5713 that there was a copy job failure, the temporal version diagnosis routine 5700 continues as described above with respect to the blocks illustrated and described in FIG. 55.

However, if it is determined at decision block 5711 that no temporal version was taken, and it is determined at decision block 5713 that there was no copy job failure, this identifies to the data protection system that there was no activity on the copy and therefore no temporal version was necessary. Additionally, because there are no problems with the copy, and/or the temporal version, at block 5715 an informational report is generated informing the user that there has been no activity on the copy and therefore no temporal version was taken.

Figure 58:
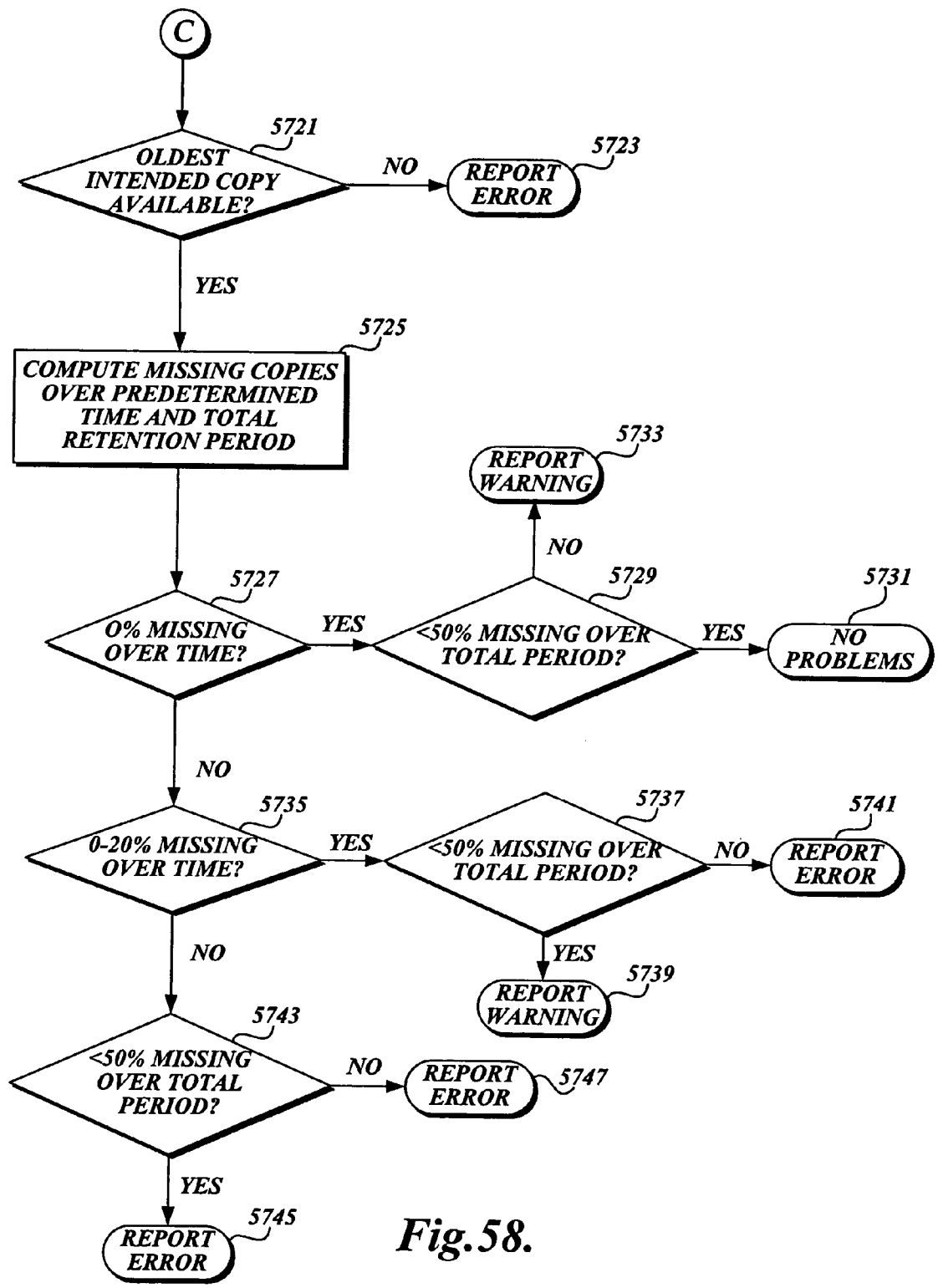

Referring back to decision block 5711, if it is determined that a temporal version job was performed and a temporal version taken, a determination is made as to whether the oldest intended temporal version is available should recovery be necessary, as illustrated by decision block 5721 (FIG. 58). Determining if the oldest intended temporal version is available confirms whether or not the duration intent is being satisfied. For example, if the duration is to be able to recover information that is at least one year old, and the oldest intended temporal version (one year old) is available, confirms that the duration intent is being satisfied. If it is determined at decision block 5721 that the oldest intended temporal version is not available for recovery, an error report is generated informing the user that the oldest intended temporal version is not available and that the most likely cause of this is due to lack of disk space. The error report also provides a suggestion to the user to allocate more disk space for the temporal versions, as illustrated by block 5723.

If it is determined at decision block 5721 that the oldest intended temporal version is available, at block 5725 the temporal version diagnosis routine 5700 computes a number of missing copies over a predetermined time period, and computes a total number of missing copies over the total retention period. A predetermined time period for which missing temporal versions are computed may be any predetermined length of time, such as one week, two weeks, one month, etc., that is less than the total retention period The total retention period is identified by the user in setting up the protection intents when identifying the total length of time for which the user wants to be able to recover protected objects. Computing the number of missing copies confirms whether the frequency intent is being satisfied.

At decision block 5727 a determination is made as to whether there is more than 0% of temporal versions missing over the predetermined time period for which missing copies was computed at block 5725. If it is determined at decision block 5727 that there are no temporal versions missing, at decision block 5729 a determination is made as to whether less than 50% of the temporal versions over the total retention period are missing. If it is determined at decision block 5729 that the number of missing temporal versions over the total time period is less than 50%, an informational report is generated informing the user that no problems currently exist with the temporal version portion of the data protection system, as illustrated by block 5731. As discussed above, by not immediately reporting a problem, the data protection system has the opportunity to resolve any problem without the need of user involvement. For example, if it is determined that the number of missing copies over the total time period is 10% but future copy jobs complete successfully, this percentage will decrease over time, without the need of alerting a user.

However, if it is determined at block 5729 that more than 50% of the temporal versions are missing over the total time period, a warning report is generated identifying the percentage of temporal versions that are currently missing and suggesting that no action is necessary other than continued monitoring of the percentage of missing temporal versions, as illustrated by block 5733.

If it is determined at decision block 5727 that there are some temporal versions missing over the predetermined time period, at decision block 5735 a determination is made as to whether the missing number of temporal versions over that predetermined time period is between 0% and 20%. If it is determined at decision block 5735 that the number of missing copies over the predetermined time period is between 0% and 20%, at decision block 5737 a determination is made as to whether the number of missing temporal versions over the total retention period is less than 50%. If it is determined at decision block 5737 that the number of missing temporal versions for the total retention period is less than 50%, at block 5739 a warning report is generated providing the percentage of temporal versions missing and suggesting that no action is required other than to monitor the percentage of missing temporal versions.

However, if it is determined at block 5737 that the percentage of missing temporal versions over the total retention period is greater than 50%, at block 5741 an error report is generated informing the user of the percentage of temporal versions that are missing. Additionally, the error report generated at block 5741 informs the user that protection is not performing as expected and suggests that the user check the protection parameters identified and the disk setup for the production location and the storage location.

Referring back to decision block 5735, if it is determined that the percentage of temporal versions missing over the predetermined time period is not between 0% and 20%, a decision is made at decision block 5743 as to whether the number of missing temporal versions over the total retention period is less than 50%. If it is determined at decision block 5743 that the total number of missing temporal versions over the entire retention period is less than 50%, at block 5745 an error report is generated informing the user that protection is not performing as expected, providing the user with the total percentage of missing temporal versions over the total retention period and suggesting that the user check the integrity of the copy itself and to check the protection schedule. Finally, if it is determined at decision block 5743 that the number of missing temporal versions over the total retention period is greater than 50%, an error report is generated informing the user that protection has been consistently bad and suggesting that the user check protection and disk setup at both the production location and the storage location, as illustrated by block 5747.

While specific percentages have been utilized for the above discussion of the temporal version diagnosis routine 5700, it will be appreciated by one of ordinary skill in the relevant art that any predetermined percentages may be utilized with embodiments of the present invention and the ones provided herein are intended for explanation purposes only.

FIG. 59 is a flow diagram describing a recovery diagnosis routine for diagnosing potential problems with recovery of information in the data protection system, in accordance with an embodiment of the present invention. The recovery diagnosis routine 5900 begins at block 5901 and at decision block 5903 a determination is made as to whether a recovery job is currently running. If it is determined at decision block 5903 that a recovery job is currently running, at decision block 5905 the recovery diagnosis routine 5900 determines if any warnings have been generated from tasks associated with the running recovery job. If it is determined at decision block 5905 that no warnings have been generated by the task associated with the running recovery job, an informational report is generated informing a user that no recovery-related problems for the data protection system exist. If it is determined at decision block 5905 that warnings have been generated from a task associated with the currently running job, at block 5909 a warning report is generated informing the user that a currently running recovery job has generated one or more warnings and informs the user of those warnings and provides suggested approaches to resolving those warnings, if any resolution is necessary. For example, a currently running job may generate a warning indicating that it was unable to restore a file because it is currently open.

If it is determined at decision block 5903 that no recovery job is currently running, at decision block 5911 a determination is made as to whether a recent recovery job (e.g., a recovery job that was executed within the last seventy-two hours) failed to complete. If it is determined at decision block 5911 that no recent recovery jobs failed to complete, i.e., all completed successfully or there was no recovery job performed, at block 5913 a report is generated informing the user that there are no problems associated with the recovery portion of the data protection system.

If it is determined at decision block 5911 that the recently run recovery job did fail, at block 5915 a reason for the failure of that job is obtained from the task trails associated with that job. As described above, task trails for tasks associated with a particular job contain information about the task itself including why a task failed if the task did fail.

At decision block 5917, utilizing the reason for the failure obtained in block 5915, a determination is made as to whether the failure of the recovery job was a result of the data protection system being unable to contact the production location to where the data was to be recovered. If it is determined at decision block 5917 that the reason for the recovery job failure was that the data protection system was unable to contact the production location, at block 5919 an error report is generated informing the user of the reason for the last recovery job failure and suggesting that the user check the network connections at the production location and check the agent on the production location to ensure that the agent is operating properly. As described above with respect to the copy diagnosis routine (FIGS. 54-56), being unable to contact a location, such as the production location, may be a result of several external events such as a network outage, a power problem, or the production location being taken offline for maintenance or other operations.

If it is determined at decision block 5917 that the reason for the recovery job failure is not a result of the data protection system being unable to contact the production location, at decision block 5921 it is determined whether the reason for the recovery job failure was a result of the target on a production location not being available. A target on a production location may be the physical portion of the production location to which the recovered data is to be recorded. If it is determined at decision block 5921 that the target was not available, an error report is generated, as illustrated at block 5923, informing the user of the reason for the recovery job failure and suggesting that the user check the physical location on the production server for potential problems.

If it is determined at decision block 5921 that the recovery job failure was not a result of the target on the production location being unavailable, at decision block 5925 it is determined whether the reason for the recovery job failure was that a task of the recovery job was unable to read data from the storage location. If it is determined that a task of the recovery job was unable to read data from the storage location, at block 5927 an error report is generated informing the user of the reason for the recovery job failure and providing a suggestion that the user check the disk and/or media at the storage location.

If it is determined at decision block 5925 that the reason for the recovery job failure was not a result of a task being unable to read from the storage location, at decision block 5929 a determination is made as to whether the disk at the production location to where the recovery data is to be recovered is currently full. If it is determined at decision block 5929 that the disk is full, at block 5931 an error report is generated informing the user that the disk at the recovery location does not have sufficient room for recovering the requested data and suggesting that the user recover the data to an alternate location or increase the disk space at the production location.

Finally, if it is determined at decision block 5929 that the reason for the recovery job failure was not a result of the disk at the production location being full, a report is generated informing the user that an unknown error has occurred in the previous recovery job and suggesting that the user rerun the recovery job.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for creating an archive protection plan for archiving a backup of data, comprising:

obtaining a selection of namespace elements and a protection intent, the protection intent including an indication of an archive data protection kind and an archive data protection duration for the selected namespace elements, each namespace element providing a logical representation of a protectable object, each namespace element being used to locate at least one protectable object, each namespace element including one of the following: a distributed file system link, a server, a share, a volume, a folder, and an exchange storage group, wherein the protection intent is selected by a user from a plurality of protection intent templates having default properties, the protection intent template properties comprising commands expressed in verbs, each protection intent template providing a capability for the user to modify its default properties;

mapping the namespace elements to the protectable objects;

generating a protected group, the protected group comprising a logical grouping of namespace elements and associated protectable objects to which the data protection kind and the data protection duration apply;

translating the selected protection intent into an archive scheme by turning the protection intent template properties into corresponding actions;

allocating resources necessary for the protected group;

creating a checkpoint indicating a completion of allocation of resources; and generating an archive protection plan representative of the archive scheme.

2. The method of claim 1, further comprising receiving scheduling intentions for the archive protection plan.

3. The method of claim 1, further comprising:

providing the archive scheme;

receiving overrides to the archive scheme;

modifying the archive scheme; and wherein the generated archive protection plan is representative of the modified archive scheme.

4. The method of claim 1, wherein the archive protection plan includes a resource plan, preparation plan, and a protection plan.

5. The method of claim 1, wherein the archive data protection kind is on-site data protection.

6. The method of claim 1, wherein the archive data protection kind is off-site data protection.

7. The method of claim 1, wherein the archive data protection kind is on-site data protection and off-site data protection.

8. The method of claim 1, wherein the archive data protection duration is years.

9. The method of claim 1, wherein the determined archive scheme comprises:

a yearly full backup of the data;

a monthly full backup of the data;

a weekly full backup of the data; and a daily partial backup of the data.

10. The method of claim 9, wherein the yearly full backup is maintained on-site for a predetermined period of time and subsequently maintained off-site for a predetermined period of time.

11. The method of claim 9, wherein the monthly full backup is maintained on-site for a predetermined period of time and subsequently maintained off-site for a predetermined period of time.

12. The method of claim 9, wherein the weekly full backup is maintained on-site for a predetermined period of time and subsequently maintained off-site for a predetermined period of time.

13. The method of claim 9, wherein the daily partial backup is maintained on-site for a predetermined period of time.

14. The method of claim 9, wherein the yearly full backup is maintained on-site for a predetermined period of time and subsequently maintained off-site for a predetermined period of time;
   wherein the monthly full backup is maintained on-site for a predetermined period of time and subsequently maintained off-site for a predetermined period of time;
   wherein the weekly full backup is maintained on-site for a predetermined period of time and subsequently maintained off-site for a predetermined period of time; and
   wherein the daily partial backup is maintained on-site for a predetermined period of time.

15. The method of claim 9, wherein the yearly backup of data, the monthly backup of data, the weekly backup of data, and the daily backup of data are stored on at least a portion of a same item of media.

16. The method of claim 1, wherein the archive data protection duration is months.

17. The method of claim 16, wherein the determined archive scheme comprises:
   a monthly backup of the data;
   a weekly backup of the data; and
   a daily backup of the data.

18. The method of claim 17, wherein the monthly backup is maintained on-site for a predetermined period of time and subsequently maintained off-site for a predetermined period of time.

19. The method of claim 17, wherein the weekly backup is maintained on-site for a predetermined period of time and subsequently maintained off-site for a predetermined period of time.

20. The method of claim 17, wherein the daily backup is maintained on-site for a predetermined period of time; and
   wherein the daily backup is a partial backup.

21. The method of claim 17, wherein the monthly backup is maintained on-site for a predetermined period of time and subsequently maintained off-site for a predetermined period of time;
   wherein the weekly backup is maintained on-site for a predetermined period of time and subsequently maintained off-site for a predetermined period of time; and
   wherein the daily backup is maintained on-site for a predetermined period of time.

22. The method of claim 1, wherein the archive data protection duration is weeks.

23. The method of claim 22, wherein the determined archive scheme comprises:
   a weekly full backup of the data; and
   a daily partial backup of the data.

24. The method of claim 23, wherein the weekly full backup is maintained on-site for a predetermined period of time and subsequently maintained off-site for a predetermined period of time.

25. The method of claim 23, wherein the daily partial backup is maintained on-site for a predetermined period.

26. The method of claim 23, wherein the weekly full backup is maintained on-site for a predetermined period of time and subsequently maintained off-site for a predetermined period of time; and
   wherein the daily partial backup is maintained on-site for a predetermined period of time.

27. The method of claim 1, wherein the archive data protection duration is days.

28. The method of claim 27, wherein the determined archive scheme comprises:
   a daily full backup of the data.

29. The method of claim 28, wherein the daily full backup is maintained on-site for a predetermined period of time and subsequently maintained off-site for a predetermined period of time.

30. The method of claim 1, wherein the archive protection plan includes, generating a full backup and a partial backup.

31. The method of claim 1, further including receiving an indication of a data protection format.

32. The method of claim 31, wherein the data protection format is incremental.

33. The method of claim 31, wherein the data protection format is differential.

34. The method of claim 31, wherein the data protection format is full.

* * * * *